(12) United States Patent
Sasaki

(10) Patent No.: US 12,180,372 B2
(45) Date of Patent: Dec. 31, 2024

(54) RESIN COMPOSITION, OPTICAL FILTER, IMAGE DISPLAY DEVICE, SOLID-STATE IMAGING ELEMENT, AND COLORANT MIXTURE

(71) Applicant: FUJIFILM Corporation, Tokyo (JP)

(72) Inventor: Daisuke Sasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 760 days.

(21) Appl. No.: 17/318,240

(22) Filed: May 12, 2021

(65) Prior Publication Data

US 2021/0277249 A1  Sep. 9, 2021

Related U.S. Application Data

(63) Continuation of application No. PCT/JP2019/047929, filed on Dec. 6, 2019.

(30) Foreign Application Priority Data

Dec. 7, 2018  (JP) ................................. 2018-230015

(51) Int. Cl.
| | | |
|---|---|---|
| C09B 57/00 | (2006.01) | |
| C08K 5/3445 | (2006.01) | |
| G02B 1/04 | (2006.01) | |
| G02B 5/20 | (2006.01) | |

(52) U.S. Cl.
CPC .......... C09B 57/007 (2013.01); C08K 5/3445 (2013.01); G02B 1/04 (2013.01); G02B 5/20 (2013.01)

(58) Field of Classification Search
CPC ...... C09B 57/007; C08K 5/3445; G02B 1/04; G02B 5/20
See application file for complete search history.

(56) References Cited

U.S. PATENT DOCUMENTS

| | | |
|---|---|---|
| 2009/0074373 A1 | 3/2009 | Yamano et al. |
| 2020/0217993 A1 | 7/2020 | Fukagawa et al. |

FOREIGN PATENT DOCUMENTS

| | | |
|---|---|---|
| JP | 2004-086133 A | 3/2004 |
| JP | 2004-212980 A | 7/2004 |
| JP | 2004-238606 A | 8/2004 |
| JP | 2005-300984 A | 10/2005 |
| JP | 2017-068120 A | 4/2017 |
| WO | 2006/011514 A1 | 2/2006 |
| WO | 2006/054700 A1 | 5/2006 |
| WO | 2008/090757 A1 | 7/2008 |
| WO | 2018/100834 A1 | 6/2018 |
| WO | 2018/190211 A1 | 10/2018 |
| WO | 2019/066043 A1 | 4/2019 |

OTHER PUBLICATIONS

English machine translation of JP 2004-212980 (Year: 2004).*
Office Action, issued by the Japanese Patent Office on Dec. 7, 2021, in connection with Japanese Patent Application No. 2020-560073.
International Search Report issued in connection with International Patent Application No. PCT/JP2019/047929 on Feb. 25, 2020.
Written Opinion of the International Searching Authority issued in connection with International Patent Application No. PCT/JP2019/047929 on Feb. 25, 2020.
International Preliminary Report on Patentability issued in connection with International Patent Application No. PCT/JP2019/047929 on Jun. 8, 2021.

* cited by examiner

*Primary Examiner* — Angela C Scott
(74) *Attorney, Agent, or Firm* — Edwards Neils LLC; Jean C. Edwards, Esq.

(57) ABSTRACT

Provided are a resin composition including a colorant and a resin, in which the colorant contains two or more squarylium colorants represented by Formula (1) below, at least one of the squarylium colorants is a squarylium colorant having a hydrogen-bonding group, which is represented by Formula (2) below, and a colorant mixture consisting of the two or more squarylium colorants, which is included in the resin composition, has a maximum absorption wavelength in a wavelength range of 400 nm to 700 nm; an optical filter; a liquid crystal display device; a solid-state imaging element; and a colorant mixture.

Formula (1)

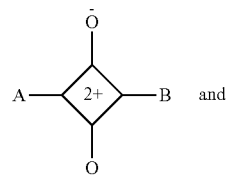

and

Formula (2)

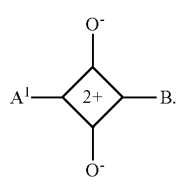

15 Claims, 1 Drawing Sheet

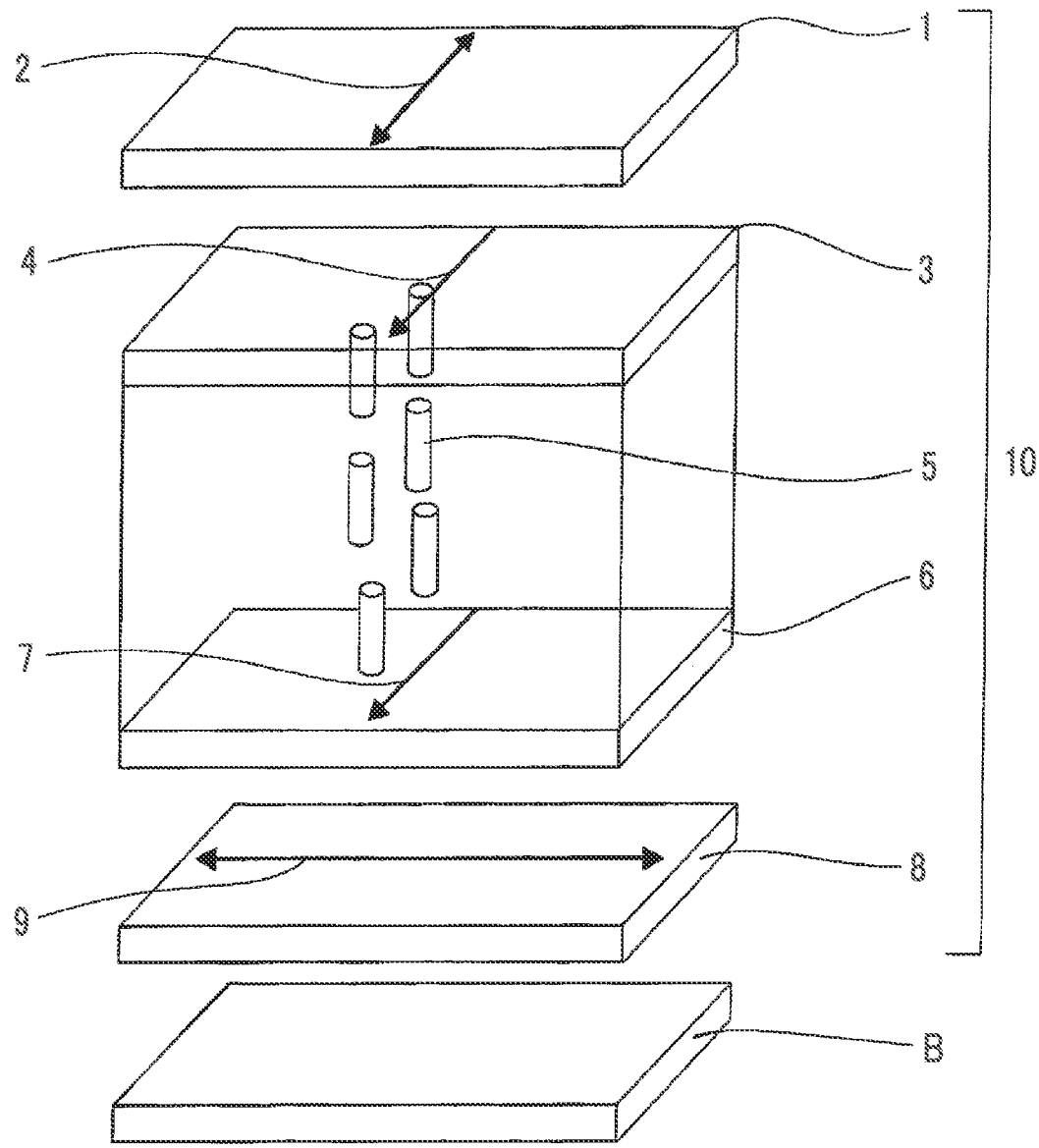

RESIN COMPOSITION, OPTICAL FILTER, IMAGE DISPLAY DEVICE, SOLID-STATE IMAGING ELEMENT, AND COLORANT MIXTURE

CROSS-REFERENCE TO RELATED APPLICATIONS

This application is a Continuation of PCT International Application No. PCT/JP2019/047929 filed on Dec. 6, 2019, which was published under Article 21(2) in Japanese, and which claims priority under 35 U.S.C. § 119 (a) to Japanese Patent Application No. 2018-230015 filed in Japan on Dec. 7, 2018. The above applications are hereby expressly incorporated by reference, in their entirety, into the present application.

BACKGROUND OF THE INVENTION

1. Field of the Invention

The present invention relates to a resin composition suitable as a constituent material of an optical filter, an optical filter formed of the resin composition, and an image display device and a solid-state imaging element formed of the optical filter. In addition, the present invention relates to a colorant mixture suitable as a light absorbing component of the resin composition.

2. Description of the Related Art

A liquid crystal display device is widely used as a space-saving image display device with low power consumption. In a market in which high-quality images are required, such as a television, there is an increasing demand for improvement in color reproducibility in addition to a resolution.

In the liquid crystal display device, a liquid crystal panel displaying images is a non-light emitting element which does not emit light itself. Therefore, a backlight unit is disposed on a rear surface of the liquid crystal panel and supplies light to the liquid crystal panel.

In recent years, as a light source for the backlight unit, a white light emitting diode (LED) has been used. As a light emitting device formed of the white LED, a device of producing white light by mixing blue light radiated from a blue LED and light radiated from a yellow fluorescent body or a green fluorescent body and a red fluorescent body is known. However, the above-described device has a problem in that a color reproduction range is narrow compared to an organic light emitting diode (OLED) or the like which is in the spotlight as a next-generation display. There is a demand for new technique for overcoming this problem, a technique in which a coating layer including a dye is provided on a diffusion film in the backlight unit, thereby blocking light having an unnecessary wavelength which is emitted from the white LED, has been proposed. In addition, although it is different from the application of the liquid crystal panel, WO2018/100834A discloses an optical film suitable for an image sensor, in which a composition containing two or more kinds of colorants including a squarylium compound (a colorant) is used.

SUMMARY OF THE INVENTION

In handling a composition containing a colorant, improvement in solubility of the colorant is an important property leading to improvement in handleability (easiness of handling). In addition, it is required for the colorant included in the optical filter to have excellent light resistance. However, the squarylium colorant generally has a problem of low light resistance and poor solubility to an organic solvent due to a betaine structure.

Since the composition containing the colorant described in WO2018/100834A is used for producing the optical film suitable for an image sensor, this composition has absorption in an infrared region of approximately 760 nm to 1100 nm. Therefore, transparency is required in a visible light region of approximately 380 nm to 780 nm, which makes the optical film unsuitable as an optical filter for a liquid crystal panel. In addition, the above-described optical film is inferior in light resistance to irradiation in the visible light region, and cannot sufficiently satisfy the light resistance required for an optical filter.

Therefore, an object of the present invention is to provide an optical filter which is capable of blocking light in a specific wavelength range (specifically, 400 nm to 700 nm), such as light of an unnecessary wavelength emitted from a white LED or the like, and has an excellent light resistance; a resin composition suitable as a constituent material of this optical filter; and an image display device and a solid-state imaging element comprising the optical filter. In addition, an object of the present invention is to provide a colorant mixture which has excellent solubility and is suitable as a light absorbing component of the above-described resin composition.

As a result of repeated intensive studies with regard to the above-described objects, the present inventor has found that, in a case of forming an optical filter by a composition which includes two or more kinds of squarylium colorants having specific structures and resin, this optical filter can specifically absorb and block light of a target specific wavelength, and also has excellent light resistance. That is, by using two or more squarylium colorants having a specific structure, which include at least one squarylium colorant having a hydrogen-bonding group that firms an intramolecular hydrogen bond, it has been found that it is possible to suppress oxidative decomposition of the squarylium colorant associated with the absorption of light while realizing the absorption of light at a specific wavelength.

The present invention has been completed by further repeating studies on the basis of the above-described finding.

That is, the above-described objects can be achieved by the following methods.

<1> A resin composition comprising.
a colorant; and
a resin.
in which the colorant contains two or more squarylium colorants represented by Formula (1),
at least one of the squarylium colorants is a squarylium colorant represented by Formula (2), and
a colorant mixture consisting of the two or more squarylium colorants, which is included in the resin composition, has a maximum absorption wavelength in a wavelength range of 400 nm to 700 nm.

Formula (1)

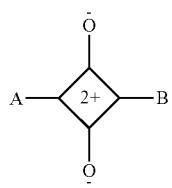

in Formula (1), A and B represent an aryl group, a heterocyclic group, or —CH=G, where G represents a heterocyclic group, and Formula (2)

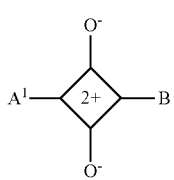

in Formula (2), $A^1$ represents a heterocyclic group having a hydrogen-bonding group which forms an intramolecular hydrogen bond, B represents an aryl group, a heterocyclic group, or —CH=G, where G represents a heterocyclic group, and a structure of the heterocyclic group of B and a structure of the heterocyclic group of $A^1$ are different from each other.

<2> The resin composition according to <1>, in which, in Formulae (1) and (2), the heterocyclic group of A and B and the heterocyclic group of $A^F$ and G are groups consisting of any one of a furan ring, a thiophene ring, an imidazole ring, a pyrazole ring, a thiazole ring, an oxazole ring, a triazole ring, an indolenine ring, an indoline ring, a pyridine ring, a pyrimidine ring, a quinoline ring, a benzothiazole ring, a benzoxazole ring, or a pyrazolotriazole ring.

<3> The resin composition according to <1> or <2>, in which at least one of the squarylium colorants represented by Formula (2) is a squarylium colorant represented by Formula (3), Formula (3)

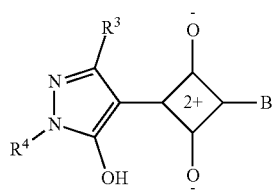

in Formula (3), B has the same meaning as B in Formula (1), $R^3$ and $R^4$ represent a hydrogen atom or a substituent and a structure of the heterocyclic group of B is different from a structure of a pyrazole ring group.

<4> The resin composition according to any one of <1> to <3>, in which the resin is at least one resin of a cellulose acylate resin, a polystyrene resin, an acrylic resin, or a cycloolefin resin.

<5> An optical filter comprising:

the resin composition according to any one of <1> to <4>.

<6> The optical filter according to <5>, in which the optical filter has a film form.

<7> An image display device comprising:

the optical filter according to <5> or <6>.

<8> A solid-state imaging element composing:

the optical filter according to <5> or <6>.

<9> A colorant mixture comprising two or more squarylium colorants represented by Formula (1), in which at least one of the squarylium colorants is a squarylium colorant represented by Formula (2), and the colorant mixture has a maximum absorption wavelength in a wavelength range of 400 nm to 700 nm, Formula (1)

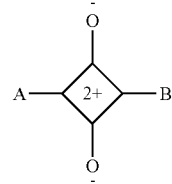

in Formula (1), A and B represent an aryl group, a heterocyclic group, or —CH=G, where G represents a heterocyclic group, and Formula (2)

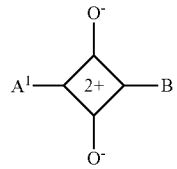

in Formula (2), $A^1$ represents a heterocyclic group having a hydrogen-bonding group which forms an intramolecular hydrogen bond, B represents an aryl group, a heterocyclic group, or —CH=G, where G represents a heterocyclic group, and a structure of the heterocyclic group of B and a structure of the heterocyclic group of $A^1$ are different from each other.

<10> The colorant mixture according to <9>, in which, in Formulae (1) and (2), the heterocyclic group of A and B and the heterocyclic group of $A^1$ and G are groups consisting of any one of a furan ring, a thiophene ring, an imidazole ring, a pyrazole ring, a thiazole ring, an oxazole ring, a triazole ring, an indolenine ring, an indoline ring, a pyridine ring, a pyrimidine ring, a quinoline ring, a benzothiazole ring, a benzoxazole ring, or a pyrazolotriazole ring.

<11> The colorant mixture according to <9> or <10>, in which at least one of the squarylium colorants represented by Formula (2) is a squarylium colorant represented by Formula (3),

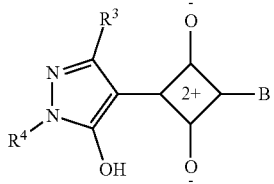

Formula (3)

in Formula (3). B has the same meaning as B in Formula (1), $R^3$ and $R^4$ represent a hydrogen atom or a substituent, and a structure of the heterocyclic group of B is different from a structure of a pyrazole ring group.

In compounds (colorants) represented by chemical structural formulae (general formulae) described in the present invention or the present specification, cations are present in a delocalized manner, and a plurality of tautomer structures is present. Therefore, in the present invention, in a case where at least one tautomer structure of a certain colorant matches a chemical structural formula defined as each formula, the colorant is considered as a colorant represented by the individual general formula. Therefore, a colorant represented by a specific general formula can be said to be a colorant having at least one tautomer structure which can be represented by the specific general formula. In the present invention, a colorant represented by a general formula may have any tautomer structure as long as at least one tautomer structure of the colorant matches the general formula.

In addition, in the present invention, with regard to symmetric and asymmetric squarylium colorants, a case where a conjugated structure of A or $A^1$ bonded to a squaric acid moiety (four-membered ring represented in Formula (1) or Formula (2)) and a conjugated structure of B are the same is referred to as "symmetric", and a case of being different from each other is referred to as "asymmetric". The conjugated structure of A or $A^1$ and the conjugated structure of B mean a conjugated structure which directly bonds to the squaric acid moiety. In addition, the same conjugated structure means that the above-described tautomer structure can adopt the same conjugated structure.

In the present invention, the "a structure of the heterocyclic group of B and a structure of the heterocyclic group of $A^1$ are different from each other" means an aspect in which $A^1$ and B bonded to the squaric acid moiety (four-membered ring represented in Formula (2)) are heterocyclic groups of different hetero rings, and an aspect in which, even in a case where the hetero rings of the heterocyclic groups of $A^1$ and B have the same structure, bonding sites to the squaric acid moiety are different from each other. That is, it means that the structure of the heterocyclic group of B and the structure of the heterocyclic group of $A^1$ cannot adopt the same stricture as a tautomer.

In the present invention, the "a structure of the heterocyclic group of B is different from a structure of a pyrazole ring group" means an aspect in which B bonded to the squaric acid moiety (four-membered ring represented in Formula (3)) is a heterocyclic group which is not a pyrazole ring group, and an aspect in which, even in a case where B is the pyrazole ring group, a bonding site to the squaric acid moiety is different from that of the pyrazole ring group which bonds to the squaric acid moiety represented in Formula (3). That is, it means that the structure of the heterocyclic group of B and the structure of the pyrazole ring group bonded to the squaric acid moiety represented in Formula (3) cannot adopt the same structure as a tautomer.

In the present invention, numerical ranges expressed using "to" include numerical values before and after "to" as the lower limit value and the upper limit value.

In the present in invention, in a case of a plurality of substituents, linking groups, and the like (hereinafter, referred to as a substituent and the like) represented by a specific reference, or in a case of simultaneously or alternatively defining a plurality of the substituent and the like, it means that each of the substituent and the like may be the same as or different from each other. The same applies to the definition of the number of substituents and the like. In a case where a plurality of the substituents and the like is near (particularly, adjacent to each other), it means that the substituents and the like may be linked to each other or condensed to form a ring.

In the present invention, the expression of a compound (colorant) is used to include the compound itself, a salt thereof and an ion thereof. In addition, it means that a part of the structure may be changed as long as the desired effect is not impaired. Examples of the salt of the compound include an aced-addition salt of the compound, formed of the compound and an inorganic acid or an organic acid, and a base-addition salt of the compound, formed of the compound and an inorganic base or an organic base. In addition examples of the ion of the compound include ions generated by dissolving the salt of the compound in water, a solvent, or the like.

In the present specification, regarding a substituent (the same applies to a linking group) in which whether it is substituted or unsubstituted is not specified, within the range not impairing the desired effect, it means that the group may have any substituent. The same applies to a compound or a repeating unit in which whether it is substituted or unsubstituted is not specified.

In the present invention, in a case of defining a number of carbon atoms of a group, the number of carbon atoms means the number of carbon atoms of the entire group. That is, in a case of an aspect in which the group has a substituent, it means the total number of carbon atoms including the substituent.

In the present invention, in the case where a group can form an acyclic skeleton and a cyclic skeleton, unless described otherwise, the group includes an acyclic skeleton group and a cyclic skeleton group. For example, an alkyl group includes, unless described otherwise, a linear alkyl group, a branched alkyl group, and a cyclic (cyclo) alkyl group. In a case where a group forms a cyclic skeleton, the loser limit of the number of carbon atoms in the cyclic skeleton group is preferably 3 or more and more preferably 5 or more, regardless of the lower limit of the number of carbon atoms specifically described for the group.

In the present invention, the term "(meth)acrylic" is used to include both methacrylic and acrylic.

The optical filter according to an aspect of the present invention is capable of blocking light in a specific wavelength range (specifically, 400 nm to 700 nm), such as light of an unnecessary wavelength emitted from a white LED or the like, and has an excellent light resistance. In addition, the image display device and solid-state imaging element according to an aspect of the present invention are excellent in image contrast. In addition, the resin composition according to an aspect of the present invention is suitable as a material for forming the optical filter according to the aspect of the present invention. In addition, the colorant mixture according to an aspect of the present invention has excellent solubility, and can be suitably used as a light absorbing component of the resin composition according to the aspect of the present invention.

BRIEF DESCRIPTION OF THE DRAWINGS

FIG. 1 is a schematic view showing an outline of an embodiment of a liquid crystal display device comprising a polarizing plate which has the optical filter of the present invention in a backlight.

DESCRIPTION OF THE PREFERRED EMBODIMENTS

[Resin Composition]

The resin composition according to the embodiment of the present invention is formed of a specific colorant and a resin as a binder. The specific colorant contains two or more squarylium colorants represented by Formula (1). At least one of these squarylium colorants is a squarylium colorant having a hydrogen-bonding group which forms an intramolecular hydrogen bond, represented by Formula (2) (hereinafter, for convenience, the entire colorant, which is two or more colorants represented by Formula (1) and in which at least a part thereof is the colorant represented by Formula (2), is also referred to as a "squarylium colorant mixture" or a "colorant mixture"). The colorant mixture has a maximum absorption wavelength in a specific wavelength range of visible light.

Since the squarylium colorant has a sharp absorption spectrum and can specifically absorb light in a specific wavelength range, it is considered to be used as a light blocking component in a display and the like having an LED backlight. However, since the squarylium colorant is easily oxidized and decomposed by the absorption of light, it is difficult to apply the squarylium colorant to an image display device or the like, which requires high light resistance. In addition, since the squarylium colorant has a betaine structure, the squarylium colorant is inferior in solubility in an organic solvent. On the other hand, since the resin composition according to the embodiment of the present invention contains the above-described colorant mixture as a light absorbing component, the resin composition according to the embodiment of the present invention overcomes the problem of light resistance while exhibiting the light absorbing function of the squarylium colorant, and solubility of the colorant is increased and handleability as a colorant mixture or a resin composition is improved. The reason is not clear, but is presumed as follows.

In a case where one squarylium colorant is used alone in the resin composition, the colorant usually exhibits high crystallinity, it is known that the square, hum colorant generally has high leveling and has various association states such as H-associate in a case where the concentration of the colorant is increased. It is known that, with the formation of the associate, the absorption spectrum of the colorant broadens and the light resistance is also reduced. However, since the above-described colorant mixture is formed of a combination of two or more squarylium colorants, and each squarylium colorant acts as an association inhibitor to the other, it is considered that the formation of the associate is effectively suppressed and the solubility of the above-described colorant mixture is improved even in a case where the above-described colorant mixture is used at a high concentration. Moreover, due to the suppression of the formation of the associate, the squarylium colorant having a hydrogen-bonding group which forms an intramolecular hydrogen bond, represented by Formula (2), can sufficiently suppress its decomposition by promoting the formation of hydrogen bonds in the molecule. As a result, in the above-described resin composition, it is considered that not only the absorption is sharpened but also the light resistance can be improved to each stage.

As described above, in the resin composition according to the embodiment of the present invention containing two or more specific squarylium colorants including at least one squarylium colorant having a specific structure that has a hydrogen-bonding group which forms an intramolecular hydrogen bond, the excellent solubility of this colorant mixture enhances the handleability of the colorant mixture itself or the resin composition including the colorant mixture. In addition, the resin composition or the colorant mixture included therein also realizes excellent light resistance. Accordingly, the resin composition according to the embodiment of the present invention is suitable as a constituent material of the optical filter (filter including a colorant mixture and a resin) according to the embodiment of the present invention.

<Colorant Mixture>

The colorant mixture included in the resin composition according to the embodiment of the present invention contains two or more squarylium colorants represented by Formula (1), in which at least one of the squarylium colorants is a squarylium colorant represented by Formula (2)

Formula (1)

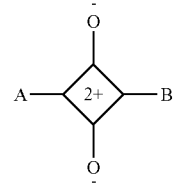

In Formula (1). A and B each independently represent an aryl group, a heterocyclic group, or —CH=G. Cr represents a heterocyclic group.

Formula (2)

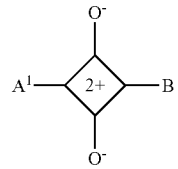

In Formula (2). $A^1$ represents a heterocyclic group having a hydrogen-bonding group (hereinafter, also simply referred to as a "hydrogen-bonding group") which forms an intramolecular hydrogen bond, and B represents an aryl group, a heterocyclic group, or —CH=G. G represents a heterocyclic group. However, a structure of the heterocyclic group of B and a structure of the heterocyclic group of $A^1$ are different from each other.

The intramolecular hydrogen bond of the squarylium colorant represented by Formula (2) is typically formed between the hydrogen-bonding group and an oxygen atom included in the squaric acid moiety (four-membered ring represented in Formula (2)). As a result of suppressing the formation of the associate, the formation of hydrogen bonds within the molecule, not between the molecules, is promoted. Therefore, it is considered that the light resistance can be remarkably improved while sufficiently expressing the original optical characteristics of the colorant mixture.
(Maximum Absorption Wavelength of Squarylium Colorant Mixture)

The colorant mixture included in the resin composition according to the embodiment of the present invention has a maximum absorption wavelength in a wavelength range of 400 nm to 700 nm. Among these, it is preferable to have a maximum absorption wavelength in a wavelength range of 400 nm to 680 nm, it is more preferable to have a maximum absorption wavelength in a wavelength range of 400 nm to 640 nm, it is still more preferable to have a maximum absorption wavelength in a wavelength range of 470 nm to 630 nm, and it is particularly preferable to have a maximum absorption wavelength in a wavelength range of 550 nm to 610 nm.

Since the colorant mixture included in the resin composition according to the embodiment of the present invention has a maximum absorption a wavelength in the above-described specific visible range, the resin composition according to the embodiment of the present invention can be suitably used as a constituent material of an optical filter.

The above-described "maximum absorption wavelength of the squarylium colorant mixture" is a maximum absorption wavelength measured in a solution state of the colorant mixture, and specifically, the maximum absorption wavelength is measured under the conditions described in Examples described later.

In the present invention, having a maximum absorption wavelength in a wavelength range of XX to YY nm means that a wavelength (that is, a maximum absorption wavelength) indicating maximum absorption exists in the wavelength range of XX to YY nm. Therefore, in a case where the maximum absorption wavelength is within the above-described wavelength range, the entire absorption band including this wavelength may be within the above-described wavelength range or may extend be and the above-described wavelength range. In addition, in a case of a plurality of maximum absorption wavelengths, it is sufficient that the maximum absorption wavelength indicating the maximum absorbance exists in the above-described wavelength range. That is, a maximum absorption wavelength other than the maximum absorption wavelength indicating the maximum absorbance may exist in or outside the above-described a wavelength range of XX to YY nm.
(Content Proportion of Each Squarylium Colorant)

In the colorant mixture included in the resin composition according to the embodiment of the present invention, the content proportion of each squarylium colorant is not particularly limited. The content of each colorant can be appropriately adjusted according to the desired optical characteristics. For example, in a case where the resin composition according to the embodiment of the present invention is used in an optical filter constituting a liquid crystal display device, even in a case where a squarylium colorant (colorant (I)) which leads to a desired hue and a squarylium colorant (colorant (II)) having a different hue from the colorant (I) are used in combination, it is preferable to adjust the content of each colorant within a range which does not substantially impair the tint of the colorant (I). By adjusting in this way, compared with an optical filter in the related art, with the resin composition according to the embodiment of the present invention, an optical filter having substantially no difference in appearance and having improved solubility, light resistance, and the like can be obtained.

In the colorant mixture included in the resin composition according to the embodiment of the present invention, as described above, the content proportion of two or more kinds of squarylium colorants is appropriately adjusted according to the desired optical characteristics. From the viewpoint of the effect of suppressing crystal precipitation in a case where the resin composition according to the embodiment of the present invention is formed into a film (hereinafter, also referred to as an "effect of improving planar uniformity"), for example, the content proportion of the squarylium colorant represented by Formula (2) in the total squarylium colorants (100% by mass) represented by Formula (1) is preferably 40% to 99.9% by mass, more preferably 60% to 99.7% by mass, and still more preferably 70% to 99.5% by mass.

The resin composition according to the embodiment of the present invention may include a colorant other than the squarylium colorant mixture of the present invention as long as the effects of the present invention are not impaired. Examples of the colorant other than the squarylium colorant mixture include a squarylium colorant not represented by Formula (1) or Formula (2), a polymethine colorant, an azomethine colorant, a xanthene colorant, a pyromethene colorant, a pyrolopyrrole colorant, a tetraazaporphyrin colorant, a triarylmethane colorant, an anthraquinone colorant, an azo colorant, and a quinacridone colorant.

The proportion of the squarylium colorant mixture in all the colorants contained in the resin composition according to the embodiment of the present invention is preferably 90% to 100% by mass, more preferably 95% to 100% by mass, and still more preferably 98% to 100% by mass.
(Combination of Each Squarylium Colorant)

The combination of each squarylium colorant in the colorant mixture included in the resin composition according to the embodiment of the present invention is not particularly limited as long as it contains at least one squarylium colorant represented by Formula (2). From the viewpoint that the interaction between different squarylium colorants is enhanced, a higher association suppressing effect can be obtained, the solubility and light resistance can be further improved, and a better effect of improving planar uniformity can be obtained, a combination of squarylium colorants having; the same or similar structural parts as a part of the chemical structure is preferable, a combination of squarylium colorants having the same conjugated structure of any one of A or B in Formula (1) (in a case of being represented by Formula (2). $A^1$ or B) is more preferable, and a combination of squarylium colorants in which any one of A or B in Formula (1) (in a case of being represented by Formula (2), $A^1$ or B) has the same structure is still more preferable.

In this case, the same or similar structural part and the same conjugated structure of two or more colorants may have substituents on the structural part or the conjugated structure, the substituents may, be the same or different from each other, the number of substituents mar be the same or different from each other, and the bonding positions of the substituents may be the same or different from each other. The substituent included in these similar structural part or the same conjugated structure are selected without particular limitation as long as the desired effect of the above-described association suppression can be obtained.

In a case where the squarylium colorants in the colorant mixture included in the resin composition according to the embodiment of the present invention are three or more kinds, the aspect of the combination of squarylium colorants exemplified above is preferably an aspect in which, of the combinations of two colorants selected from the three or more kinds of squarylium colorants, at least one combination (preferably a combination of two colorants including the squarylium colorant having the highest content proportion) satisfies the above-described aspect, and is more preferably an aspect in which all squarylium colorants satisfy the above-described aspect in combination with any one of colorants.

Here, the "conjugated structure" means a structure in which single bonds and multiple bonds are connected alternately, and the electrons of the p-orbital of the multiple bonds are delocalized through the single bonds (a structure in which π electron clouds are spread over the single bonds and the multiple bonds which are connected alternately). In addition, the "conjugated structure" also includes a structure including a p-orbital donating group, a p-orbital donating atom, or a p-orbital donating group and a p-orbital donating atom Examples of the p-orbital donating group include a carbonyl group and a sulfonyl group. The p-orbital donating atom is an atom having two lone electron-pairs, one of which occupies a p-orbital, and examples thereof include an oxygen atom, a nitrogen atom, and a sulfur atom. In a case of including a p-orbital donating group and a p-orbital donating atom, examples thereof include a structure of a combination of a plurality (preferably an integer number of 2 to 10) of the p-orbital donating atom and the p-orbital donating group. For example, a divalent group represented by —O—CO—, —NH—CO—, —NH—SO$_2$—, —NH—CO—NH—, and the like is a group which forms the conjugated structure.

Specific examples of a still more preferred combination include a combination of the following main component (the main component means a squarylium colorant having the highest content proportion, and squarylium colorants other than the squarylium colorant are also referred to as a sub-component), which is an asymmetric squarylium colorant, and at least one of the following sub-components 1 to 4 having the same conjugated structure as the main component. Even an asymmetric squarylium colorant having excellent solubility has low light resistance or high crystallinity, precipitation of crystals may be observed in a case where the asymmetric squarylium colorant is molded into a film (for example, an optical filter). By adopting the above-described combination, the solubility and light resistance are further improved by interacting with each other, and the effect of suppressing crystal precipitation and unevenness on the optical filter is also improved.

Here, $A^a$, $B^a$, C, and D have the same meaning as the groups a which can be adopted as A and B in Formula (I), and the groups represented by the same reference numerals (for example, $A^a$ and $A^a$) indicate that the groups have the same conjugated structure. The groups represented by different reference numerals (for example, $A^a$ and $B^a$) are groups having different conjugated structures. That is, among the following main component and sub-components 1 to 4, the squarylium colorant represented by Formula (2) is at least one of the main component or the sub-component 3 or 4. In a case where the main component and sub-components 3 and 4 are the squarylium colorant represented by Formula (2), and two groups bonded to the squaric acid moiety (four-membered ring represented in Formula (2)) are heterocyclic groups, the two groups have the same relationship as $A^1$ and B in Formula (2), and the structures of these heterocyclic groups are different from each other, in addition, the sub-components 1 to 4 may be one kind or two or more kinds, respectively.

Main component
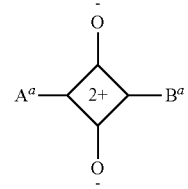

Sub-component 1
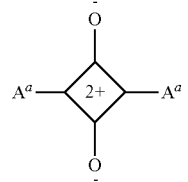

Sub-component 2
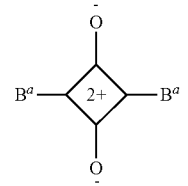

Sub-component 3
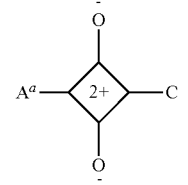

Sub-component 4
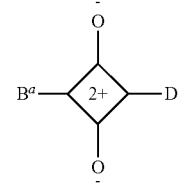

Among these, from the viewpoint that the squarylium colorants act as association inhibitors with each other, the solubility and light resistance are further improved, and the effect of improving planar uniformity is obtained, a combination having at least the main component which is an asymmetric squarylium colorant, and the sub-component 1 or the sub-component 2, which is a symmetric squarylium colorant, is more preferable.

Explaining the combination of the main component and the sub-component 1 as an example, the mechanism is presumed that, while the crystal grows due to the interaction between $A^a$'s in the sub-component 1, the crystal growth is stopped by the presence of $B^a$ having a conjugated structure different from that of $A^a$. As a result, in addition to the effect of improving the solubility of the colorant mixture, the effect of improving planar uniformity is obtained. In addition, it is presumed that the light resistance is also improved by the erect of suppressing formation of intermolecular hydrogen bonds due to the effect of suppressing association.

Furthermore, since the interacting force is strong, a sufficient association suppressing effect is obtained only by including at least 0.1 parts by mass of sub-components with respect to 100 parts by mass of the main component, in a case where the structures of $A^a$ and $B^a$ are different from each other, it is considered that the tints of the main component and the sub-component are usually different from each other. However, as described above, since the sub-component works effectively even with a small content of sub-components, the colorant mixture included in the resin composition according to the embodiment of the present invention is also preferable from the viewpoint of not affecting the hue of the main component.

Hereinafter, preferred structures of the squarylium colorant represented by Formula (1) and the squarylium colorant represented by Formula (2) will be described in detail.

(Squarylium Colorant Represented by Formula (1))

The colorant mixture included in the resin composition according to the embodiment of the present invention contains two or more squarylium colorants (hereinafter, also simply referred to as a "colorant represented by Formula (I)") represented by Formula (1).

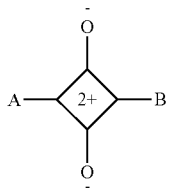

Formula (1)

In Formula (1), A and B each independently represent an aryl group, a heterocyclic group, or —CH=G. G represents a heterocyclic group.

In Formula (1), A and B may be the same as or different from each other. In addition, at least one of A or B is preferably a heterocyclic group. With such a configuration, the oxidation potential is lower and light resistance is improved.

The aryl group which can be adopted as A or B is not particularly limited, and may be a group formed of a single ring or a group formed of a fused ring. The number of carbon atoms in the aryl group is preferably 6 to 30, more preferably 6 to 20, and still more preferably 6 to 12. Examples of the aryl group include groups formed of a benzene ring or a naphthalene ring, and groups formed of a benzene ring are more preferable.

A heterocyclic group which can be adopted as A or B is not particularly limited, examples thereof include groups formed of an aliphatic hetero ring or an aromatic hetero ring, and groups formed of an aromatic hetero ring are preferable. Examples of a heteroaryl group which is an aromatic heterocyclic group include heteroaryl groups which can be adopted as the substituent X described later. The aromatic heterocyclic group which can be adopted as A or B is preferably a group of a five-membered ring or a six-membered ring and more preferably a group of a nitrogen-containing five-membered ring. Specifically, suitable examples thereof include groups formed of any one of a pyrrole ring, a furan ring, a thiophene ring, an imidazole ring, a pyrazole ring, a thiazole ring, an oxazole ring, a triazole ring, an indole ring, an indolenine ring, an indoline ring, a pyridine ring, a pyrimidine ring, a quinoline ring, a benzothiazole ring, a benzoxazole ring, or a pyrazolotriazole ring. Among these, from the viewpoint of further improving light resistance, the heterocyclic group which can be adopted as A or B is preferably a heterocyclic group which does not contain a pyrrole ring (specifically, a group consisting of any one of a furan ring, a thiophene ring, an imidazole ring, a pyrazole ring, a thiazole ring, an oxazole ring, a triazole ring, an indolenine ring, an indoline ring, a pyridine ring, a pyrimidine ring, a quinoline ring, a benzothiazole ring, a benzoxazole ring, or a pyrazolotriazole ring), and more preferably a group consisting of any one of a pyrazole ring, a thiazole ring, a pyridine ring, a pyrimidine ring, or a pyrazolotriazole ring. The pyrazolotriazole ring is formed of a fused ring of a pyrazole ring and a triazole ring, and means a fused ring formed by fusing at least one of each of the rings.

A and B may be bonded to the squaric acid moiety (four-membered ring represented in Formula (1)) at any moiety (ring-constituting atom) without particular limitation, but it is preferable to be bonded to a carbon atom.

G in —CH=G which can be adopted as A or B represents a heterocyclic group which may have a substituent, and suitable examples thereof include examples listed as A and B. Among these, from the viewpoint of further improving light resistance, G in —CH=G which can be adopted as A or B is preferably a heterocyclic group which does not contain a pyrrole ring (specifically, a group consisting of any one of a furan ring, a thiophene ring, an imidazole ring, a pyrazole ring, a thiazole ring, an oxazole ring, a triazole ring, an indolenine ring, an indoline ring, a pyridine ring, a pyrimidine ring, a quinoline ring, a benzothiazole ring, a benzoxazole ring, or a pyrazolotriazole ring), and more preferably a group consisting of any one of a benzoxazole ring, a benzothiazole ring, or an indoline ring.

At least one of A or B may halve a hydrogen-bonding group forming an intramolecular hydrogen bond. However, in a case where at least one of A or B is a heterocyclic group which has a hydrogen-bonding group forming an intramolecular hydrogen bond, the squarylium colorant is classified into the squarylium colorant represented by Formula (2). Here, the hydrogen-bonding group means a functional group capable of forming a hydrogen bond with another functional group. The hydrogen-bonding group can be a donor hydrogen-bonding group having a hydrogen atom (hydrogen bond donator: donor). The donor hydrogen-bonding group may function as an acceptor hydrogen-bonding group in the tautomer.

It is preferable that the hydrogen-bonding group is a group which forms an intramolecular hydrogen bond with an oxygen atom included in the squaric acid moiety (four-membered ring represented in Formula (1)). That is, it is preferable that the hydrogen-bonding group and the oxygen atom included in the squaric acid moiety are at a distance (positional relationship) capable of forming an intramolecular hydrogen bond. A plurality of hydrogen-bonding groups may be included in the colorant represented by Formula (1).

A and B mad have the hydrogen-bonding group as a substituent. In this case, the hydrogen-bonding group is a monovalent group having one linking site. Here, "having a monovalent hydrogen-bonding group having one linking site" means that, within the range not impairing the effects of the present invention, the hydrogen-bonding group may be bonded to A or B through a linking group. In addition, in a case where A and B are ring groups, a ring-constituting atom may be also present as a constituent atom of the hydrogen-bonding group (this aspect also referred to as that the hydrogen-bonding group is incorporated in a ring). In this case, the hydrogen-bonding group may be a divalent group having two linking sites for incorporation as ring-constituting atoms, or may be a trivalent group having three linking sites for incorporation as ring-constituting atoms. The hydrogen-bonding group is not particularly limited as long as the hydrogen-bonding group exhibits a hydrogen-bonding property, examples thereof include a hydrogen-donor group. In a case where the hydrogen-bonding group is bonded as a substituent on A and B, the hydrogen-bonding group is preferably —OH, —SH, —NHR$^{1a}$, or —N$^+$HR$^{1a}$R$^{2a}$, R$^{1a}$ and R$^{2a}$ can be appropriately selected from a hydrogen atom or a substituent which can be adopted as R$^1$ in Formula (3-2) described later.

In a case where the hydrogen-bonding group is incorporated in a ring, the hydrogen-bonding group is preferably —NH— or =N$^+$H—.

Each of A, B, and G may have a substituent X, and in a case where A. B, or G has the substituent X, adjacent substituents may be bonded to each other to further form a ring structure. In addition, each of A, B, and G may have a plurality of substituents.

Examples of the substituent X include substituents which can be adopted as R$^1$ in Formula (3-2) described later, and specific examples thereof include a halogen atom, a cyano group, a nitro group, an alkyl group, an alkenyl group, an alkynyl group, an aryl group, a heteroaryl group, an aralkyl group, a ferrosenyl group, —OR$^{10a}$, —COR$^{11a}$, —COOR$^{12a}$, —OCOR$^{13a}$, —NR$^{14a}$R$^{15a}$, —NHCOR$^{16a}$, —CONR$^{17a}$R$^{18a}$, —NHCONR$^{19a}$R$^{20a}$, —NHCOOR$^{21a}$, —SR$^{22a}$, —SO$_2$R$^{23a}$, —SO$_3$R$^{24a}$, —NHSO$_2$R$^{25a}$, and —SO$_2$NR$^{26a}$R$^{27a}$.

R$^{10a}$ to R$^{27a}$ each independently represent a hydrogen atom, an aliphatic group, an aromatic group, or a heterocyclic group. The aliphatic group and the aromatic group which can be adopted as R$^{10a}$ to R$^{27a}$ are not particularly limited, and can be appropriately selected from the substituents which can be adopted as R$^1$ in formula (3-2) described later. Among these, an alkyl group or an alkenyl group is preferable as the aliphatic group, and an aryl group is preferable as the aromatic group. The heterocyclic group which can be adopted as R$^{10a}$ to R$^{27a}$ may be aliphatic or aromatic, and can be appropriately selected from heteroaryl groups or heterocyclic groups which can be adopted as R$^1$ in Formula (3-2) described later.

In a case where R$^{12a}$ in —COOR$^{12a}$ is a hydrogen atom (that is, a carboy group), the hydrogen atom may be dissociated (that is, a carbonate group) or may be in a state of salt. In addition, in a case where R$^{24a}$ in —SO$_3$R$^{24a}$ is a hydrogen atom (that is, a sulfo group), the hydrogen atom may be dissociated (that is, a sulfonate group) or may be in a state of salt.

Examples of the halogen atom which can be adopted as X include a fluorine atom, a chlorine atom, a bromine atom, and an iodine atom.

The number of carbon atoms in the alkyl group which can be adopted as X is preferably 1 to 20, more preferably 1 to 15, and still more preferably 1 to 8. The number of carbon atoms in the alkenyl group is preferably 2 to 20, more preferably 2 to 12, and still more preferably 2 to 8. The number of carbon atoms in the alkynyl group is preferably 2 to 40, more preferably 2 to 30, and particularly preferably 2 to 25. Each of the alkyl group, the alkenyl group, and the alkynyl group may be linear, branched, or cyclic, and is preferably linear or branched.

The aryl group a which can be adopted as X includes a group of a single ring or a fused ring. The number of carbon atoms in the aryl group is preferably 6 to 30, more preferably 6 to 20, and still more preferably 6 to 12.

An alkyl portion in the aralkyl group (alkyl-substituted aryl group) which can be adopted as X is the same as the above-described alkyl group. An aryl portion in the aralkyl group is the same as the above-described aryl group. The number of carbon atoms in the aralkyl group is preferably 7 to 40, more preferably 7 to 30, and still more preferably 7 to 25.

The heteroaryl group which can be adopted as X includes a group formed of a single ring or a fused ring, and a group formed of a single ring or a fused ring having 2 to 8 rings is preferable and a group formed of a single ring or a fused ring having 2 to 4 rings is more preferable. The number of hetero atoms constituting a ring of the heteroaryl group is preferably 1 to 3. Examples of the hetero atoms constituting the ring of the heteroaryl group include a nitrogen atom, an oxygen atom, and a sulfur atom. The heteroaryl group is preferably a group formed of a five-membered ring or a six-membered ring. The number of carbon atoms constituting the ring of the heteroaryl group is preferably 3 to 30, more preferably 3 to 18, and still more preferably 3 to 12. Examples of the heteroaryl group include groups formed of a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring, or a thiadiazole ring.

The ferrosenyl group which can be adopted as X is preferably represented by Formula (2M)

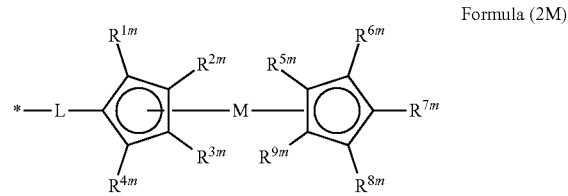

Formula (2M)

In Formula (2M), L represents a single bond or a divalent linking group which is not conjugated with A, B, or G in Formula (1). R$^{1m}$ to R$^{9m}$ respectively represent a hydrogen atom or a substituent. M is an atom capable of from the metallocene compound, and represents Fe, Co, Ni, Ti, Cu, Zn, Zr, Cr, Mo, Os, Mn, Ru, Sn, Pd, Rh, V, or Pt. * represents a bonding part with A, B, or G.

In the present invention, in a case where L in Formula (2M) is a single bond, a cyclopentadienyl ring (ring having R$^{1m}$ in Formula (2M)) directly bonded to A, B, or G is not included in the conjugated structure conjugated with A, B, or G.

The divalent linking group which can be adopted as L is not particularly limited as long as a linking group which is not conjugated with A, B, or G, and the above-described conjugated structure may be included inside the divalent linking group or in an end portion of a cyclopentadiene ring in Formula (2M). Examples of the divalent linking group include an alkylene group having 1 to 20 carbon atoms, art arylene group having 6 to 20 carbon atoms, a divalent heterocyclic group obtained by removing two hydrogen atoms from a hetero ring. —CH═CH—, —CO—, —CS—, —NR— (R represents a hydrogen atom or a monovalent substituent), —O—, —S—, —SO$_2$—, —N═CH—, and a linking group, among divalent linking groups formed of a combination of a plurality (preferably 2 to 6) of groups selected from the group consisting thereof. A group selected from the group consisting of an alkylene group having 1 to 8 carbon atoms, an arylene group having 6 to 12 carbon atoms, —CH=CH—, —CO—, —NR— (R is as defined above), —O—, —S—, —SO$_2$—, and —N=CH—, or a divalent linking group of a combination of two or more (preferably an integer number of 2 to 6) groups selected from the group consisting thereof is preferable, and a group selected from the group consisting of an alkylene group having 1 to 4 carbon atoms, a phenylene group, —CO—, —NH—, —O—, and —SO$_2$—, or a linking group of a combination of two or more (preferably an integer number of 2 to 6) groups selected from the group consisting thereof is particularly preferable. The divalent linking group of a combination is not particularly limited, but is preferably a group including —CO—, —NH—, —O—, or —SO$_2$—. Examples thereof include a linking group formed of a combination of two or more of —CO—, —NH—, —O—, and —SO$_2$— and linking groups formed of at least one of —CO—, —NH—, —O—, or —SO$_2$—, and an alkylene group or an arylene group. Examples of the linking group formed of a combination of two or more of —CO—, —NH—, —O—, and —SO$_2$— include —COO—, —OCO—, —CONH—, —NHCOO—, —NHCONH—, or —SO$_2$NH—. Examples of the linking group formed of at least one of —CO—, —NH—, —O—, or —SO$_2$—, and an alkylene group or an arylene group include a linking group of a combination of —CO—, —COO—, or —CONH—, and an alkylene group or an arylene group.

The substituent which can be adopted as R is not particularly limited, and has the same meaning as the substituent X which may be included in A in Formula (2).

L is preferably a single bond, a group selected from the group consisting of an alkylene group having 1 to 8 carbon atoms, an arylene group having 6 to 12 carbon atoms, —CH=CH—, —CO—, —NR— (R is as defined above), —O—, —S—, —SO$_2$—, and —N=CH—, or a group of a combination of two or more groups selected from the group consisting thereof.

L may have one or a plurality of substituents. The substituent which may be included in L is not particularly limited, and has the same meaning, for example, as the above-mentioned substituent X. In a case where t, has a plurality of substituents, substituents bonded to an adjacent atom may be bonded to each other to further form a ring structure.

The alkylene group which can be adopted as L is may be linear, branched, or cyclic, as long as the alkylene group has carbon atoms in a range of 1 to 20. Examples thereof include methylene, ethylene, propylene, methylethylene, methylmethylene, dimethylmethylene, 1,1-dimethylethylene, butylene, 1-methylpropylene, 2-methylpropylene, 1,2-dimethylpropylene, 1,3-dimethylpropylene, 1-methylbutylene, 2-methylpropylene, 3-methylbutylene, 4-methylbutylene, 2,4-dimethylbutylene, 1,3-dimethylbutylene, pentylene, hexylene, heptylene, octylene, ethane-1,1-diyl, propane-2,2-diyl, cyclopropane-1,1-diyl, cyclopropane-1,2-diva, cyclobutane-1,1-diyl, cyclobutane-1,2-diyl, cyclopentane-1,1-diyl, cyclopentane-1,2-diyl, cyclopentane-1,3-diyl, cyclohexane-1,1-diyl, cyclohexane-1,2-diyl, cyclohexane-1,3-diyl, cyclohexane-1,4-diyl, and methylcyclohexane-1,4-diyl.

In a case where a linking group including at least one of —CO—, —CS—, —NR— (R is as defined above), —O—, —S—, —SO$_2$—, or —N=CH— is adopted in an alkylene group as L, the group of —CO— and the like may be incorporated at any position in the alkylene group, and the number to be incorporated is not particularly limited.

The arylene group which can be adopted as L is not particularly limited as long as a group having carbon atoms in a range of 6 to 20, and examples thereof include a group obtained by further removing one hydrogen atom from each group exemplified as the aryl group which can be adopted as A in Formula (1) and has 6 to 20 carbon atoms.

The heterocyclic group which can be adopted as L is not particularly limited, and examples thereof include a group obtained by further removing one hydrogen atom from each group exemplified as the heterocyclic group which can be adopted as A.

In Formula (2M), the remaining partial structure excluding the linking group L corresponds to a structure (metallocene structural part) in which one hydrogen atom is removed from a metallocene compound. In the present invention, a known metallocene compound can be used, without particular limitation, as the metallocene compound which is the metallocene structural part, as long as a compound (compound having a hydrogen atom bonded in place of L) accommodate with the partial structure defined by Formula (2M). Hereinafter, the metallocene structural part defined by Formula (2M) will be specifically described.

In Formula (2M), $R^{1m}$ to $R^{9m}$ respectively represent a hydrogen atom or a substituent. The substituent which can be adopted as $R^{1m}$ to $R^{9m}$ is not particularly limited, but for example, can be selected from the substituents which can be adopted as $R^1$ in Formula (3-2). Each of $R^{1m}$ to $R^{9m}$ is preferably a hydrogen atom, a halogen atom, an alkyl group, an acyl group, an alkoxy group, an amino group, or an amide group, more preferably a hydrogen atom, a halogen atom, an alkyl group, an acyl group, or an alkoxy group, still more preferably a hydrogen atom, a halogen atom, an alkyl group, or an acyl group, particularly preferably a hydrogen atom, a halogen atom, or an alkyl group, and most preferably a hydrogen atom.

Among the alkyl groups which can be adopted as $R^1$, the alkyl group which can be adopted as $R^{1m}$ to $R^{9m}$ is preferably an alkyl group having 1 to 8 carbon atoms, and examples thereof include methyl, ethyl, propyl, isopropyl, butyl, sec-butyl, tert-butyl, isobutyl, pentyl, tert-pentyl, hexyl, octyl, and 2-ethylhexyl.

The alkyl group may have a halogen atom as a substituent Examples of the alkyl group substituted with a halogen atom include chloromethyl, dichloromethyl, trichloromethyl, bromomethyl, dibromomethyl, tribromomethyl, fluoromethyl, difluoromethyl, trifluoromethyl, 2,2,2-trifluoroethyl, perfluoroethyl, perfluoropropyl, and perfluorobutyl.

In addition, in the alkyl group which can be adopted as $R^{1m}$ and the like, at least one methylene group forming a carbon chain may be substituted with —O— or —CO—. Examples of the alkyl group in which a methylene group is substituted with —O— include an alkyl group in which a terminal methylene group is substituted, such as methoxy, ethoxy, propoxy, isopropoxy, butoxy, secondary butoxy, tertiary butoxy, 2-methoxyethoxy, chloroethyloxy, dichloromethyloxy, trichloromethyloxy, bromomethyloxy, dibromomethyloxy, tribromomethyloxy, fluoromethyloxy, difluoromethyloxy, trifluoromethyloxy, 2,2,2-trifluoroethyloxy, perfluoroethyloxy, perfluoropropyloxy, and perfluorobutyloxy, and an alkyl group in which an internal methylene group of a carbon chain is substituted, such as 2-methoxyethyl. Examples of the alkyl group in a hick a methylene group is substituted with —CO— include acetyl, propionyl, monochloroacetyl, dichloroacetyl, trichloroacetyl, trifluoroacetyl, propan-2-ones-1-yl, and butan-2-one-1-yl.

In Formula (2M), M is an atom capable of from the metallocene compound, and represents Fe, Co, Ni, Ti, Cu, Zn, Zr, Cr, Mo, Os, Mn, Ru, Sn, Pd, Rh, V, or Pt. Among these. M is preferably Fe, Ti, Co, Ni, Zr, Ru, or Os, more preferably Fe, Ti, Ni, Ru, or Os, still more preferably Fe or Ti, and most preferably Fe.

The group represented by Formula (2M) is preferably a group of a combination of preferred L, $R^{1m}$ to $R^{9m}$, and M, and examples thereof include a group of a combination of, as L, a single bond, a group selected from the group consisting of an alkylene group having 2 to 8 carbon atoms, an arylene group having 6 to 12 carbon atoms. —CH=CH—, —CO—, —NR— (R is as defined above), —O—, —S—, —SO$_2$—, and —N=CH—, or a group of a combination of two or more groups selected from the group consisting thereof, as $R^{1m}$ to $R^{9m}$, a hydrogen atom, a halogen atom, an alkyl group, an acyl group, or an alkoxy group, and as M, Fe.

Each of the alkyl group, the alkenyl group, the alkynyl group, the aralkyl group, the aryl group, and the heteroaryl group exemplified as the examples of the substituent X may further have a substituent or may be unsubstituted. The substituent which may be further included is not particularly limited, but is preferably a substituent selected from an alkyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, an alkylthio group, an arylthio group, an aromatic heterocyclic thio group, a sulfonyl group, a hydroxy, group, a mercapto group, a halogen atom, a cyano group, a sulfa group, and a carboxy group, and more preferably a substituent selected from an alkyl group, an aryl group, an alkoxy group, an aryloxy group, an aromatic heterocyclic oxy group, an acyl group, an alkoxycarbonyl group, an aryloxycarbonyl group, an acetyloxy group, an alkylthio group, an arylthio group, an aromatic heterocyclic this, group, a sulfonyl group, a hydroxy group, a mercapto group, a halogen atom, a cane group, a sulfo group, and a carboxy group. These groups can be appropriately selected from the substituents which can be adopted as $R^1$ in Formula (3-2) described later.

(Squarylium Colorant Represented by Formula (2))

In the colorant mixture included in the resin composition according to the embodiment of the present invention, at least one of the colorants represented by Formula (1) is a squarylium colorant represented by Formula (2) (hereinafter, also simply referred to as a "colorant represented by Formula (2)"). As long as the colorant represented by Formula (2) is at least one kind of colorant, the colorant represented by Formula (2) may be two or more kinds thereof. In addition, in the colorant mixture included in the resin composition according to the embodiment of the present invention, all the colorants represented by Formula (1) may be the colorant represented by Formula (2).

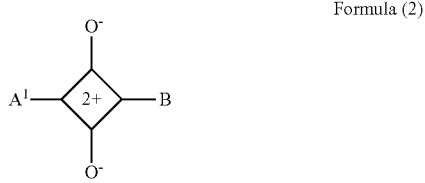

Formula (2)

In Formula (2). $A^1$ represents a heterocyclic group having a hydrogen-bonding group which forms an intramolecular hydrogen bond, and B represents an au group, a heterocyclic group, or —CH=G. G represents a heterocyclic group. However, a structure of the heterocyclic group of B and a structure of the heterocyclic group of $A^1$ are different from each other.

The heterocyclic group in the heterocyclic group having a hydrogen-bonding group which forms an intramolecular hydrogen bond, which can be adopted as $A^1$, has the same meaning as the heterocyclic group which can be adopted as A and B in Formula (1).

The hydrogen-bonding group forming an intramolecular hydrogen bond, which can be adopted as $A^1$, has the same meaning as the hydrogen-bonding group forming an intramolecular hydrogen bond, which may be included in A and B in Formula (1).

The aryl group, heterocyclic group, and —CH=G, which can be adopted as B, have the same meaning as the aryl group, heterocyclic group, and —CH=G, which can be adopted as B in Formula (1).

Examples of a preferred embodiment of the colorant represented by Formula (2) include a squarylium colorant represented by Formula (2-1) or Formula (2-2) (hereinafter, also simply referred to as a "colorant represented by Formula (2-1) or Formula (2-2)").

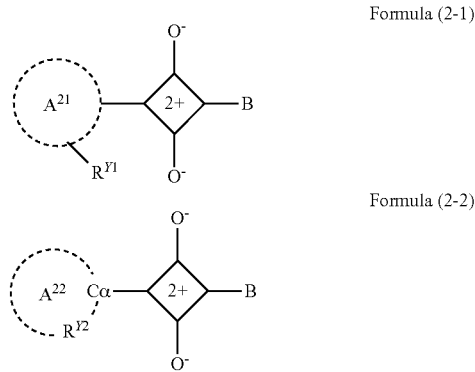

In Formula (2-1), a ring $A^{21}$ represents a hetero ring, and $R^{Y1}$ represents a monovalent hydrogen-bonding group which forms an intramolecular hydrogen bond. B has the same meaning as B in Formula (2). However, a structure of the heterocyclic group of B and a structure of the heterocyclic group of the ring $A^{21}$ are different from each other.

In Formula (2-2), a ring $A^{22}$ represents a hetero ring, and Cα represents a carbon atom, a nitrogen atom, an oxygen atom, or a sulfur atom. $R^{Y2}$ represents an atomic group which forms the ring $A^{22}$ together with Cα and includes a divalent or trivalent hydrogen-bonding group as a ring-constituting atom. B has the same meaning as B in Formula (2). However, a structure of the heterocyclic group of B and a structure of the heterocyclic group of the ring $A^{22}$ are different from each other.

As the hetero ring which can be adopted as the ring $A^{21}$, the description of the heterocyclic ring in the heterocyclic group which can be adopted as $A^1$ in Formula (2) can be preferably applied.

The monovalent hydrogen-bonding group which can be adopted as $R^{Y1}$ means that, within the range not impairing the effects of the present invention, the hydrogen-bonding group may be bonded to the ring $A^{21}$ through a linking group. $R^{Y1}$ is not particularly limited as long as $R^{Y1}$ exhibits a hydrogen-bonding property, but is preferably —OH, —SH, —NHR$^{1a}$, or —N$^+$HR$^{1a}$R$^{2a}$. R$^{1a}$ and R$^{2a}$ can be appropriately selected from a hydrogen atom or a substituent which can be adopted as R$^1$ in Formula (3-2) described later, and are preferably —COR$^{c1}$, —COR$^{c2}$COR$^{c3}$, —CONR$^{c4}$R$^{c5}$, or the like. R$^{c1}$, R$^{c3}$, R$^4$, and R$^{c5}$ have the same meaning as and are each independently preferably a hydrogen atom, an alkyl group, an alkenyl group, or an aryl group. R$^{c2}$ represents a divalent aliphatic group, and is preferably an alkylene group having 1 to 3 carbon atoms.

In Formula (2-1), it is preferable that R$^{Y1}$ forms an intramolecular hydrogen bond with one oxygen atom of to oxygen atoms of the squaric acid moiety to which the ring A$^{21}$ is bonded (the squaric acid moiety means a structural moiety of the four-membered ring represented in Formula (2); hereinafter, simply referred to as a "four-membered ring"). By forming a hydrogen bond with one oxygen atom of the two oxygen atoms bonded to the four-membered ring which is bonded to the ring A$^{21}$, R$^{Y1}$ preferably forms a six to eight-membered ring structure (a hydrogen atom forming a hydrogen bond is also counted as a ring-constituting atom; the same applies hereinafter), and more preferably forms a seven-membered ring structure (that is, it is preferable that, among the ring-constituting atoms of the ring A$^{21}$, a ring-constituting atom adjacent to a ring-constituting atom bonded to the four-membered ring has, as a substituent, the hydrogen-bonding group R$^{Y1}$ without a linking group).

The hetero ring which can be adopted as the ring A$^{21}$ may further have the substituent X. Specific examples of the substituent X are the same as the specific examples of the substituent X which may be included in A and B in Formula (1).

As the hetero ring which can be adopted as the ring A$^{22}$, the description of the hetero ring in the heterocyclic group which can be adopted as A$^1$ in Formula (2) can be preferably applied as long as the ring A$^{22}$ has a divalent or trivalent hydrogen-bonding group as a ring-constituting; atom.

Cα is preferably a carbon atom.

The divalent or trivalent hydrogen-bonding group which can be included in the atomic group of R$^{Y2}$ is preferably —NH— or =N$^+$H—.

In Formula (2-2), it is preferable that the hydrogen-bonding group which can be included in the atomic group of R$^{Y2}$ forms an intramolecular hydrogen bond with one oxygen atom of two oxygen atoms bonded to the four-membered ring which is bonded to the ring A$^{22}$. By forming a hydrogen bond with one oxygen atom of two oxygen atoms bonded to the four-membered ring which is bonded to the ring A$^{22}$, the hydrogen-bonding group which can be included in the atomic group of R$^{Y2}$ preferably forms a six to eight-membered ring structure and more preferably forms a six-membered ring structure (that is, it is preferable that, among the ring-constituting atoms of the ring A$^{22}$, a ring-constituting atom adjacent to a ring-constituting atom bonded to the four-membered ring is the divalent or trivalent hydrogen-bonding group which can be included in the atomic group of R$^{Y2}$). The ring A$^{22}$ may be a single ring or a fused ring, but is preferably a single ring.

The hetero ring which can be adopted as the ring A$^{22}$ may further have the substituent X. Specific examples of the substituent X are the same as the specific examples of the substituent X which may be included in A and B in Formula (1).

The colorant represented by Formula (2-1) corresponds to a colorant having the hydrogen-bonding group as a substituent on A$^1$ in Formula (2). In addition. Formula (2-2) corresponds to a colorant incorporating the hydrogen-bonding group in the ring of A$^1$ in Formula (2).

Examples of a more preferred embodiment of the colorant represented by Formula (2) include a squarylium colorant represented by Formula (3) (hereinafter, also simply referred to as a "colorant represented by Formula (3)").

That is, in the resin composition according to the embodiment of the present invention, it is preferable that at least one of the squarylium colorants represented by Formula (2), which are contained in the composition, is the squarylium colorant represented by Formula (3).

Formula (3)

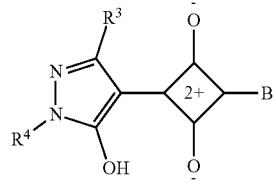

In Formula (3). R$^3$ and R$^4$ each independently represent a hydrogen atom or a substituent. The substituent which can be adopted as R$^3$ and R$^4$ is not particularly limited, and the same substituent a hick can be adopted as R$^1$ in Formula (3-2) described later can be exemplified.

However, the substituent which can be adopted as R$^3$ is preferably an alkyl group, an alkoxy group, an amino group, an amide group, a sulfonamide group, a cyano group, a nitro group, an aryl group, a heteroaryl group, a heterocyclic group, a ferrosenyl group, an alkoxycarbonyl group, a carbamoyl group, or a halogen atom, more preferably an alkyl group, an aril group, or an amino group, and still more preferably an alkyl group.

The substituent which can be adopted as R$^4$ is preferably an alkyl group, an aryl group, a heteroaryl group, a heterocyclic group, an alkoxy group, an alkoxycarbonyl group, an acyl group, an acyloxy group, an amide group, a carbamoyl group, an amino group, or a cyano group, more preferably an alkyl group, an alkoxycarbonyl group, an acyl group, a carbamoyl group, or an aryl group, and still more preferably an alkyl group.

The alkyl group which can be adopted as R$^3$ and R$^4$ may be linear, branched, or cyclic and is preferably linear or branched.

The number of carbon atoms in the alkyl group which can be adopted as R$^3$ is preferably 1 to 18, more preferably 1 to 12, and most preferably 1 to 6. Examples thereof include methyl, ethyl, n-propyl, isopropyl, t-butyl, 2-methylbutyl, 2-ethylhexyl, t-pentyl, neopentyl, 3,5,5-trimethylhexyl, cyclopentyl, cyclohexyl, hexyl, octyl, 1-cyclohexylethyl, 1-cyclohexylpropyl, dicyclohexylmethyl, decyl, dodecyl, hexyldecyl, and hexyloctyl, and methyl, ethyl, n-propel, isopropyl, t-butyl, 2-methylbutyl, cyclopentyl, cyclohexyl, or hexyl is preferable.

The number of carbon atoms in the alkyl group which can be adopted as R$^4$ is preferably 1 to 24 and more preferably 3 to 18. Examples of the alkyl group include methyl, ethyl, n-propyl, isopropyl, t-butyl, 2-methylbutyl, 2-ethylhexyl, t-pentyl, neopentyl, 3,5,5-trimethylhexyl, cyclopentyl, cyclohexyl, hexyl, octyl, 1-cyclohexylethyl, 1-cyclohexylpropyl, dicyclohexylmethyl, decyl, dodecyl, hexyldecyl, and hexyloctyl, and isopropyl, t-butyl, t-pentyl, neopentyl, cyclohexyl, dicyclohexylmethyl, or 2-ethylhexyl is preferable.

The alkyl group mas further have a substituent, and for example, the substituent include can be arbitrarily selected from the groups which can be adopted as the above-described substituent X.

In Formula (3). B has the same meaning as B in Formula (1). However, a structure of the heterocyclic group of B is different from that of the pyrazole ring group.

Examples of a preferred embodiment of the colorant represented by Formula (2) or Formula (3) include a colorant represented by Formula (3-2).

Formula (3-2)

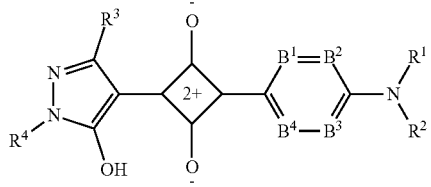

In Formula (3-2), $R^1$ and $R^2$ each independently represent a hydrogen atom or a substituent. $R^1$ and $R^2$ may be the same as or different from each other, and may be bonded to each other to form a ring.

The substituent which can be adopted as $R^1$ and $R^2$ is not particularly limited, and examples thereof include alkyl groups (such as a methyl group, an ethyl group, a propyl group, an isopropyl group, a butyl group, a t-butyl group, an isobutyl group, a pentyl group, a hexyl group, an octal group, a dodecyl group, and a trifluoromethyl group), cycloalkyl groups (such as a cyclopentyl group and a cyclohexyl group), alkenyl groups (such as a vinyl group and an allyl group), alkynyl groups (such as an ethynyl group and a propargyl group), aryl groups (such as a phenyl group and a naphthyl group), heteroaryl groups (such as a furyl group, a thienyl group, a pyridyl group, a pyridazyl group, a pyrimidyl group, a pyrazyl group, a triazyl group, an imidazolyl group, a pyrazolyl group, a thiazolyl group, a benzimidazolyl group, a benzoxazolyl group, a benzothiazolyl group, a quinazolyl group, and a phthalazyl group), heterocyclic groups (such as a pyrrolidyl group, an imidazolidyl group, a morphohyl group, and an oxazolidyl group), alkoxy groups (such as a methoxy group, an ethoxy group, and a propyloxy group), cycloalkoxy groups (such as a cyclopentyloxy group and a cyclohexyloxy group), aryloxy groups (such as a phenoxy group and a naphthyloxy group), heteroaryloxy groups (aromatic heterocyclic ox group), alkylthio groups (such as a methylthio group, an ethylthio group, and a propylthio group), cycloalkylthio groups (such as a cyclopentylthio group and a cycl hexylthio group), arylthiol groups (such as a phenylthio group and a naphthylthio group), heteroarylthio groups (aromatic heterocyclic thin group), alkoxycarbonyl groups (such as methyloxycarbonyl group, an ethyloxycarbonyl group, a butyloxycarbonyl group, and an octyloxycarbonyl group), aryloxycarbonyl groups (such as a phenyloxycarbonyl group and a naphthyloxycarbonyl group), phosphoryl groups (such as dimethoxyphosphoryl group and diphenylphosphoryl group), sulfamoyl groups (such as an aminosulfonyl group, a methylaminosulfonyl group, a dimethylaminosulfonyl group, a butylaminosulfonyl group, a cyclohexylaminosulfonyl group, an octylaminosulfonyl group, a phenylaminosulfonyl group, and a 2-pyridylaminosulfonyl group), acyl groups (such as an acetyl group, an ethylcarbonyl group, a propylcarbonyl group, a cyclohexylcarbonyl group, an octylcarbonyl group, a 2-ethylhexylcarbonyl group, a phenylcarbonyl group, a naphthylcarbonyl group, and a pyridylcarbonyl group), acyloxy groups (such as an acetyloxy group, an ethylcarbonyloxy group, a butylcarbonyloxy group, an octylcarbonyloxy group, and a phenylcarbonyloxy group), acylamino groups (such as an acetylamino group, an ethylcarbonylamino group, a butylcarbonylamino group, an octylcarbonylamino group, and a phenylcarbonylamino group), amide groups (such as a methylcarbonylamino group, an ethylcarbonylamino group, a dimethylcarbonylamino group, a propylcarbonylamino group, a pentylcarbonylamino group, a cyclohexylcarbonylamino group, a 2-ethylhexylcarbonylamino group, an octylcarbonylamino group, a dodecylcarbonylamino group, a phenylcarbonylamino group, and a naphthylcarbonylamino group), sulfon (amide groups (such as a methylsulfonylamino group, an octylsulfonylamino group, a 2-ethylhexylsulfonylamino group, and a trifluoromethylsulfonylamino group), carbamoyl groups (such as an aminocarbonyl group, a methylaminocarbonyl group, a dimethylaminocarbonyl group, a propylaminocarbonyl group, a pentylaminocarbonyl group, a cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group, and a 2-pyridylaminocarbonyl group), ureido groups (such as a methylureido group, an ethylureido group, a pentylureido group, a cyclohexylureido group, an octylureido group, a dodecylureido group, a phenylureido group, a naphthylureido group, and a 2-pyridylaminoureido group), alkylsulfonyl groups (such as a methylsulfonyl group, an ethylsulfonyl group, a butylsulfonyl group, a cyclohexylsulfonyl group, and a 2-ethylhexylsulfonyl group), arylsulfonyl groups (such as a phenylsulfonyl group, a naphthylsulfonyl group, and a 2-pyridylsulfonyl group), amino groups (such as an amino group, an ethylamino group, a dimethylamino group, a butylamino group, a dibutylamino group, a cyclopentylamino group, a 2-ethylhexylamino group, a dodecylamino group, an anilino group, a naphthylamino group, and a 2-pyridylamino group, alkylsulfonyloxy groups (methanesulfonyloxy group), a cyano group, a nitro group, halogen atoms (such as a fluorine atom, a chlorine atom, and a bromine atom), a hydroxy group, a sulfo group, and a carboxy group.

Among these, an alkyl group, an alkenyl group, an aryl group, or a heteroaryl group is preferable, an alkyl group, an group, or a heteroaryl group is more preferable, and an alkyl group is still more preferable.

The substituent which can be adopted as $R^1$ and $R^2$ may further have a substituent. Examples of the substituent which may be further included include the above-described substituents which can be adopted as $R^1$ and $R^2$. In addition, to form a ring, $R^1$ and $R^2$ may be bonded to each other, or may be bonded with a substituent which is included in $B^2$ or $B^3$. As the ring formed at this time, a hetero ring or a heteroaryl ring is preferable. The size of the ring formed is not particularly limited, but a five-membered ring or a six-membered ring is preferable.

In formula (3-2). $B^1$, $B^2$, $B^3$, and $B^4$ each independently represent a carbon atom or a nitrogen atom. The ring including $B^1$, $B^2$, $B^3$, and $B^4$ is an aromatic ring. It is preferable that at least two or more of $B^1$ to $B^4$ are carbon atoms, and it is more preferable that all of $B^1$ to $B^4$ are carbon atoms.

The carbon atom which can be adopted as $B^1$ to $B^4$ has a hydrogen atom or a substituent. Among carbon atoms which can be adopted as $B^1$ to $B^4$, the number of carbon atoms having a substituent is not particularly limited, but is preferably 0, 1, or 2 and more preferably 1. In particular, it is preferable that $B^1$ and $B^4$ are carbon atoms and at least one has a substituent.

The substituent included in the carbon atom which can be adopted as $B^1$ to $B^4$ is not particularly limited, and examples thereof include the above-described substituents which can be adopted as $R^1$ and $R^2$, among these, an alkyl group, an alkoxy group, an alkoxycarbonyl group, an aryl group, an acyl group, an amide group, an acylamino group, a sulfonylamide group, a carbamoyl group, an alkylsulfonyl group, an arylsulfonyl group, an amino group, a cyano group, a nitro group, a halogen atom, or a hydroxy group is preferable, and an alkyl group, an alkoxy group, an alkoxycarbonyl group, an aryl group, an acyl group, an amide group, an acylamino group, a sulfonylamide group, a carbamoyl group, an amino group, a cyano group, a nitro group, a halogen atom, or a hydroxy group is more preferable.

As the substituent included in the carbon atom which can be adopted as $B^1$ and $B^4$, an alkyl group, an alkoxy group, a hydroxy group, an amide group, an acylamino group, a sulfonylamide group, or a carbamoyl group is still more preferable, and an alkyl group, an alkoxy group, a hydroxy group, an amide group, an acylamino group, or a sulfonylamide group is particularly preferable, and a hydroxy group, an amide group, an acylamino group, or a sulfonylamide group is most preferable.

As the substituent included in the carbon atom which can be adopted as $B^2$ and $B^3$, an alkyl group, an alkoxy group, an alkoxycarbonyl group, an acyl group, an amino group, a cyano group, a nitro group, or a halogen stain is still more preferable, and it is particularly preferable that the substituent in an one of B or B is an electron-withdrawing group (for example, an alkoxycarbonyl group, an acid group, a cyano group, a nitro group, or a halogen atom).

In Formula (3-2). $R^3$ and $R^4$ each independently represent a hydrogen atom or a substituent, and have the same meaning as $R^3$ and $R^4$ in Formula (3).

As the squarylium colorant used in the present invention, a squarylium colorant represented by any one of Formula (1), (2), (2-1), (2-2), (3), or (3-2) can be used without particular limitation. Examples thereof include compounds described in JP2006-160018A. WO2004/005981A, WO2004/007447A. Dyes and Pigment, 2001, 49. pp. 161 to 179. WO2008/090757A, WO2005/121098A, and JP2008-275726A.

Hereinafter, preferred specific examples of the colorant represented by Formula (1) (including the colorant represented by Formula (2)) will be shown. However, the present invention is not limited thereto.

In the following specific examples. Me represents methyl, Et represents ethyl. Bu represents butyl, and Ph represents phenyl, respectively

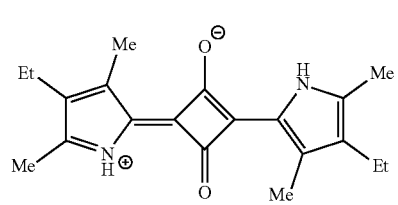

A-1

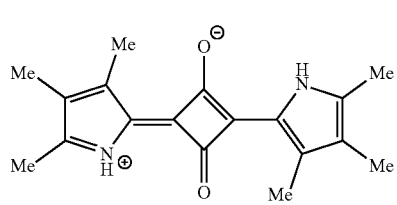

A-2

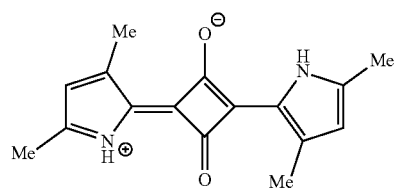

A-3

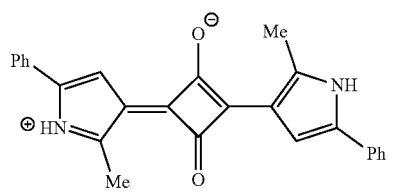

A-4

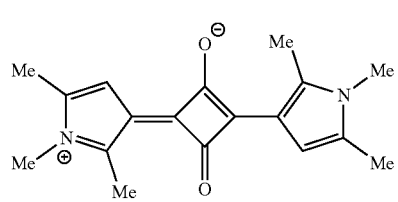

A-5

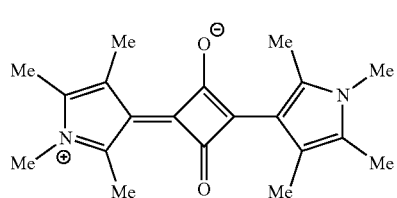

A-6

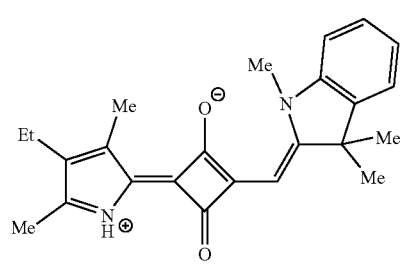

A-7

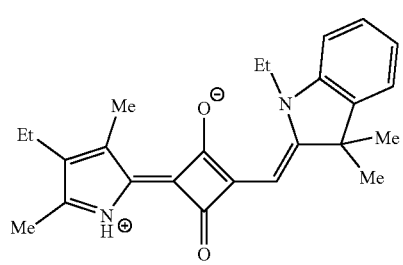

A-8

-continued
A-9
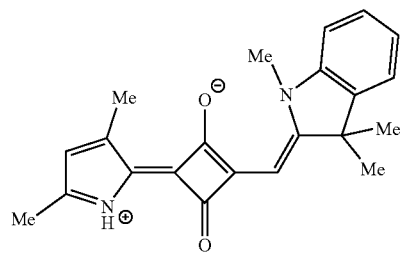
A-10
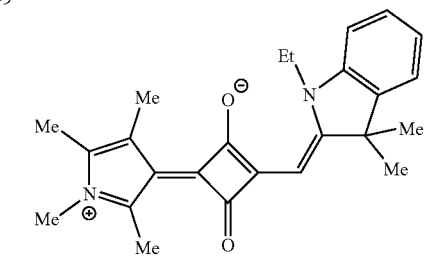
A-11
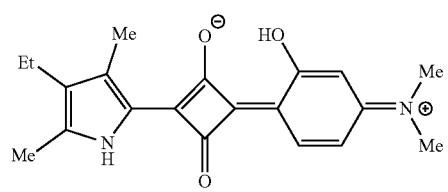
A-12
A-13
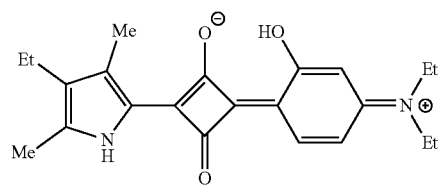
A-14
A-15
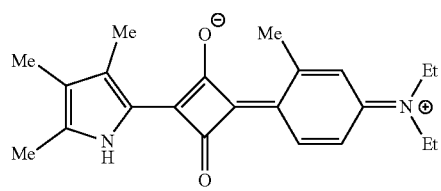
A-16
A-17
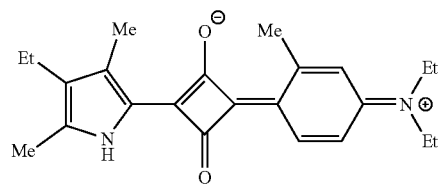
A-18
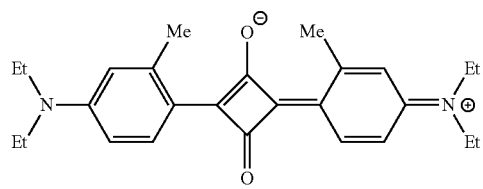
A-19
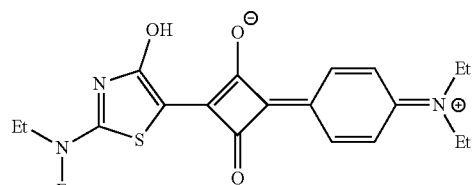
A-20
A-21
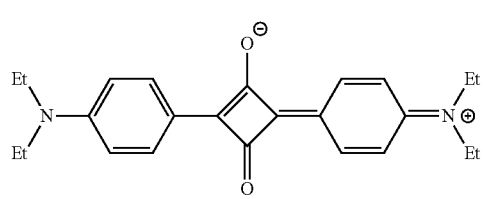
A-22
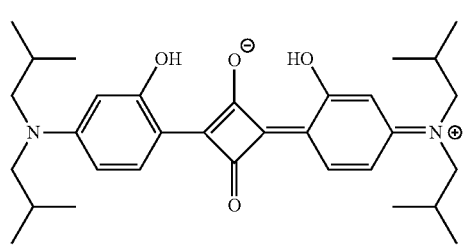

-continued
A-23
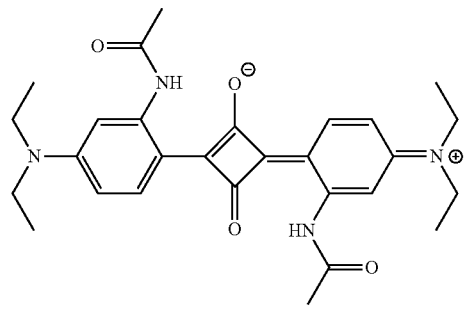
A-24
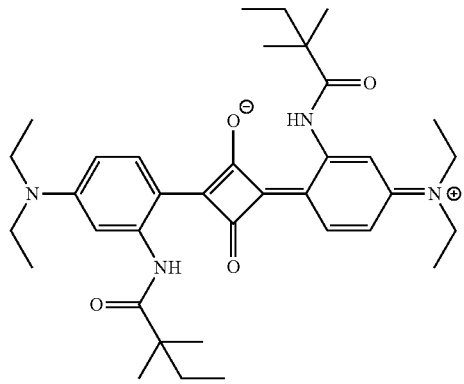
A-25
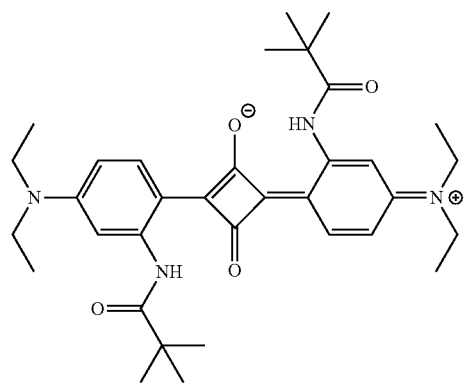
A-26
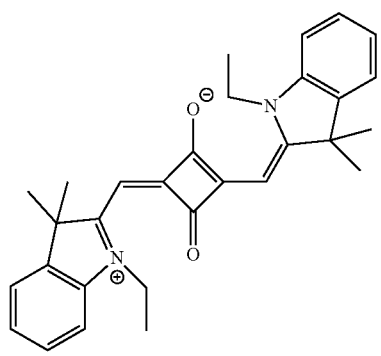
A-27
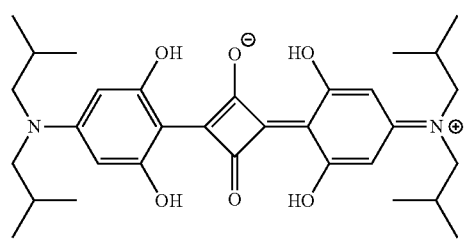
A-28
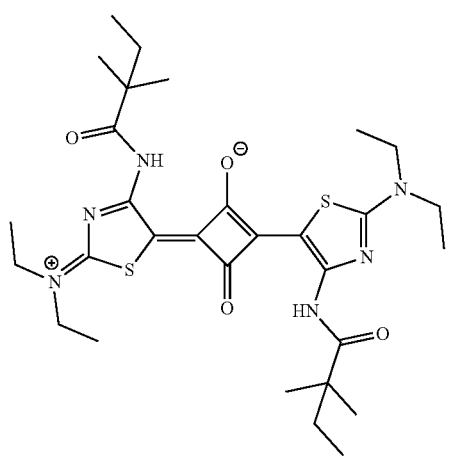
A-29
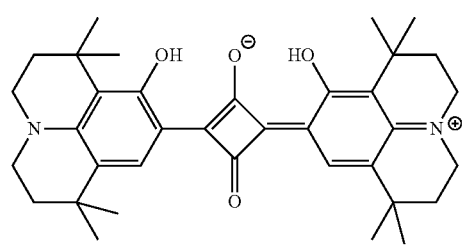
A-30
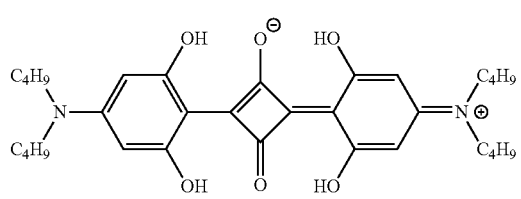

-continued
A-31
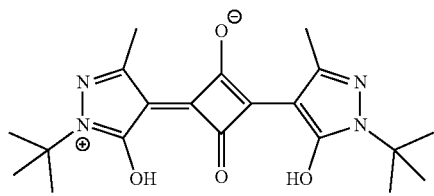
A-32
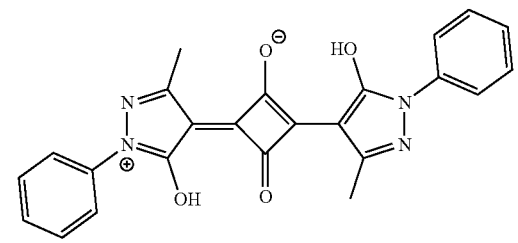
A-33
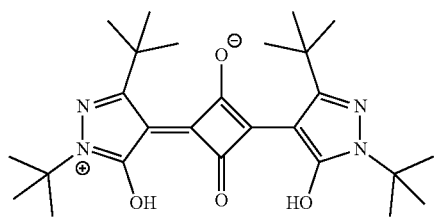
A-34
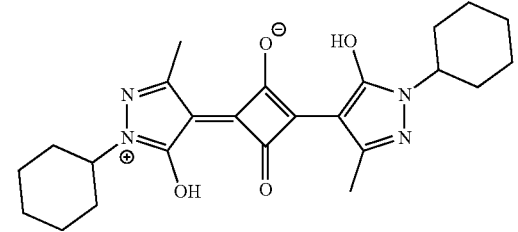
A-35
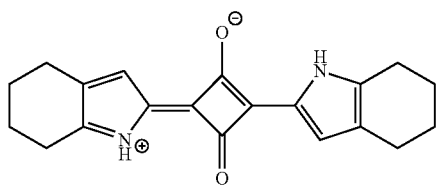
A-36
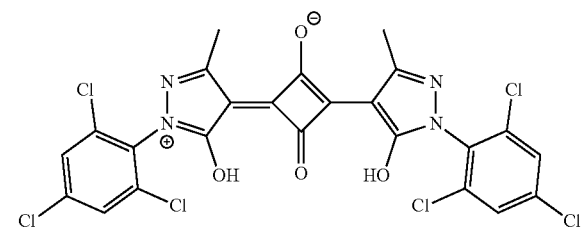
A-37
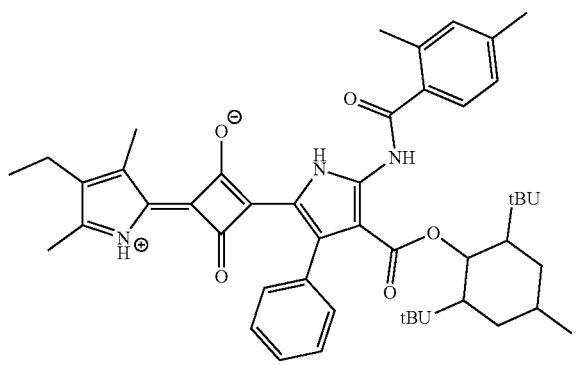
A-38
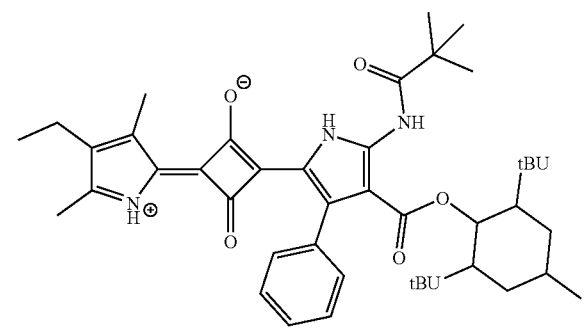

-continued
A-39
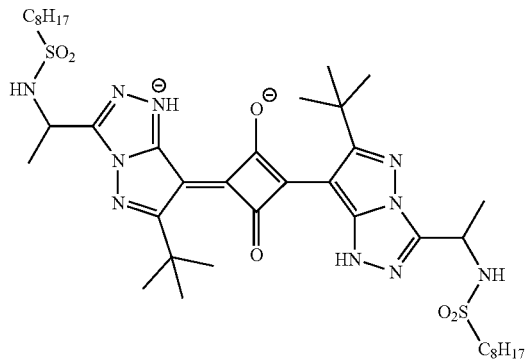
A-40
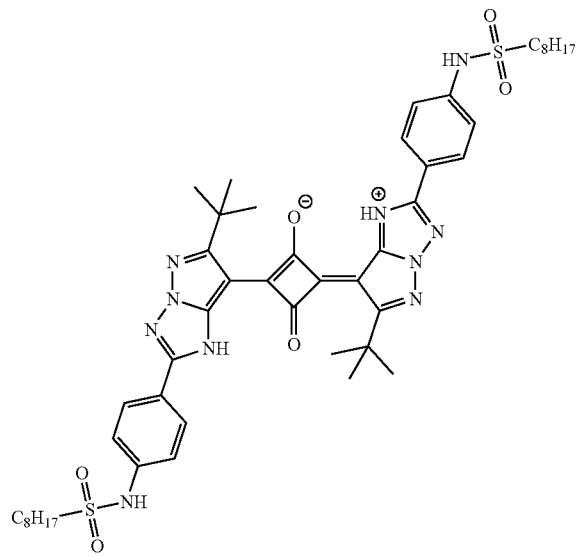
A-41
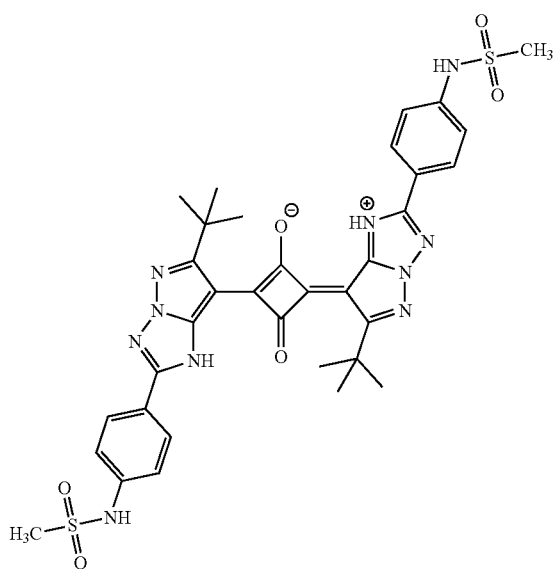
A-42
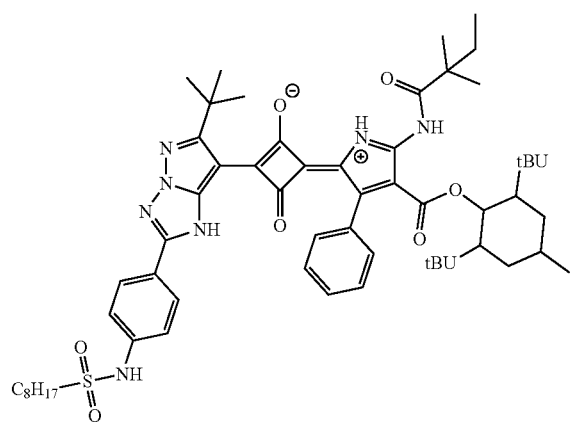
A-43
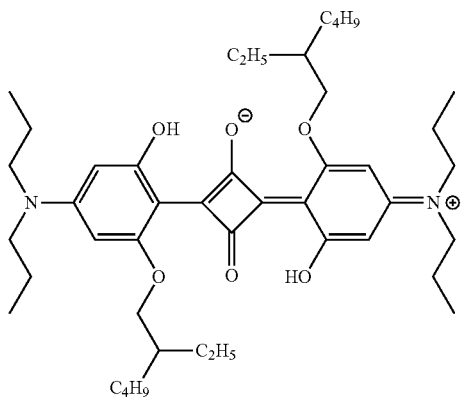
A-44
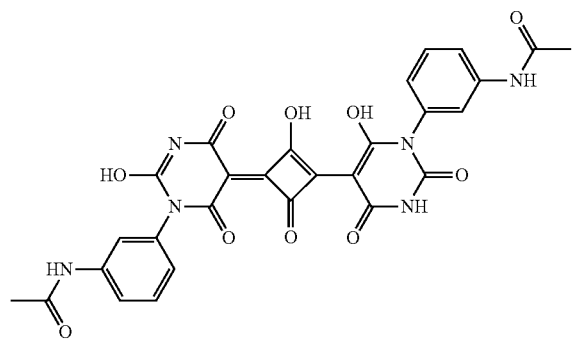

-continued
A-45
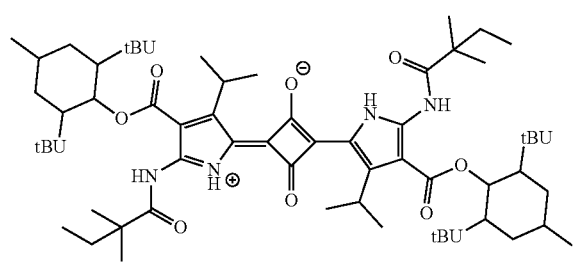
A-46
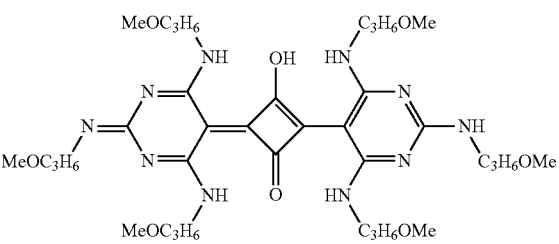
A-47
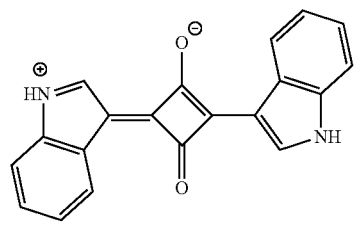
A-48
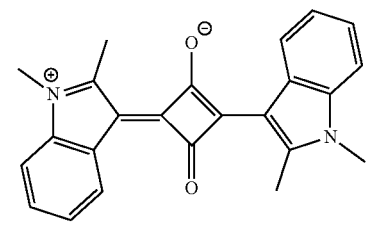
A-49
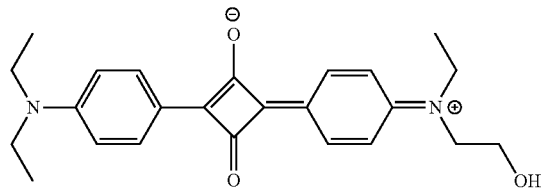
A-50
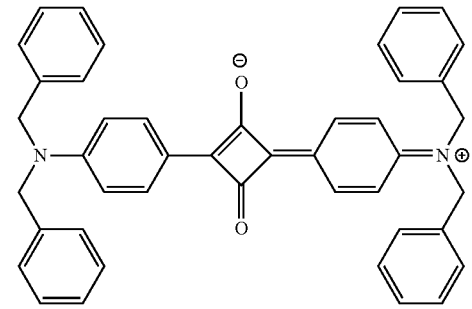
A-51
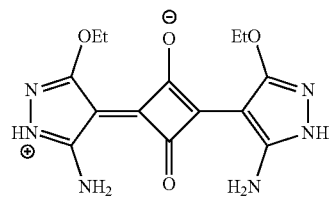
A-52
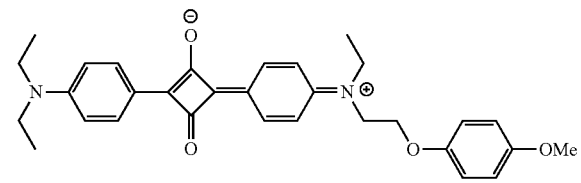
A-53
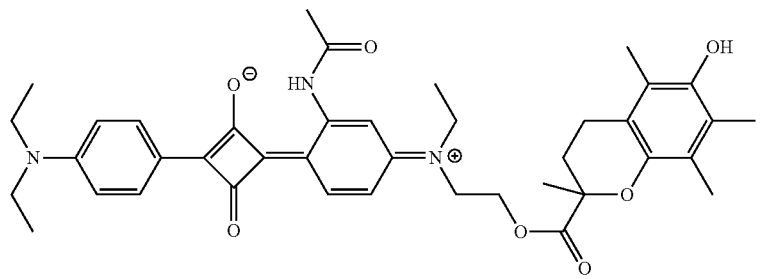
A-54
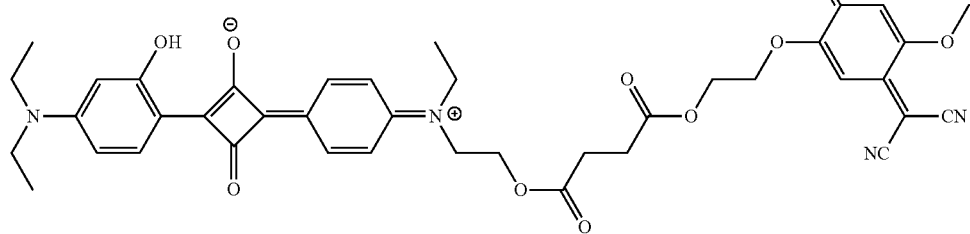

A-55
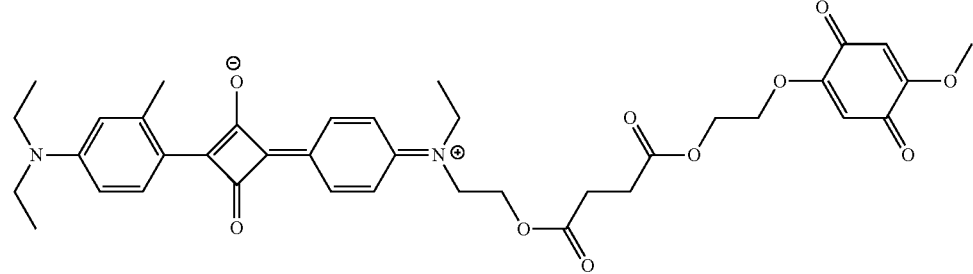
A-56
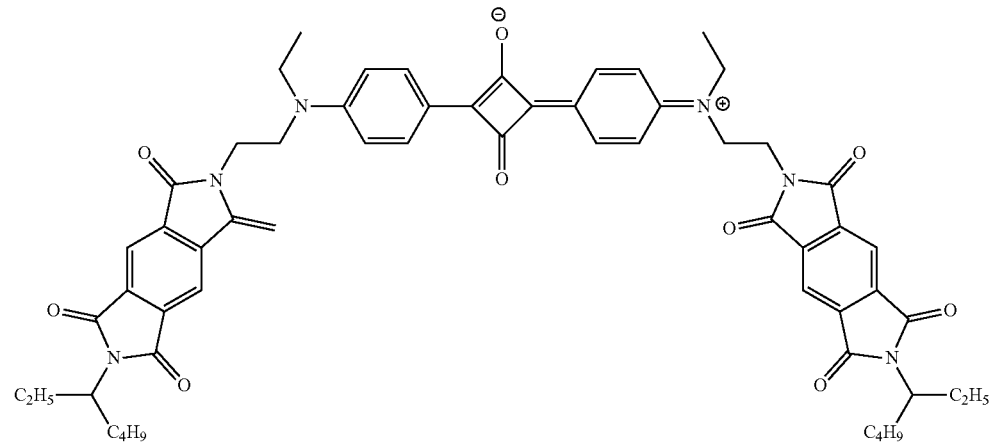
A-57
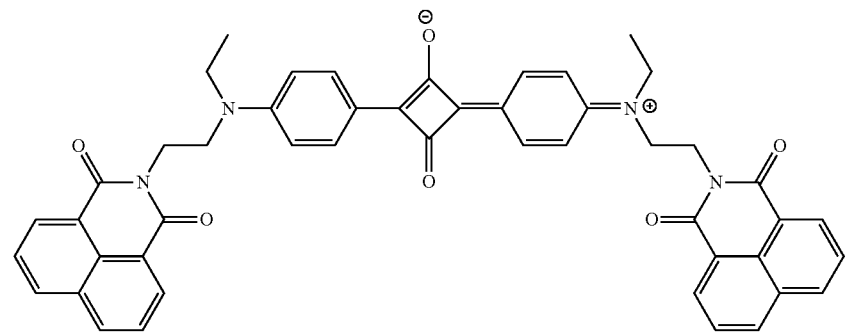
A-58
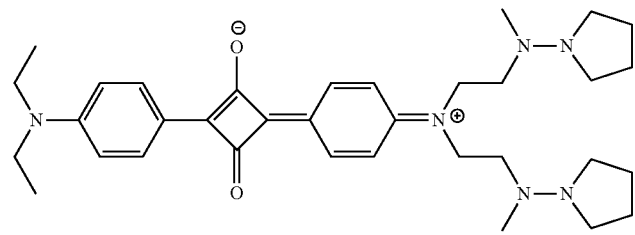
A-59
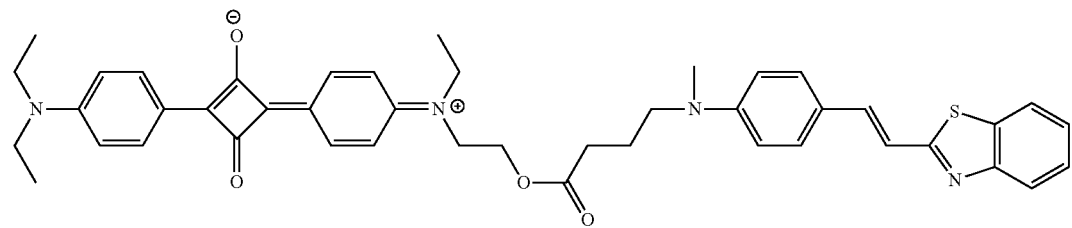

-continued
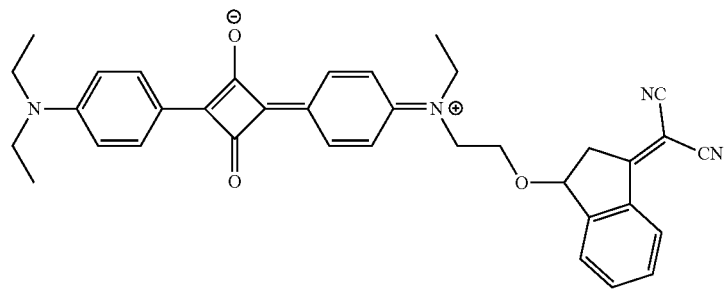
A-60
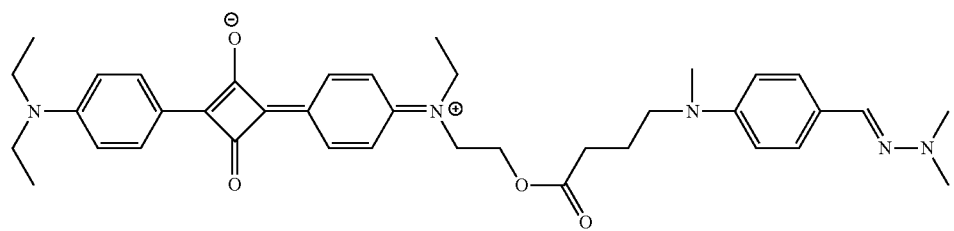
A-61
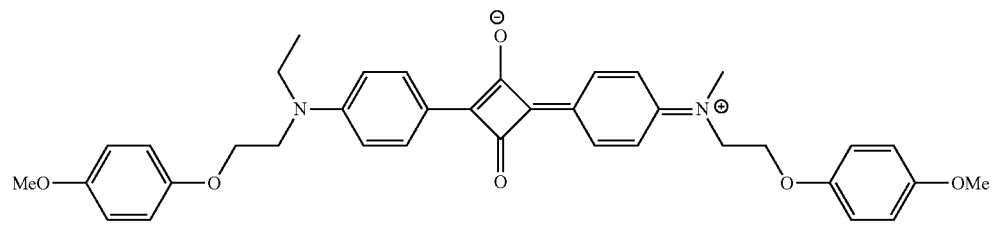
A-62
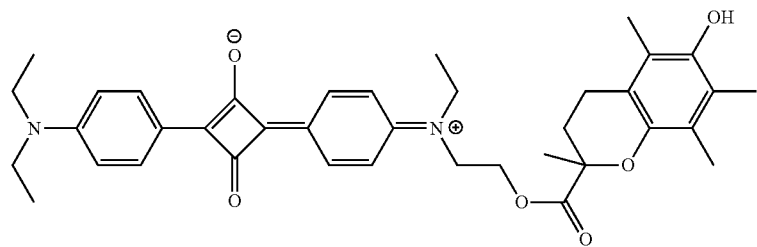
A-63
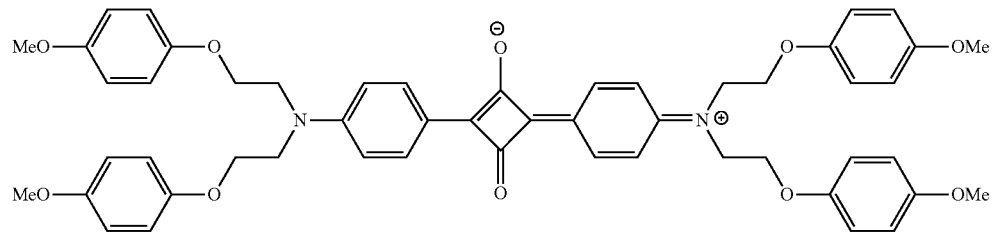
A-64
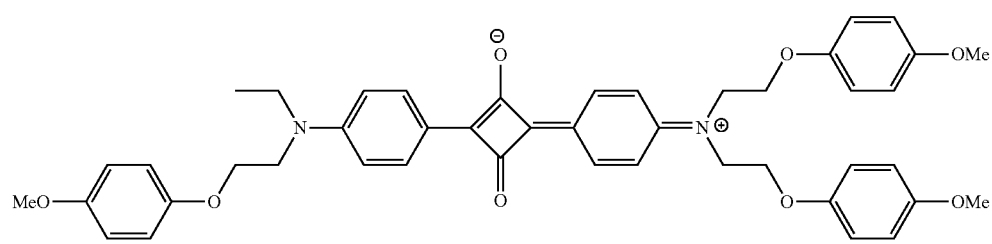
A-65

-continued
A-66
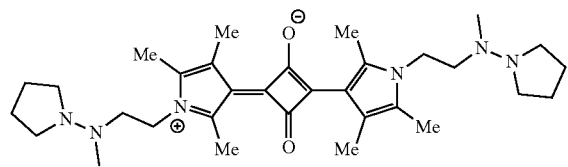
A-67
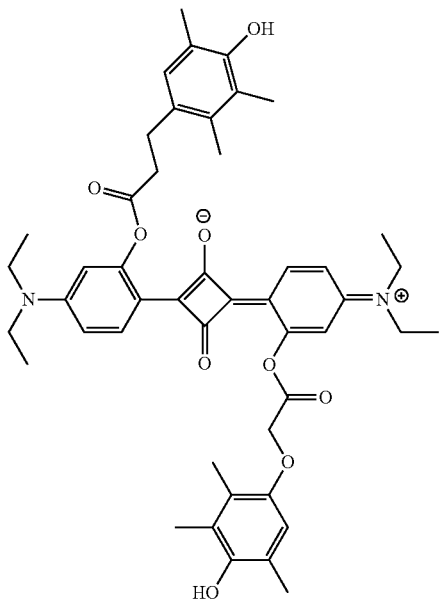
A-68
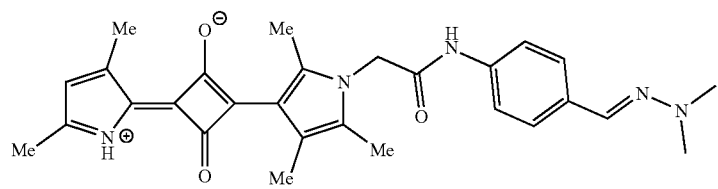
A-69
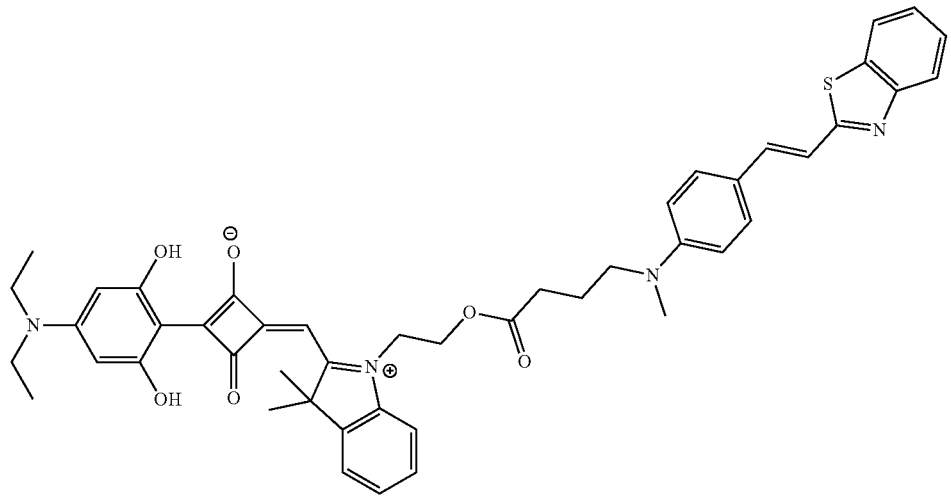
A-70
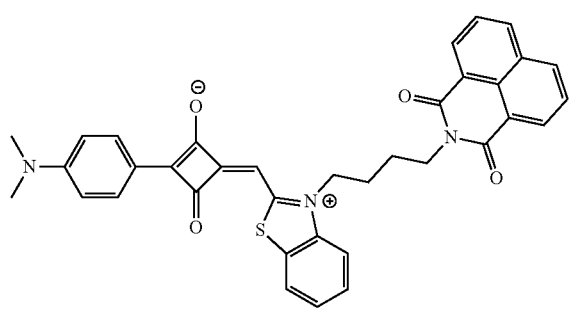
A-71
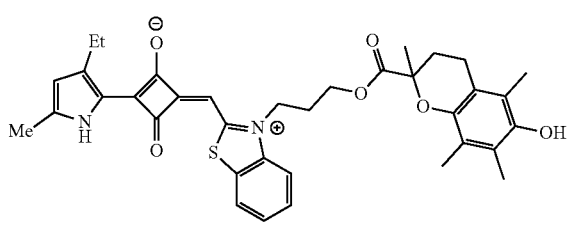

In addition to the above-shown specific examples, specific examples of the colorant represented by Formula (I) will be shown. In the following tables, substituents B represent the following structures. In the following structures and the following tables, Me represents methyl. Et represents ethyl, i-Pr represents i-propel. Bu represents n-butyl, t-Bu represents t-butyl, and Ph represents phenyl, respectively, in the following structures, * indicates a bonding part with a four-membered carbon ring in each formula.

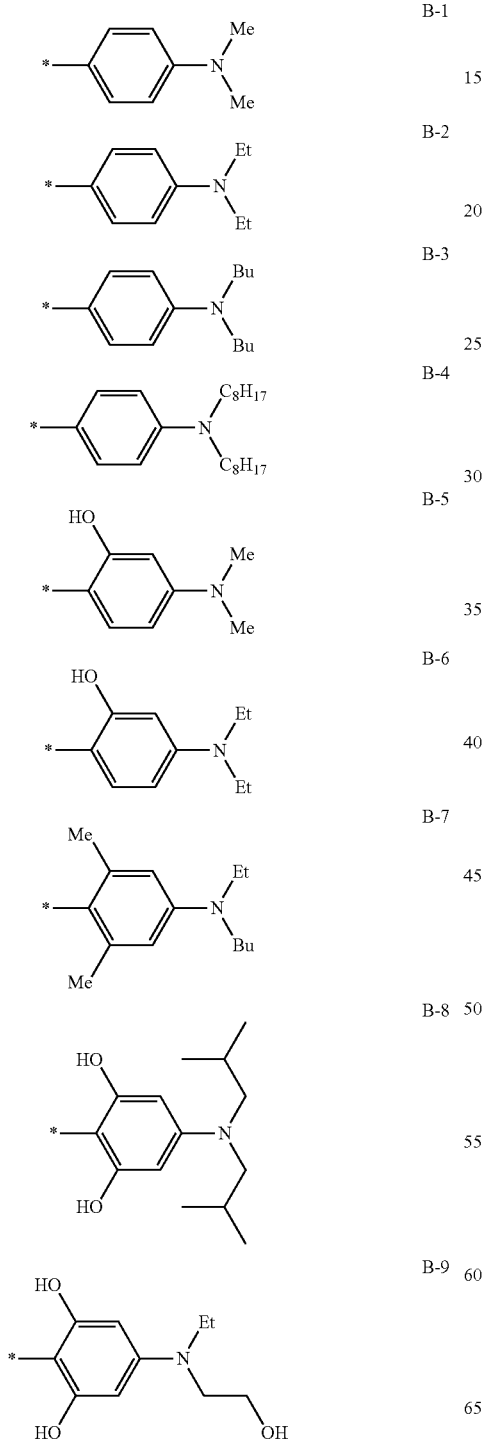
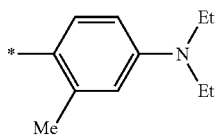
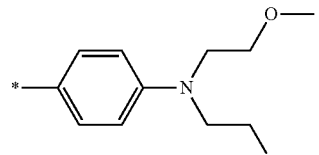
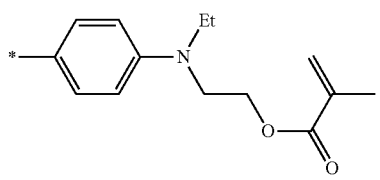
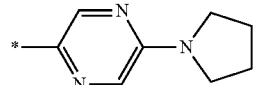
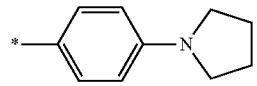
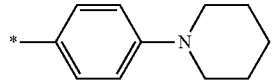
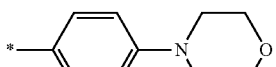
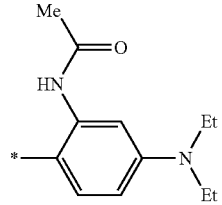
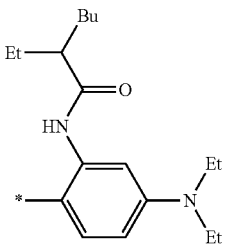
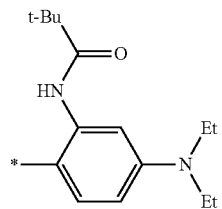

-continued
B-20
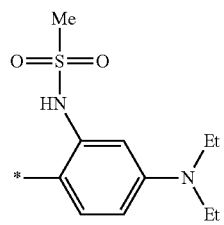
B-21
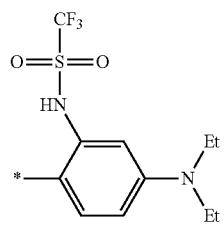
B-22
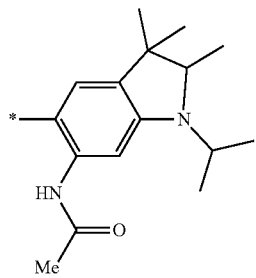
B-23
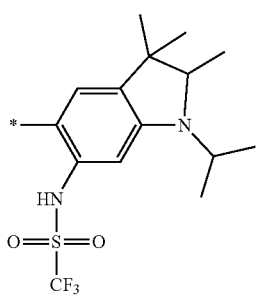
B-24
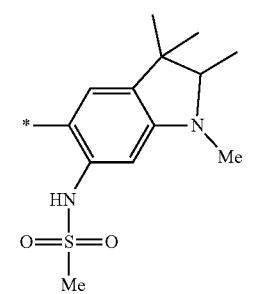
B-25
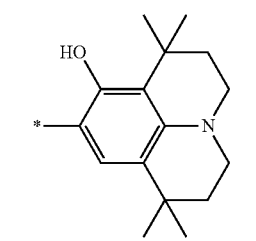
-continued
B-26
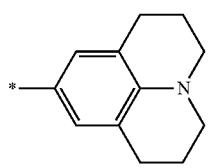
B-27
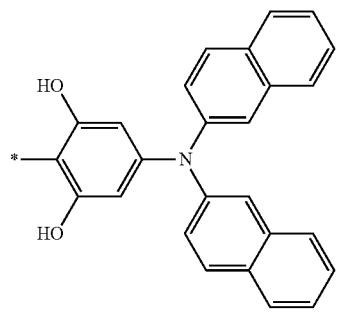
B-28
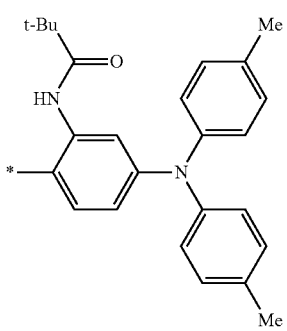
B-29
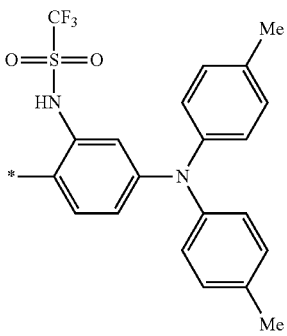
B-30
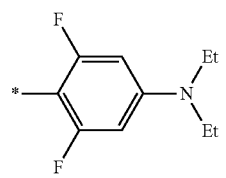
B-31
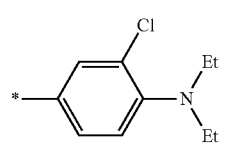
B-32
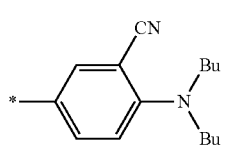

| | |
|---|---|
| 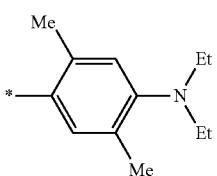 B-33 | 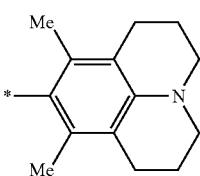 B-45 |
| 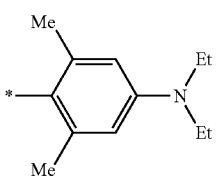 B-36 | 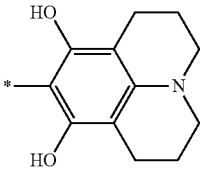 B-46 |
| 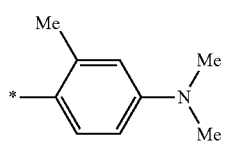 B-37 | B-47 |
| 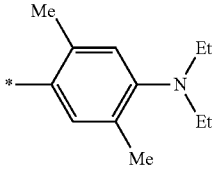 B-38 | B-48 |
| 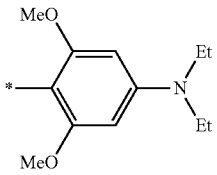 B-39 | |
| 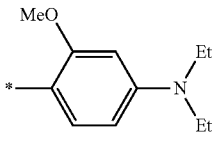 B-40 | B-49 |
| 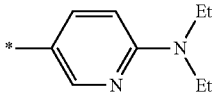 B-41 | |
| 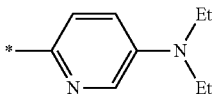 B-42 |  B-50 |
| 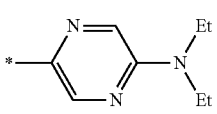 B-43 | 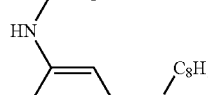 |
| 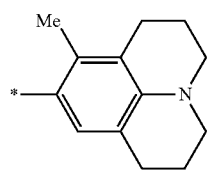 B-44 | 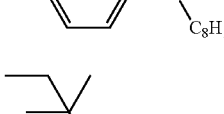 B-51 |
| | 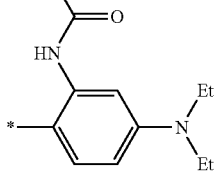 |

B-52
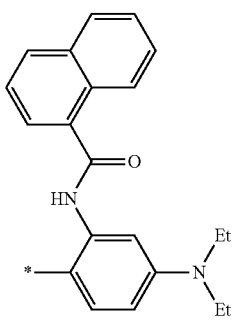
B-53
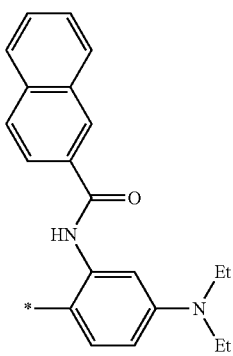
B-54
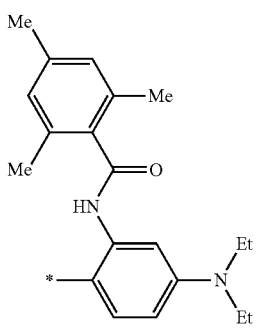
B-55
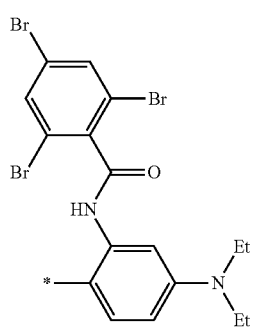
B-56
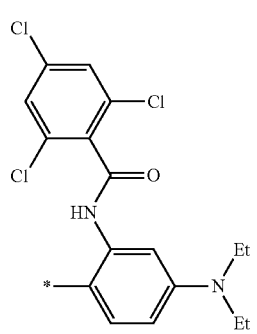
B-57
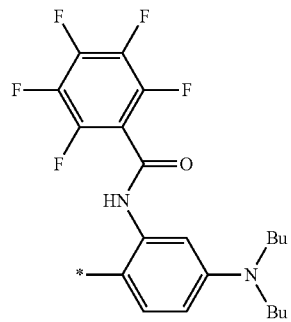
B-58
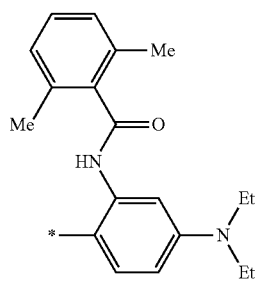
B-59
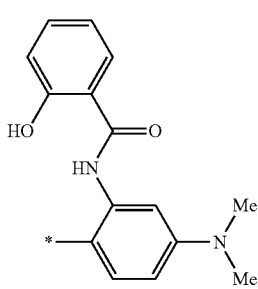
B-60
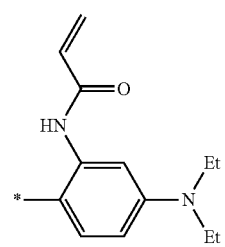
B-61
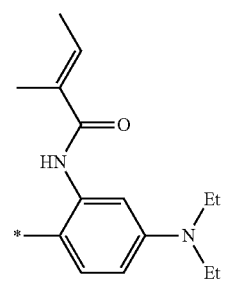

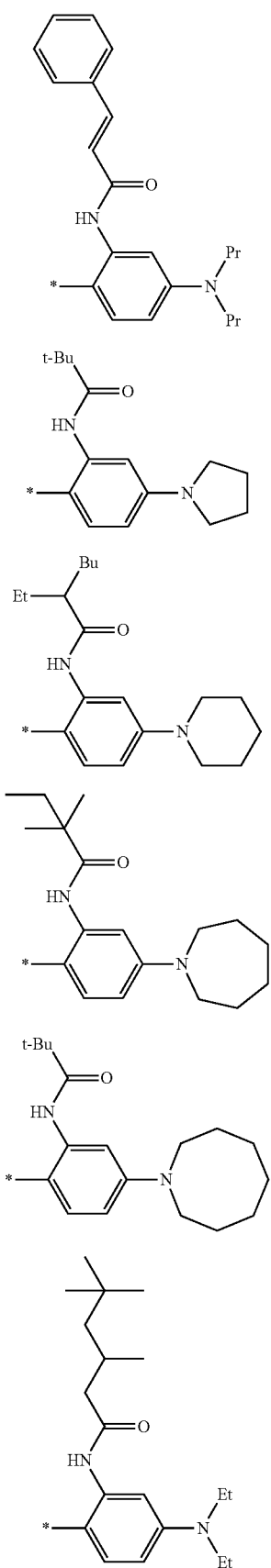
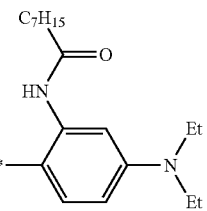
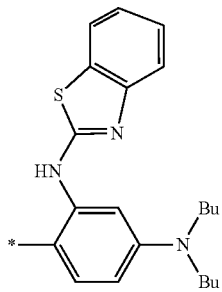
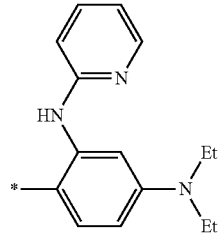
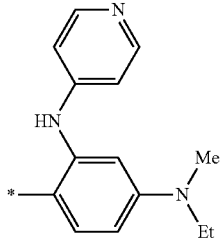
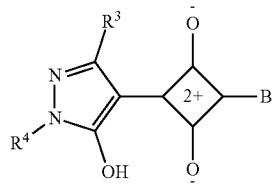
Formula (3)
| Compound No. | R³ | R⁴ | B |
|---|---|---|---|
| 3-1 | Me | Me | B-3 |
| 3-2 | Me | Me | B-4 |
| 3-3 | Me | Me | B-5 |
| 3-4 | Ma | Me | B-10 |
| 3-5 | Me | Me | B-14 |
| 3-6 | Me | Me | B-16 |
| 3-7 | Me | Me | B-17 |
| 3-8 | Me | Me | B-18 |
| 3-9 | Me | Me | B-19 |

| Compound No. | R³ | R⁴ | B |
|---|---|---|---|
| 3-10 | Me | Me | B-20 |
| 3-11 | Me | Me | B-21 |
| 3-12 | Me | Me | B-22 |
| 3-13 | Me | Me | B-23 |
| 3-14 | Me | Me | B-26 |
| 3-15 | Me | Me | B-32 |
| 3-16 | Me | Me | B-33 |
| 3-17 | Me | Me | B-38 |
| 3-18 | Me | Me | B-49 |
| 3-19 | Et | 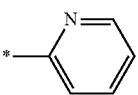 | B-28 |
| 3-20 | Me | 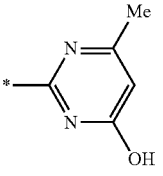 | 8-29 |
| 3-21 | H | H | B-23 |
| 3-22 | Et | t-Bu | B-21 |
| 3-23 | t-Bu | Me | B-18 |
| 3-24 | CF₃ | i-Pr | B-12 |
| 3-25 | COOEt | Et | B-6 |
| 3-26 | CN | Ph | B-11 |
| 3-27 | NMe₂ | Me | B-2 |
| 3-28 | i-Pr | Me | B-17 |
| 3-29 | OEt | Bu | B-27 |
| 3-30 | NH₂ | i-Pr | B-9 |
| 3-31 | t-Bu | Me | B-17 |
| 3-32 | t-Bu | Bu | B-21 |
| 3-33 | CF₃ | Me | B-18 |
| 3-34 | OEt | Et | B-33 |
| 3-35 | NMe₂ | i-Pr | B-2 |
| 3-36 | Et | Me | B-17 |
| 3-37 | Bu | Me | B-18 |
| 3-38 | NH₂ | Ph | B-19 |
| 3-39 | OEt | 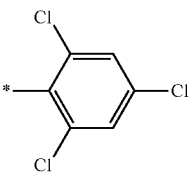 [SMILES: *c1c(Cl)cc(Cl)cc1Cl] | B-25 |
| 3-40 | Me | 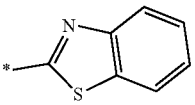 [SMILES: *c1nc2ccccc2s1] | B-2 |

| Compound No. | R³ | R⁴ | B |
|---|---|---|---|
| 3-41 | Me | Ph | B-17 |
| 3-42 | Me | Ph | B-21 |
| 3-43 | Me | Ph | B-36 |
| 3-44 | Me | t-Bu | B-17 |
| 3-45 | Me | t-Bu | B-18 |
| 3-46 | Me | t-Bu | B-10 |
| 3-47 | OEt | Me | B-17 |
| 3-48 | OEt | Me | B-10 |

| Compound No. | R³ | R⁴ | B |
|---|---|---|---|
| 3-49 | Me | 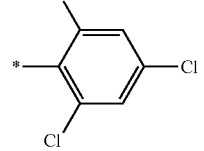 | B-17 |
| 3-50 | Me | 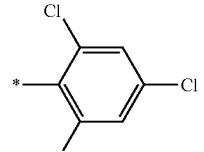 | B-19 |
| 3-51 | Me | 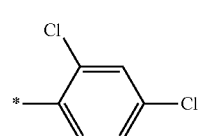 | B-21 |
| 3-52 | Me | 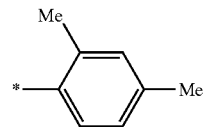 | B-17 |
| 3-53 | Me | 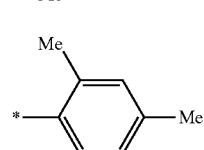 | B-20 |
| 3-54 | Me | 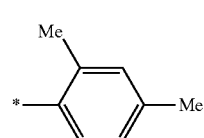 | B-21 |
| 3-55 | t-Bu | Me | B-17 |
| 3-56 | t-Bu | Me | B-10 |
| 3-57 | t-Bu | Me | B-44 |
| 3-58 | t-Bu | t-Bu | B-17 |
| 3-59 | t-Bu | t-Bu | B-10 |
| 3-60 | t-Bu | t-Bu | B-6 |
| 3-61 | NBu₂ | Me | B-17 |
| 3-62 | NBu₂ | Me | B-10 |
| 3-63 | t-Bu | 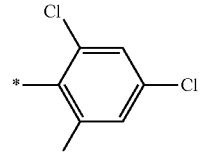 | B-17 |

-continued

| Compound No. | R³ | R⁴ | B |
|---|---|---|---|
| 3-64 | t-Bu | 2,4,6-trichlorophenyl | B-19 |
| 3-65 | t-Bu | 2,4,5-trichlorophenyl | B-21 |
| 3-66 | t-Bu | 2,4,6-trimethylphenyl | B-17 |
| 3-67 | t-Bu | 2,4,6-trimethylphenyl | B-20 |
| 3-68 | t-Bu | 2,4,6-trimethylphenyl | B-21 |

| Compound No. | R³ | R⁴ | B |
|---|---|---|---|
| 3-69 | Me | t-Bu | B-51 |
| 3-70 | Me | t-Bu | B-52 |
| 3-71 | Me | t-Bu | B-54 |
| 3-72 | Me | t-Bu | B-55 |
| 3-73 | Me | t-Bu | B-58 |
| 3-74 | Me | t-Bu | B-60 |
| 3-75 | Me | t-Bu | B-65 |
| 3-76 | Me | t-Bu | B-67 |
| 3-77 | Me | t-Bu | B-68 |
| 3-78 | H | t-Bu | B-51 |
| 3-79 | Et | t-Bu | B-53 |
| 3-80 | Pr | 4-(NHSO₂CF₃)phenyl | B-64 |
| 3-81 | iPr | iPr | B-66 |

-continued

| Compound No. | R³ | R⁴ | B |
|---|---|---|---|
| 3-82 | Me | dicyclohexylmethyl | B-51 |
| 3-83 | Et | Bu | B-56 |
| 3-84 | Me | iPr | B-66 |
| 3-85 | Me | dicyclohexylmethyl | B-54 |
| 3-86 | Me | 2,3-dimethylbutyl | B-57 |
| 3-87 | Et | 2,4,6-trichlorophenyl | B-60 |
| 3-88 | Me | iPr | B-65 |
| 3-89 | Me | t-Bu | B-69 |
| 3-90 | Me | 2-ethylhexyl | B-50 |
| 3-91 | Me | bornyl | B-61 |
| 3-92 | Me | neopentyl | B-51 |
| 3-93 | Me | 2,3-dimethylbutyl | B-51 |

-continued

| Compound No. | R³ | R⁴ | B |
|---|---|---|---|
| 3-94 | Me | 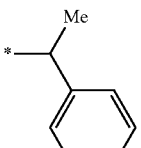 Me, *CH-Ph | B-67 |
| 3-95 | Me | 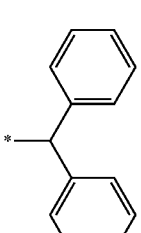 *CH(Ph)₂ | B-51 |
| 3-96 | Me | 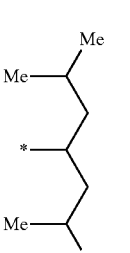 Me₂CHCH₂CH(*)CH₂CHMe₂ | B-51 |

Formula (4)

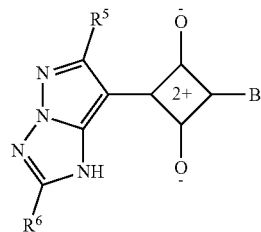

| Compound No. | R⁵ | R⁶ | B |
|---|---|---|---|
| 4-1 | t-Bu | 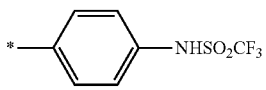 *-C₆H₄-NHSO₂C₈H₁₇ | B-2 |
| 4-2 | t-Bu | 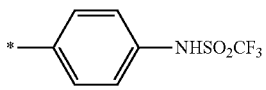 *-C₆H₄-NHSO₂C₈H₁₇ | B-6 |
| 4-3 | t-Bu | 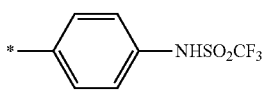 *-C₆H₄-NHSO₂C₈H₁₇ | B-10 |
| 4-4 | Me | 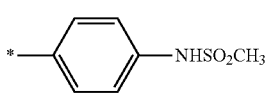 *-C₆H₄-NHSO₂C₈H₁₇ | B-4 |
| 4-5 | t-Bu | 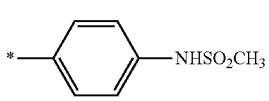 *-C₆H₄-NHSO₂CF₃ | B-8 |
| 4-6 | t-Bu | 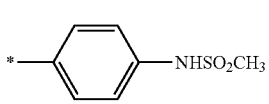 *-C₆H₄-NHSO₂CF₃ | B-14 |
| 4-7 | NHCOCH₃ | 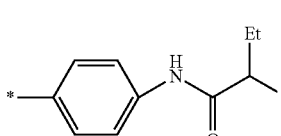 *-C₆H₄-NHSO₂CF₃ | B-1 |
| 4-8 | t-Bu | 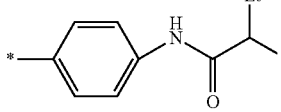 *-C₆H₄-NHSO₂CH₃ | B-6 |
| 4-9 | t-Bu | 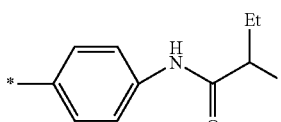 *-C₆H₄-NHSO₂CH₃ | B-16 |
| 4-10 | OEt |  *-C₆H₄-NHSO₂CH₃ | B-11 |
| 4-11 | t-Bu | 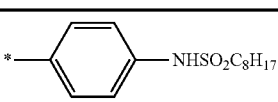 *-C₆H₄-NHC(O)CH(Et)Bu | B-6 |
| 4-12 | t-Bu | 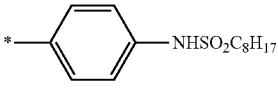 *-C₆H₄-NHC(O)CH(Et)Bu | B-12 |
| 4-13 | OEt | 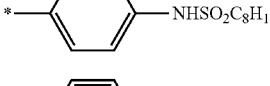 *-C₆H₄-NHC(O)CH(Et)Bu | B-31 |
| 4-14 | H | H | B-22 |
| 4-15 | Me | Me | B-23 |
| 4-16 | Me | Me | B-17 |
| 4-17 | Me | Et | B-18 |
| 4-18 | Ph | Ph | B-8 |
| 4-19 | Et | t-Bu | B-17 |
| 4-20 | OEt | t-Bu | B-3 |
| 4-21 | OEt | Bu | B-26 |
| 4-22 | OEt | 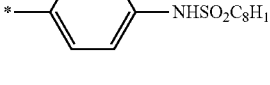 2-pyridyl | B-2 |
| 4-23 | CF₃ | t-Bu | B-19 |
| 4-24 | NHOOCH₃ | t-Bu | B-2 |
| 4-25 | NHCOOH₃ | Me | B-1 |
| 4-26 | NMe₂ | t-Bu | B-6 |
| 4-27 | NMe₂ | Et | B-17 |
| 4-28 | H | Me | B-2 |
| 4-29 | t-Bu | t-Bu | B-18 |
| 4-30 | t-Bu | Me | B-17 |

| Compound No. | R⁵ | R⁶ | B |
|---|---|---|---|
| 4-31 | t-Bu | *-C₆H₄-NHSO₂C₈H₁₇ | B-51 |
| 4-32 | t-Bu | *-C₆H₄-NHSO₂C₈H₁₇ | B-52 |
| 4-33 | t-Bu | *-C₆H₄-NHSO₂C₈H₁₇ | B-54 |
| 4-34 | Me | *-C₆H₄-NHSO₂C₈H₁₇ | B-55 |
| 4-35 | t-Bu | *-C₆H₄-NHSO₂CF₃ | B-60 |
| 4-36 | Me | Me | B-65 |
| 4-37 | Me | Et | B-67 |
| 4-38 | Ph | Ph | B-48 |
| 4-39 | Et | t-Bu | B-54 |
| 4-40 | Me | Me | B-51 |

Formula (5)

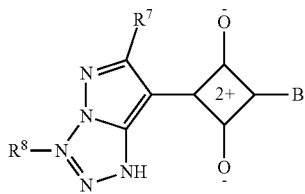

| Compound No. | R⁷ | R⁸ | B |
|---|---|---|---|
| 5-1 | t-Bu | *-C₆H₄-NHSO₂C₈H₁₇ | B-2 |
| 5-2 | Me | *-C₆H₄-NHSO₂C₈H₁₇ | B-6 |
| 5-3 | t-Bu | *-C₆H₄-NHSO₂CF₃ | B-4 |
| 5-4 | Me | *-C₆H₄-NHSO₂CH₃ | B-10 |
| 5-5 | t-Bu | *-C₆H₄-NHCOCH(Et)Bu | B-6 |
| 5-6 | t-Bu | *-(2-pyridyl) | B-14 |
| 5-7 | Me | *-(2,4,6-trichlorophenyl) | B-1 |
| 5-8 | Me | *-(3,4-dichlorophenyl) | B-6 |
| 5-9 | Me | *-(2,4,6-trimethylphenyl) | B-16 |
| 5-10 | t-Bu | *-(2,4,6-trimethylphenyl) | B-11 |
| 5-11 | Me | Me | B-17 |
| 5-12 | Me | t-Bu | B-18 |
| 5-13 | Ph | Ph | B-8 |
| 5-14 | Ph | *-(2,4,6-trimethylphenyl) | B-17 |
| 5-15 | Et | Ph | B-17 |
| 5-16 | OEt | t-Bu | B-3 |
| 5-17 | OEt | Bu | B-26 |
| 5-18 | CF₃ | t-Bu | B-19 |
| 5-19 | NHCOCH3 | t-Bu | B-2 |
| 5-20 | NHCOCH3 | *-(2,4,6-trimethylphenyl) | B-1 |

| Compound No. | R⁷ | R⁸ | B |
|---|---|---|---|
| 5-21 | t-Bu | *-(3-OC₁₀H₂₁-phenyl) | B-2 |

-continued

| Compound No. | R⁷ | R⁸ | B |
|---|---|---|---|
| 5-22 | Me | *-C₆H₄-NHSO₂C₈H₁₇ | B-51 |
| 5-23 | t-Bu | *-C₆H₄-NHSO₂C₈H₁₇ | B-52 |
| 5-24 | Me | *-C₆H₄-NHSO₂CH₃ | B-55 |
| 5-25 | t-Bu | *-C₆H₄-NHC(O)CH(Et)(Bu) | B-60 |
| 5-26 | Me | Me | B-65 |
| 5-27 | Me | t-Bu | B-67 |
| 5-28 | Ph | Ph | B-50 |
| 5-29 | Ph | 2,4,6-trimethylphenyl (Me, Me, Me) | B-23 |
| 5-30 | Et | Ph | B-59 |

Formula (7)

| Compound No. | R13 | | R1 | |
|---|---|---|---|---|
| 7-1 | Me | Me | Me | Me |
| 7-2 | Et | Me | Et | Me |
| 7-3 | Me | 2,4,6-trichlorophenyl | Me | 2,4,6-trichlorophenyl |
| 7-4 | t-Bu | 2,4,6-trimethylphenyl | t-Bu | 2,4,6-trimethylphenyl |
| 7-5 | NMe₂ | Me | NMe₂ | Me |
| 7-6 | CN | Me | CN | Me |
| 7-7 | OEt | Me | OEt | Me |
| 7-8 | Me | 4-methyl-6-hydroxypyrimidin-2-yl | Me | 4-methyl-6-hydroxypyrimidin-2-yl |
| 7-9 | Et | pyridin-2-yl | Et | pyridin-2-yl |
| 7-10 | i-Pr | pyridin-2-yl | i-Pr | pyridin-2-yl |
| 7-11 | t-Bu | t-Bu | t-Bu | t-Bu |
| 7-12 | CF₃ | Ph | OF₃ | Ph |
| 7-13 | COOEt | Me | COOEt | Me |

| Compound No. | R13 |  | R1 |  |
|---|---|---|---|---|
| 7-14 | NH₂ | Me | NH₂ | Me |
| 7-15 | Me | Me | Me | 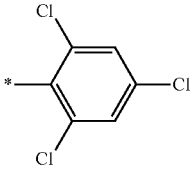 [SMILES: *c1c(Cl)cc(Cl)cc1Cl] (2,4,6-trichlorophenyl) |
| 7-16 | Me | Me | t-Bu | t-Bu |
| 7-17 | Me | Me | NMe₂ | Me |
| 7-18 | Me | Me | Me | Ph |
| 7-19 | Et | Me | Et | 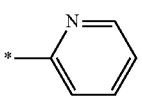 [SMILES: *c1ccccn1] (2-pyridyl) |
| 7-20 | COOEt | Me | Me | 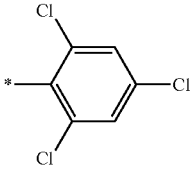 [SMILES: *c1c(Cl)cc(Cl)cc1Cl] (2,4,6-trichlorophenyl) |
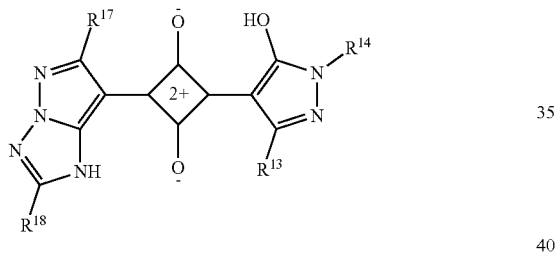
Formula (8)
| Compound No. | R¹³ | R¹⁴ | R¹⁷ | R¹⁸ |
|---|---|---|---|---|
| 8-1 | Me | Me | Me | Me |
| 8-2 | Me | Me | t-Bu | 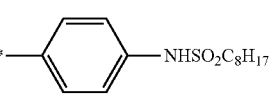 (4-NHSO₂C₈H₁₇-phenyl) |
| 8-3 | Me | Me | t-Bu | 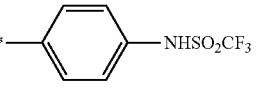 (4-NHSO₂CF₃-phenyl) |
| 8-4 | Me | Me | t-Bu | 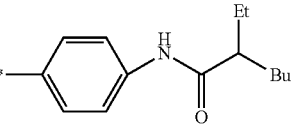 (4-NHC(O)CH(Et)Bu-phenyl) |
| 8-5 | Me | 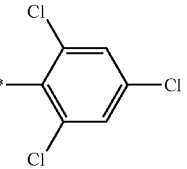 (2,4,6-trichlorophenyl) | Me | Me |

-continued
| Compound No. | R¹³ | R¹⁴ | R¹⁷ | R¹⁸ |
|---|---|---|---|---|
| 8-6 | Me | 2,4,6-trichlorophenyl (*) | t-Bu | *-C₆H₄-NHSO₂CF₃ |
| 8-7 | Me | Ph | t-Bu | *-C₆H₄-NHSO₂C₈H₁₇ |
| 8-8 | Me | 2,4,6-trimethylphenyl (*) | Me | Me |
| 8-9 | Et | Me | Me | Me |
| 8-10 | i-Pr | Me | Me | Me |
| 8-11 | t-Bu | Me | Me | Me |
| 8-12 | Me | Me | OEt | Bu |
| 8-13 | COOEt | Me | Me | Me |
| 8-14 | NH₂ | Me | Me | Me |
| 8-15 | Me | Me | CF₃ | t-Bu |
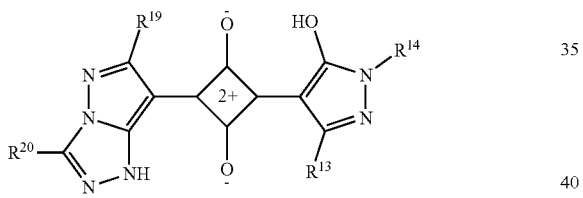
Formula (9)
| Compound No. | R¹³ | R¹⁴ | R¹⁹ | R²⁰ |
|---|---|---|---|---|
| 9-1 | Me | Me | Me | Me |
| 9-2 | Me | Me | t-Bu | *-C₆H₄-NHSO₂C₈H₁₇ |
| 9-3 | Me | Me | Me | 2,4,6-trimethylphenyl (*) |
| 9-4 | Me | Me | Me | 3,4-dichlorophenyl (*) |

-continued
| Compound No. | R¹³ | R¹⁴ | R¹⁹ | R²⁰ |
|---|---|---|---|---|
| 9-5 | Me | 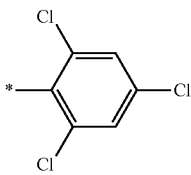 | Me | Me |
| 9-6 | Me | 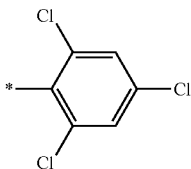 [SMILES: *c1c(Cl)cc(Cl)cc1Cl] | Me | 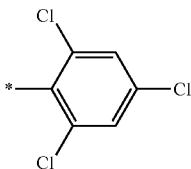 [SMILES: *c1c(Cl)cc(Cl)cc1Cl] |
| 9-7 | t-Bu | Me | t-Bu | 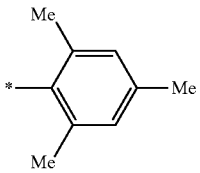 [SMILES: *c1c(C)cc(C)cc1C] |
| 9-8 | t-Bu | Me | Me | Me |
| 9-9 | Et | Me | t-Bu | Me |
| 9-10 | i-Pr | Me | Me | 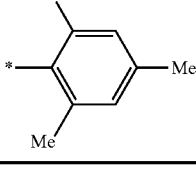 |
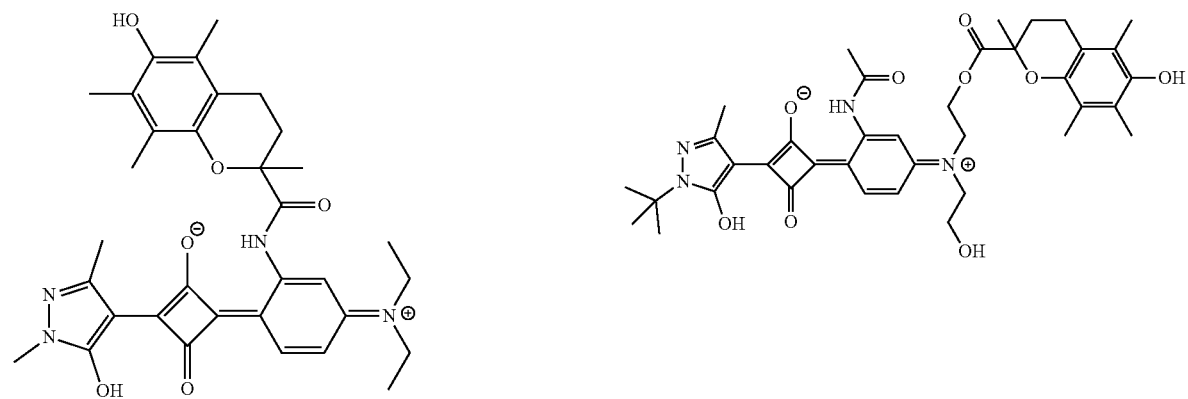

-continued
C-3
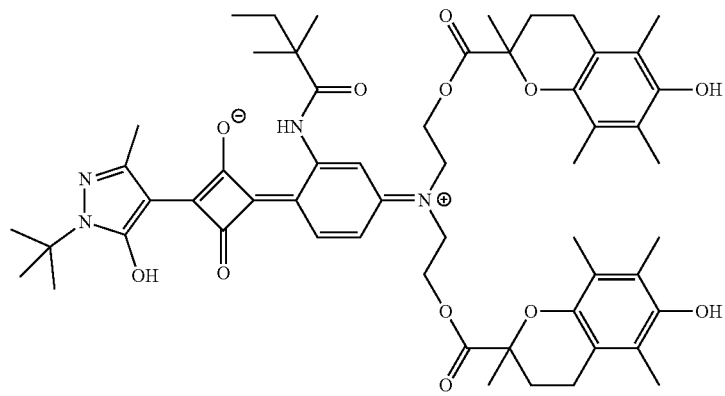
C-4
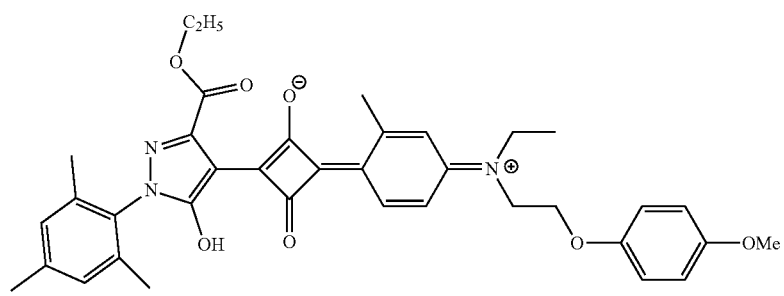
C-5
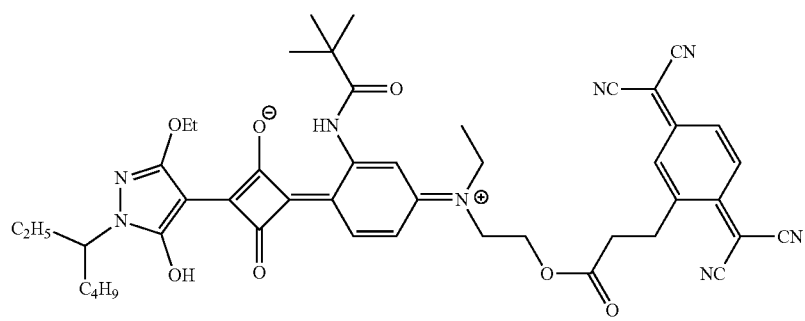
C-6
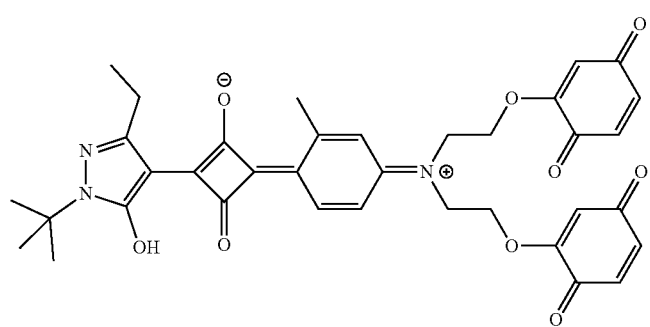
C-7
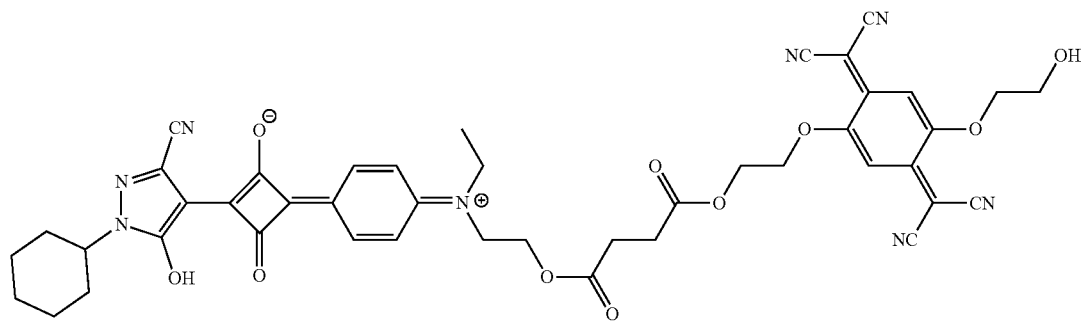

-continued
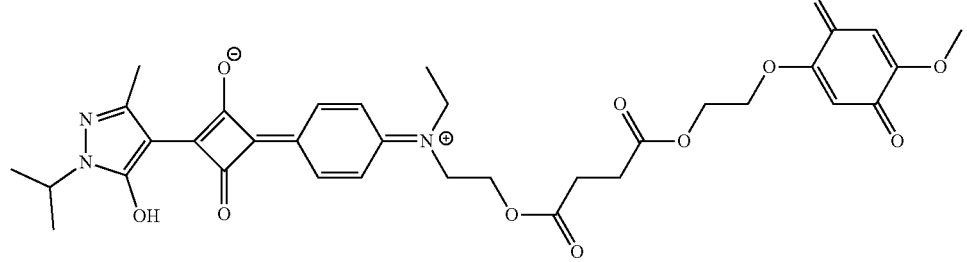
C-8
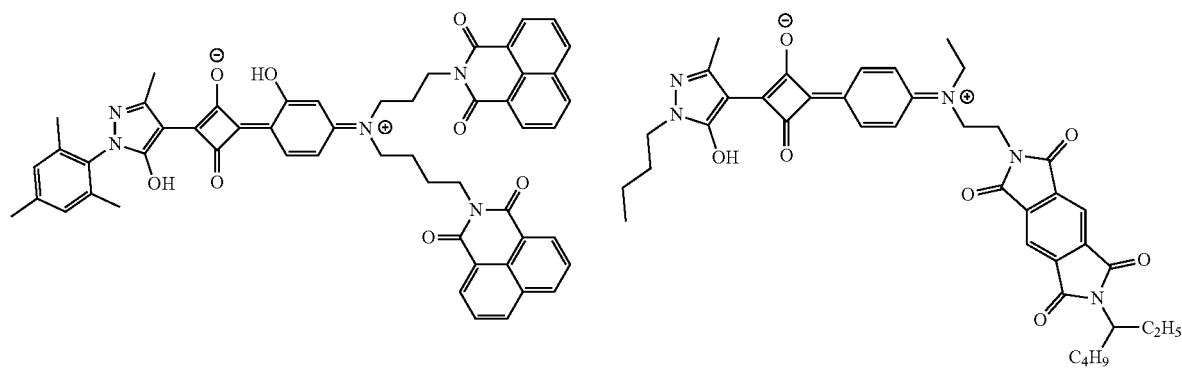
C-9  C-10
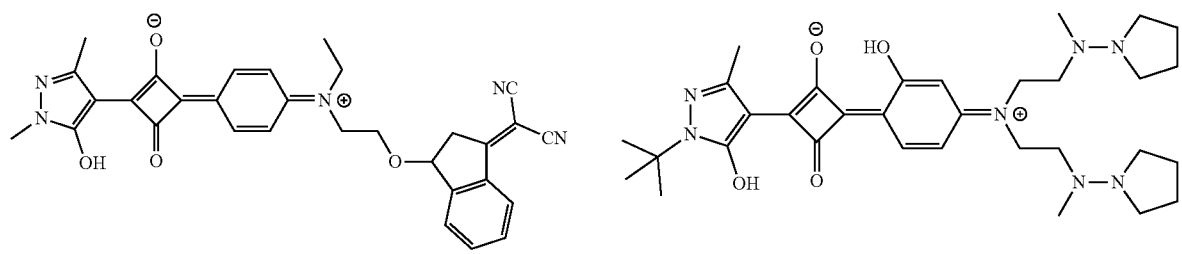
C-11  C-12
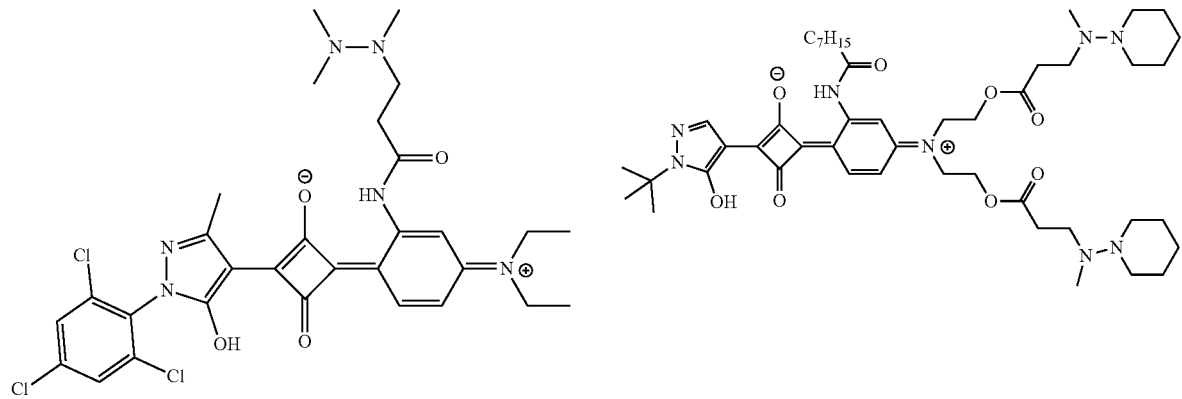
C-13  C-14

-continued
C-15
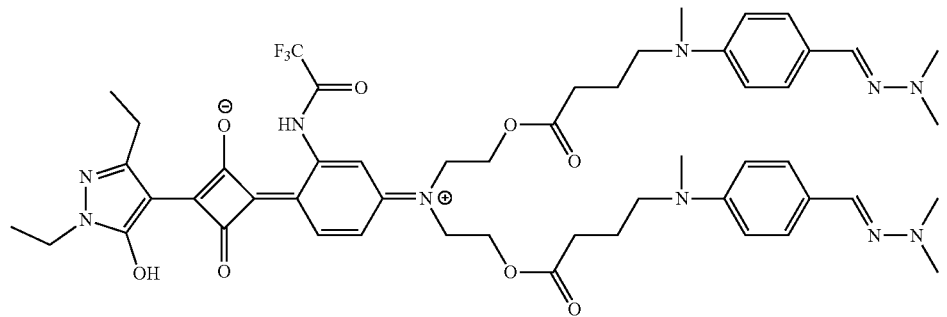
C-16
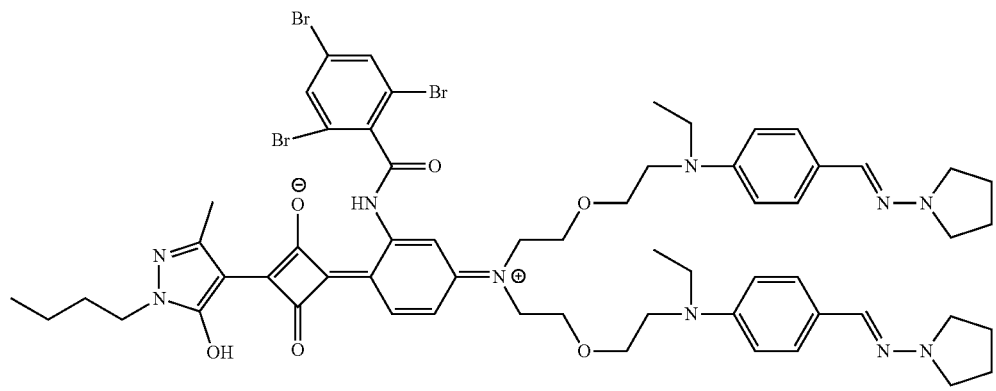
C-17
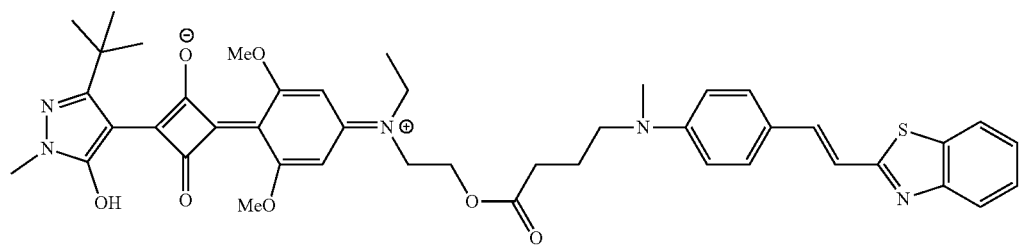
C-18
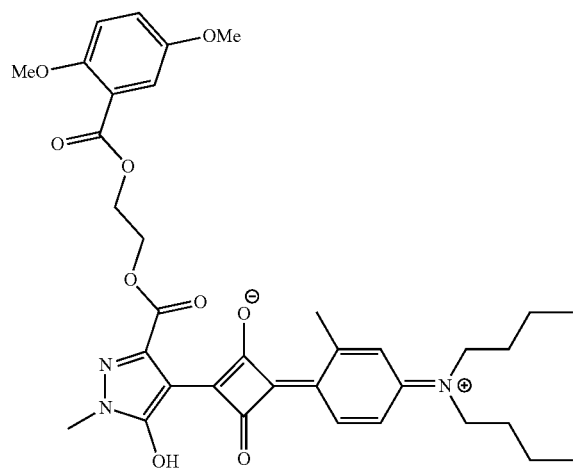
C-19
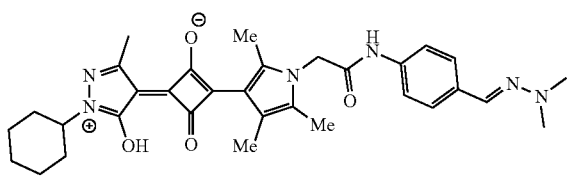

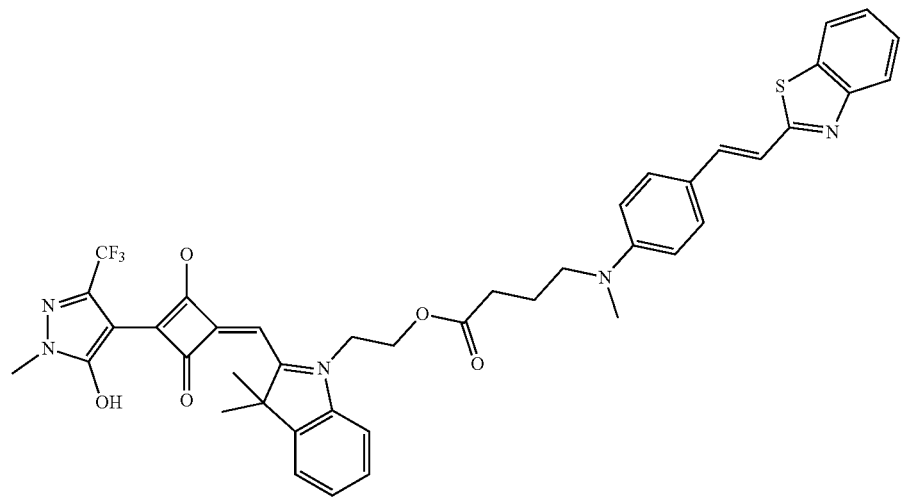
C-20
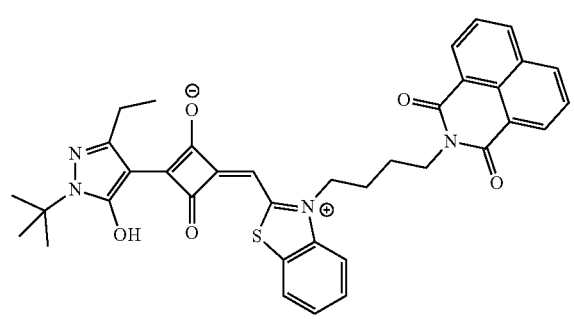
C-21
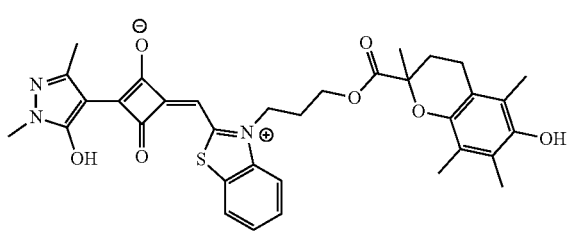
C-22
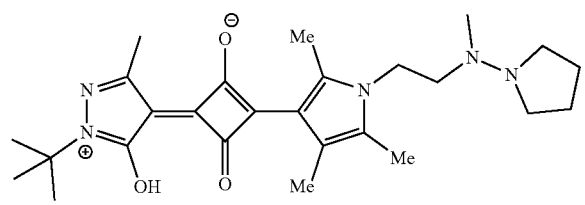
C-23
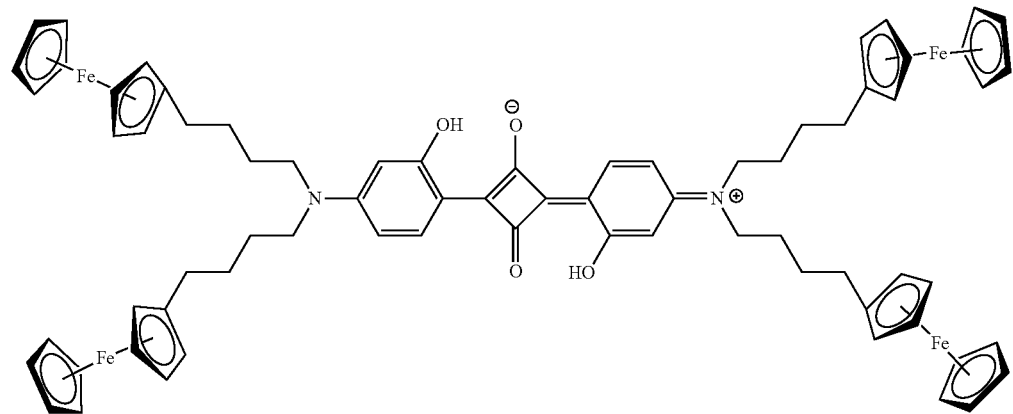
F-1

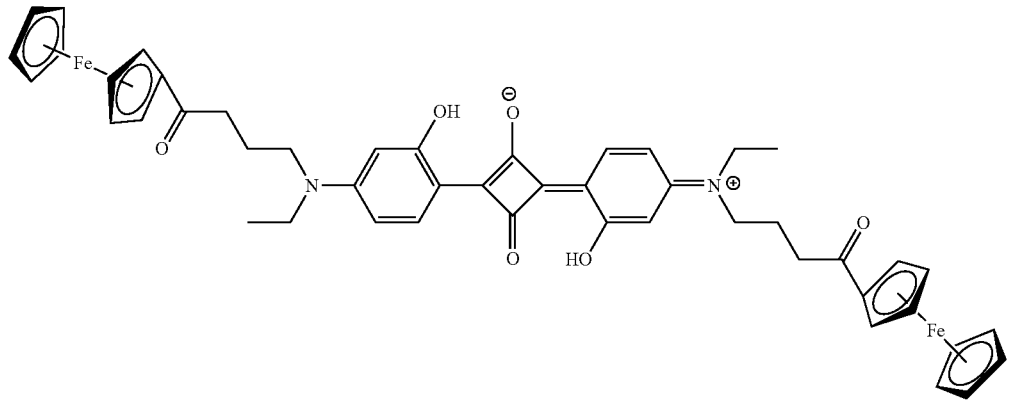
F-2
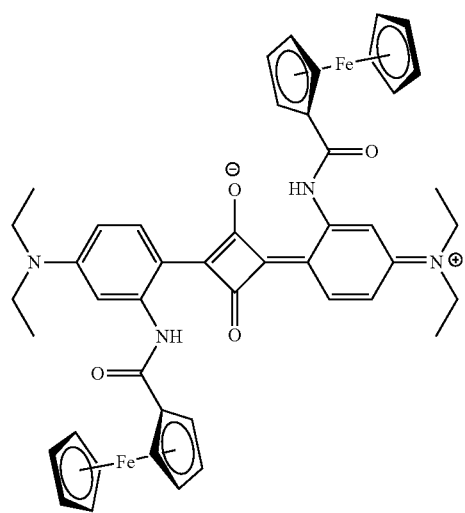
F-3
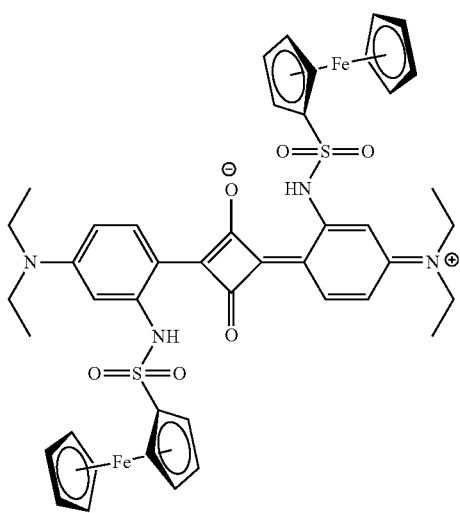
F-4
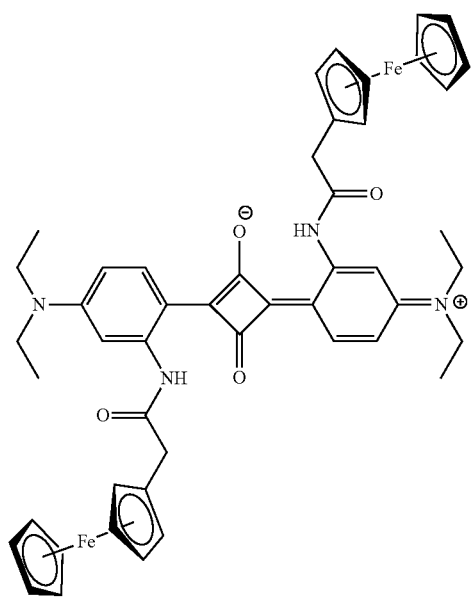
F-5
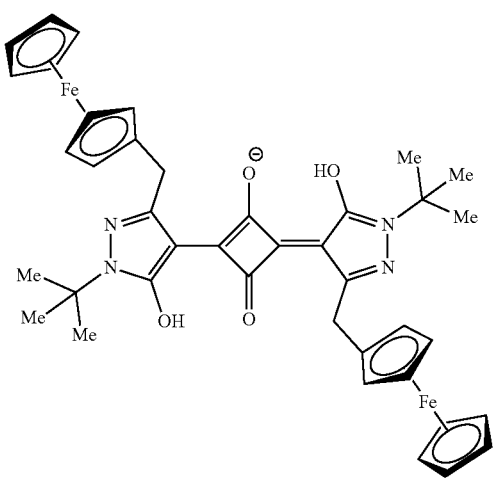
F-6

F-7
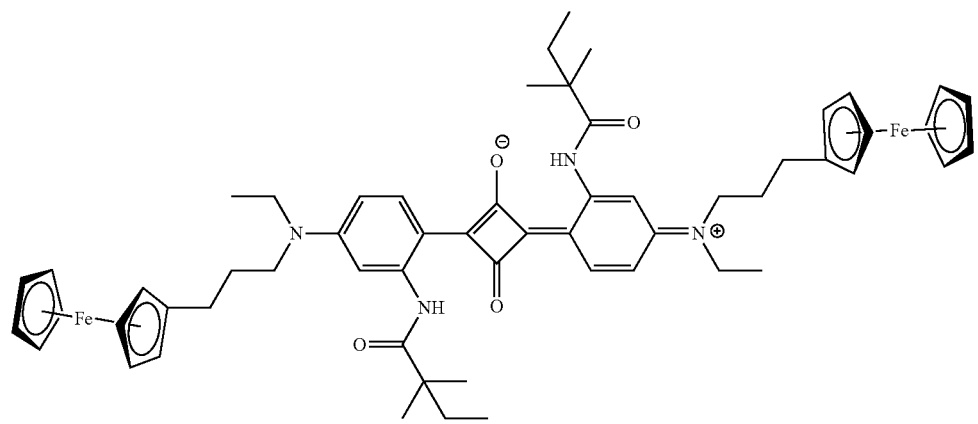
F-8
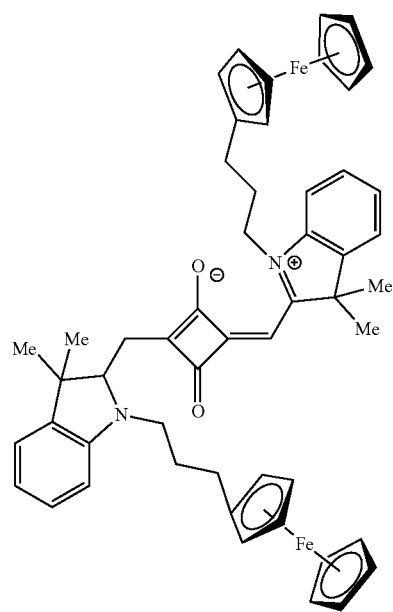
F-9
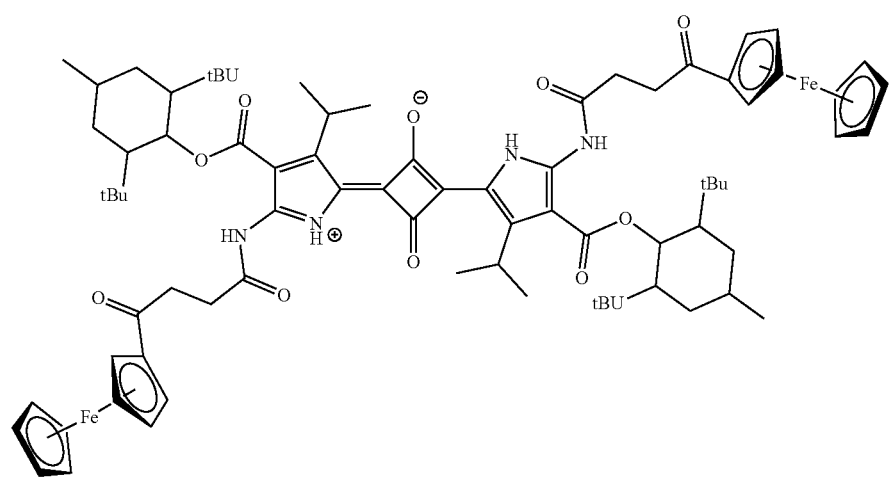

F-10
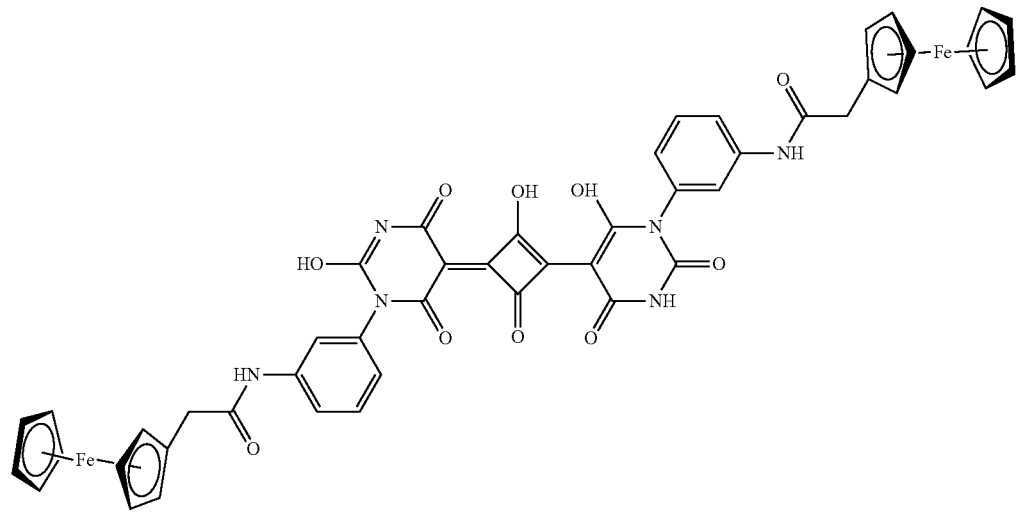
F-11
F-12
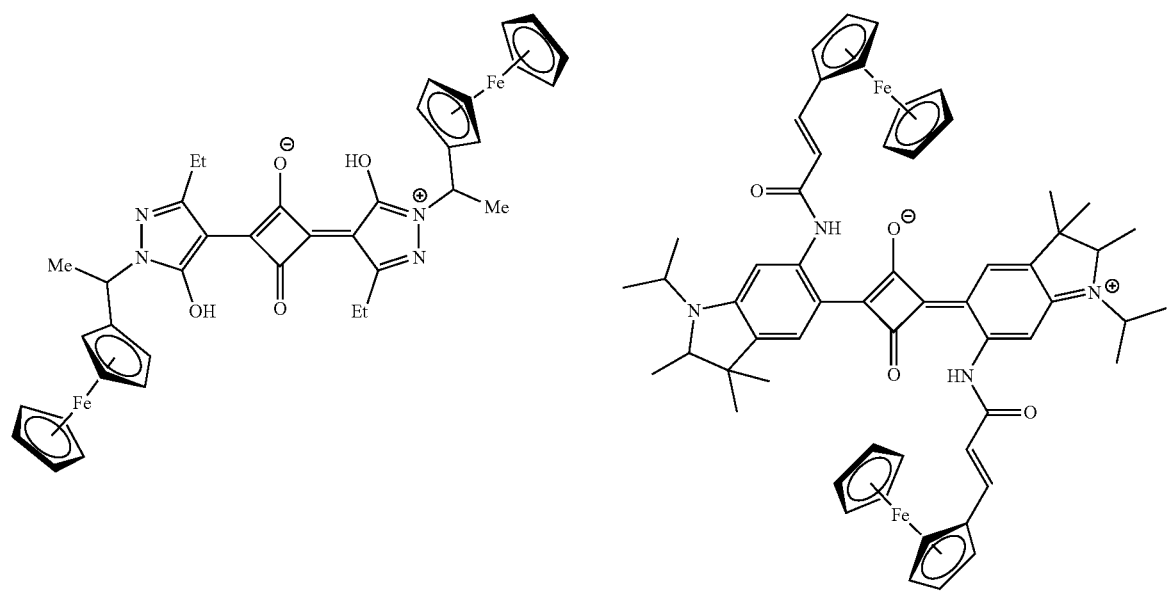
F-13
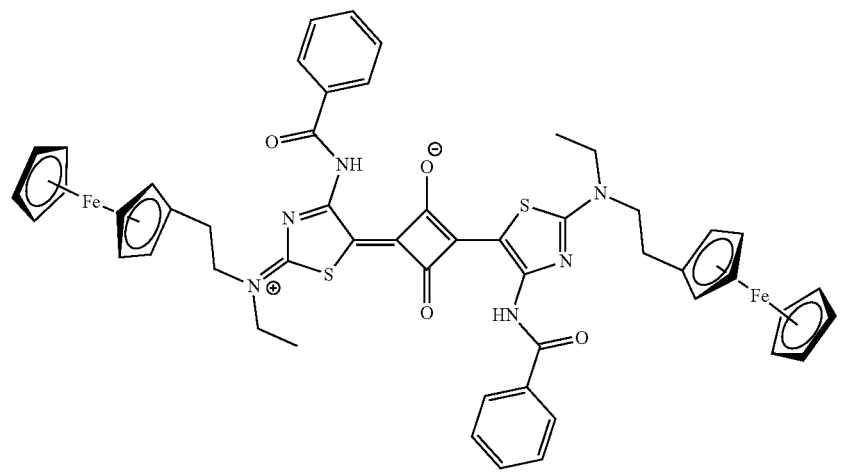

F-14
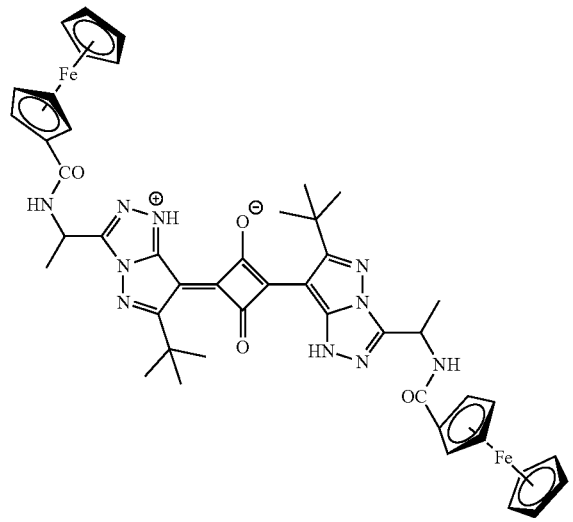
F-15
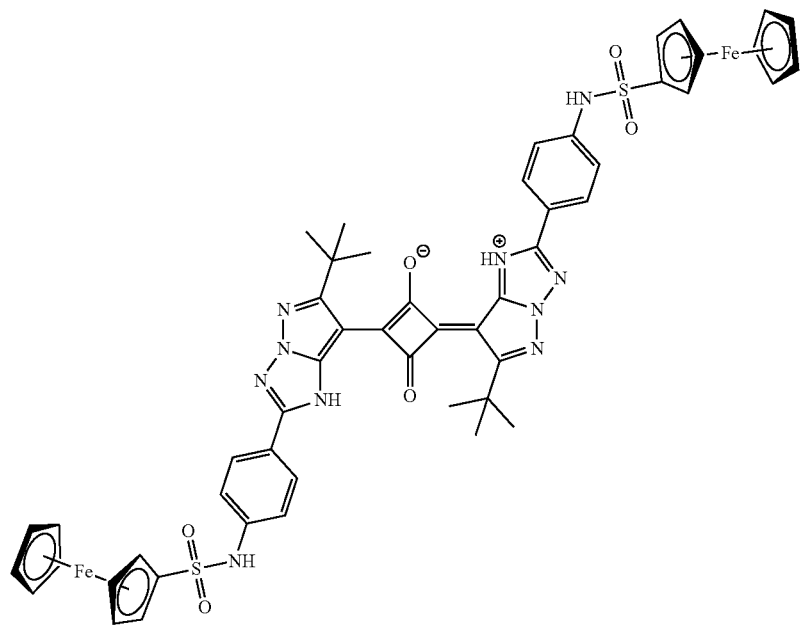

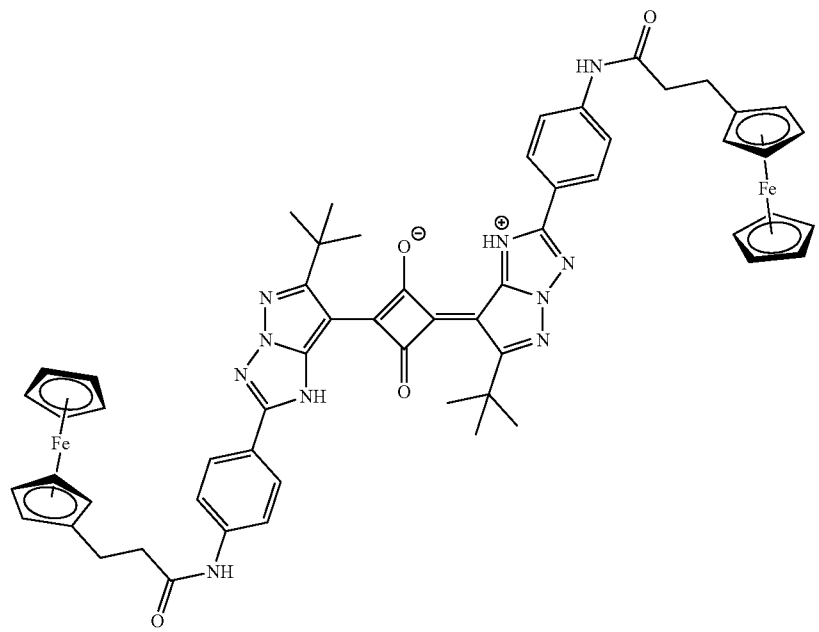
F-16
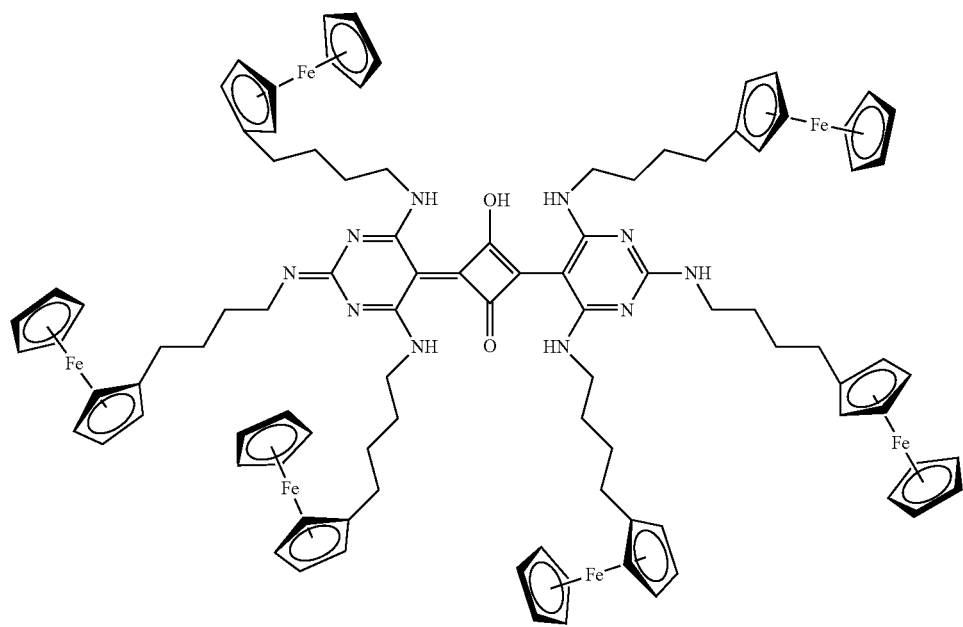
F-17

-continued
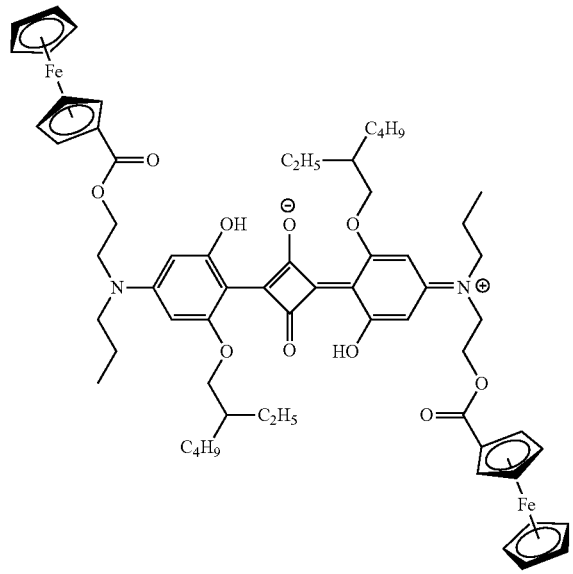
F-18
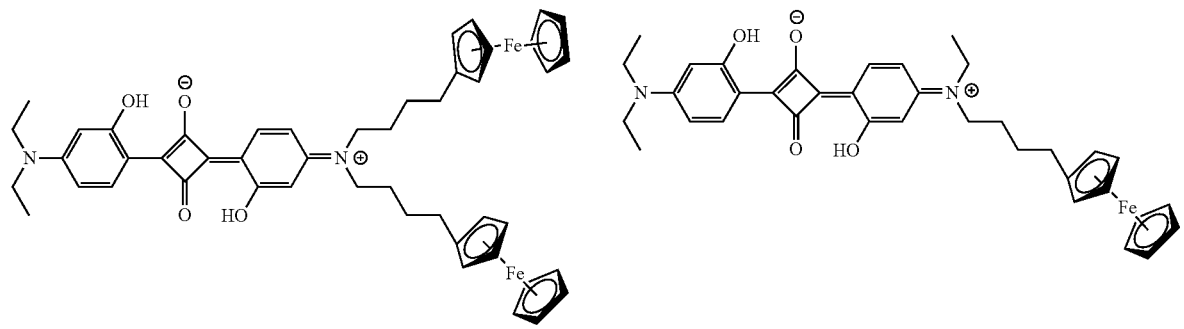
F-19        F-20
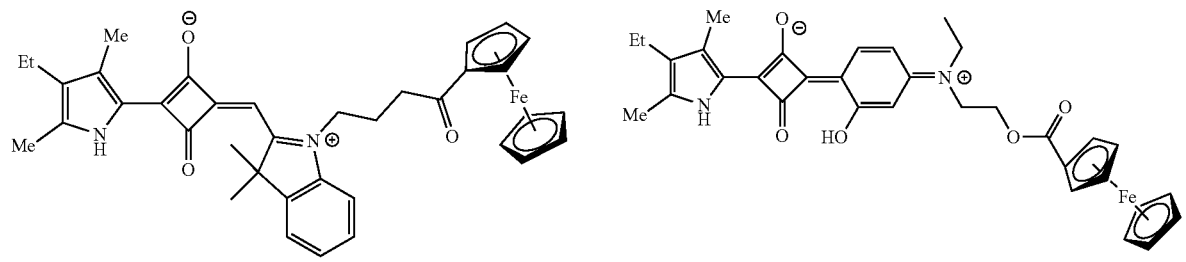
F-21        F-22
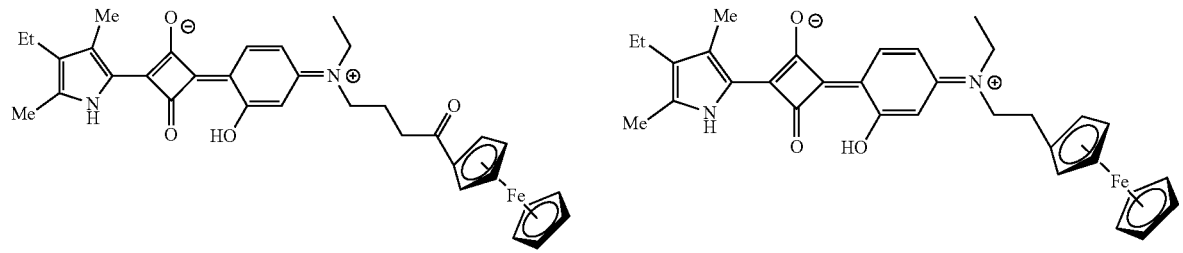
F-23        F-24

F-25
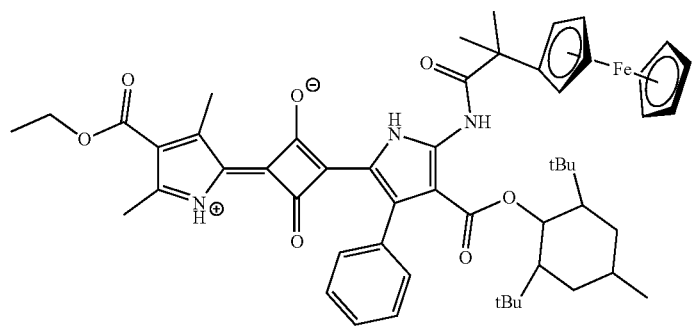
F-26
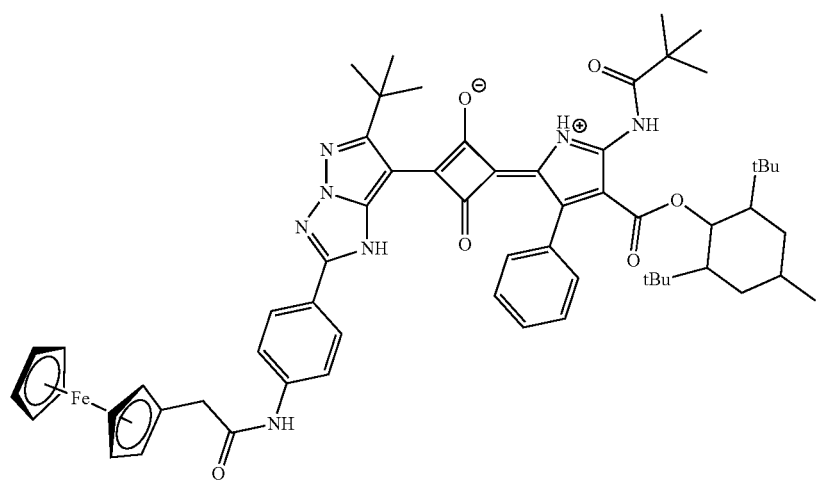
F-27
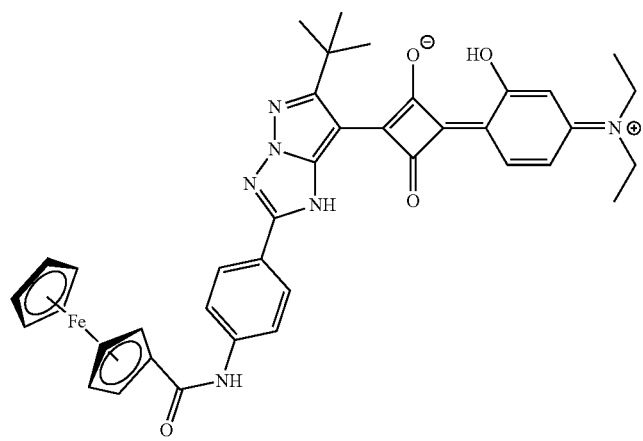

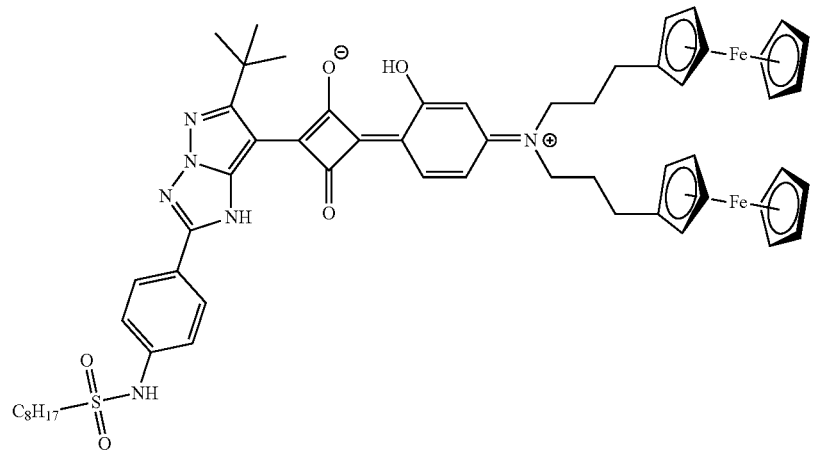
F-28
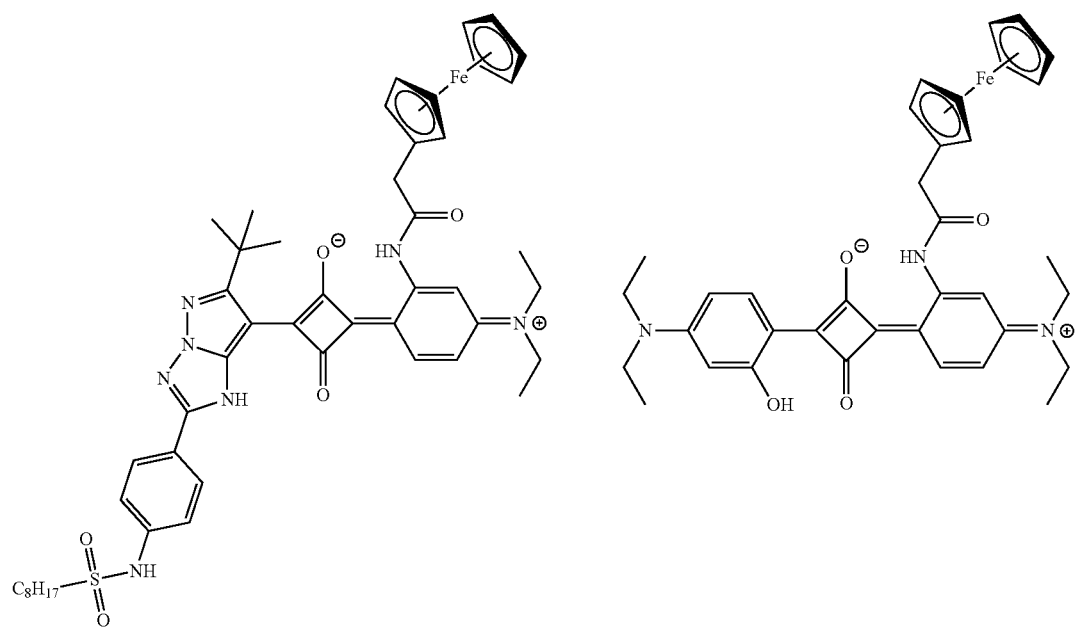
F-29
F-30
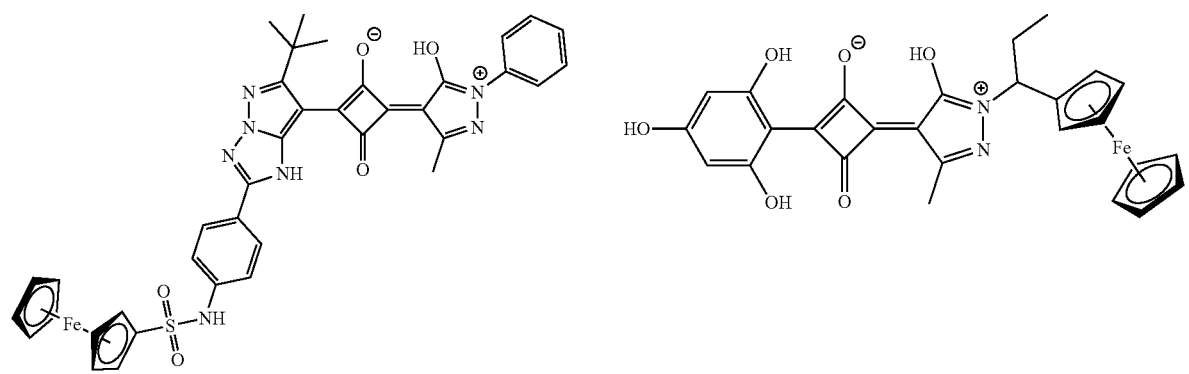
F-31
F-32

-continued
F-33
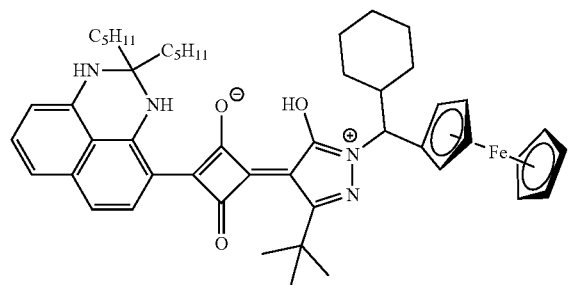
F-34
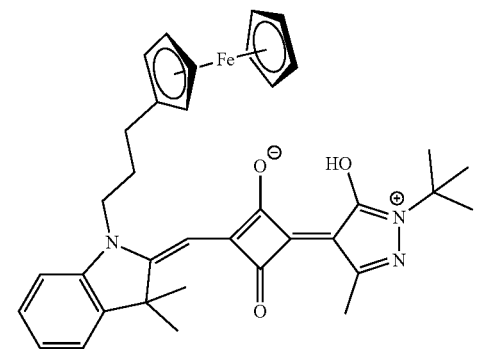
F-35
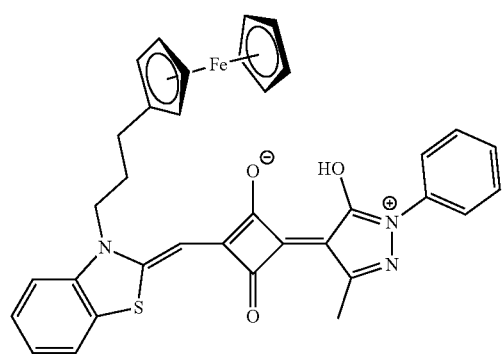
F-36
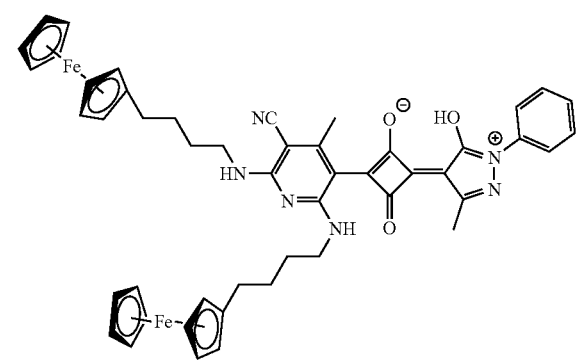
F-37
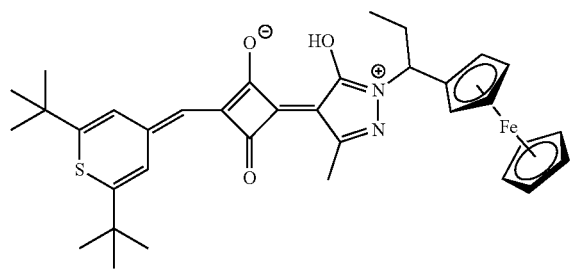
F-38
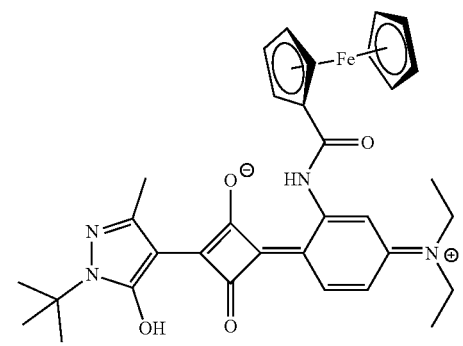
F-39
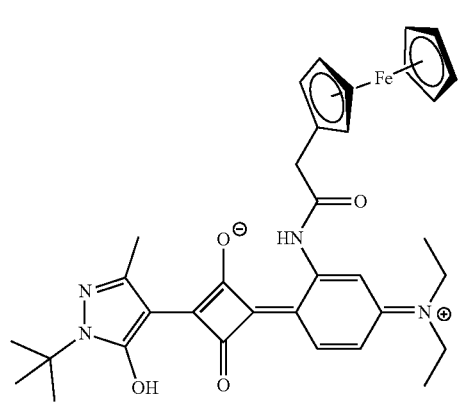
F-40
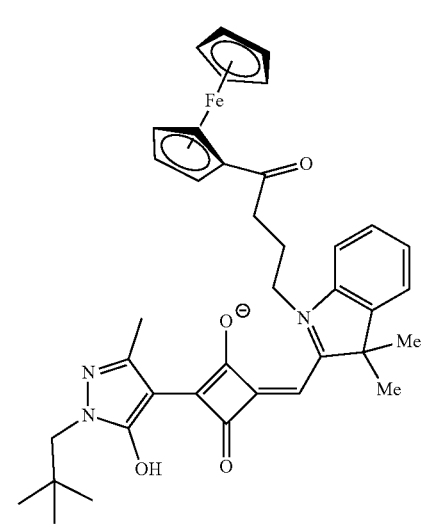

-continued
F-41
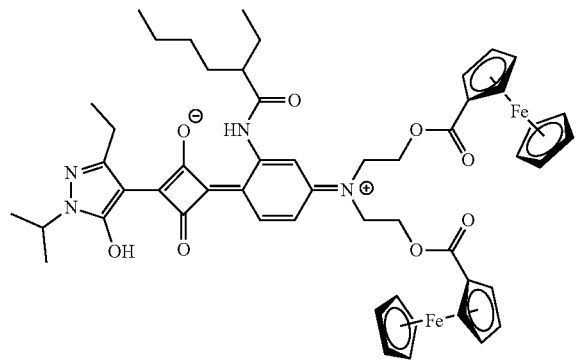
F-42
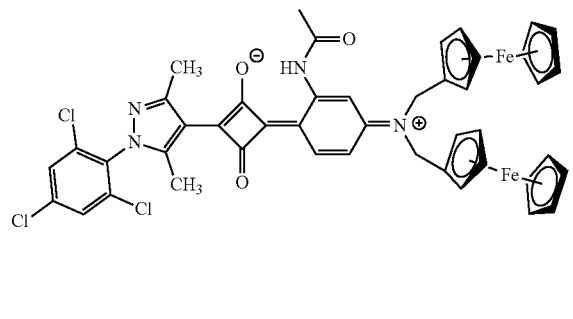
F-43
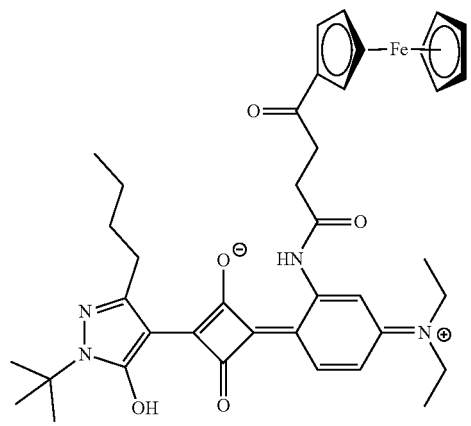
F-44
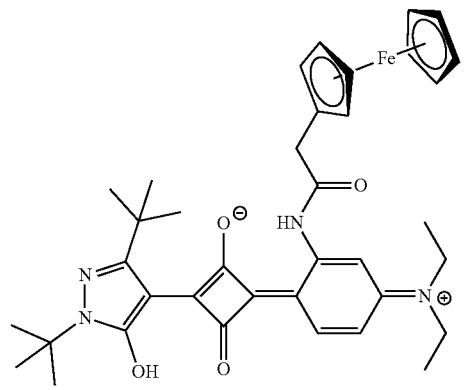
F-45
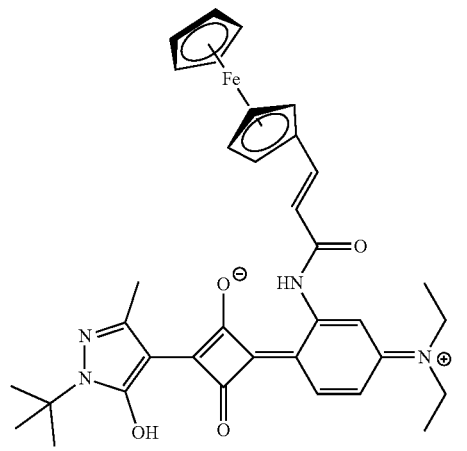
F-46
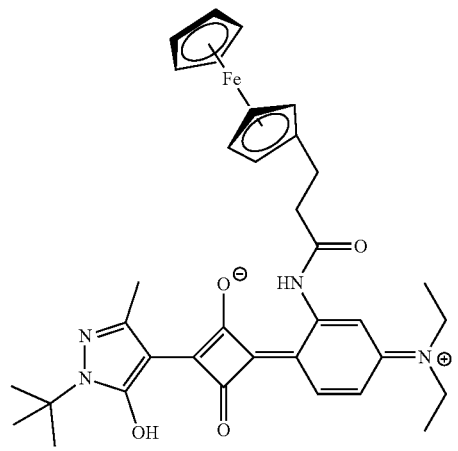

F-47
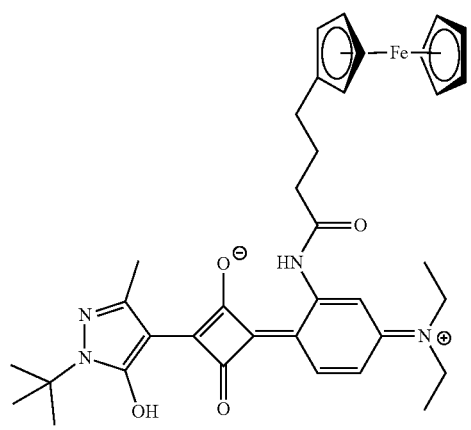
F-48
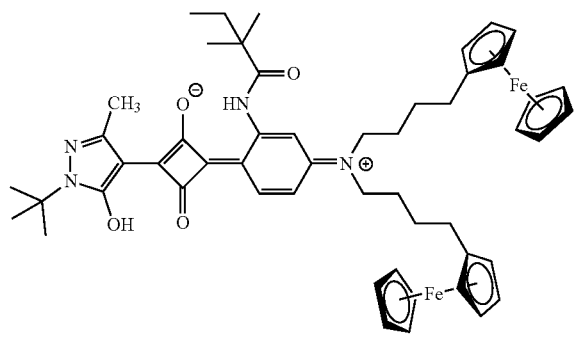
F-49
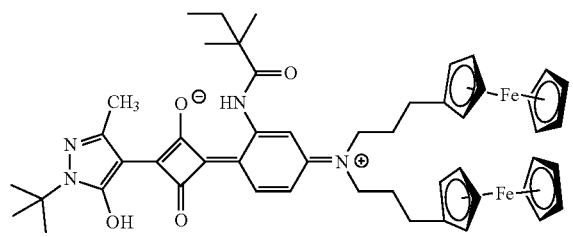
F-50
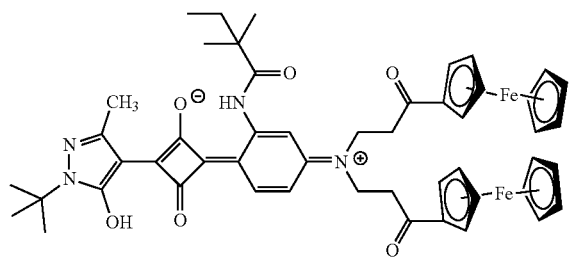
F-51
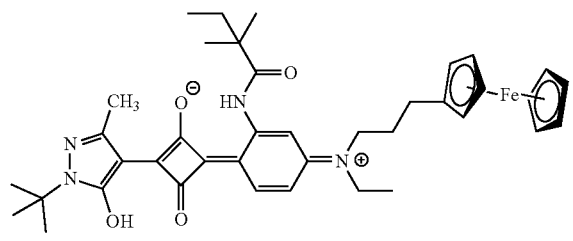
F-52
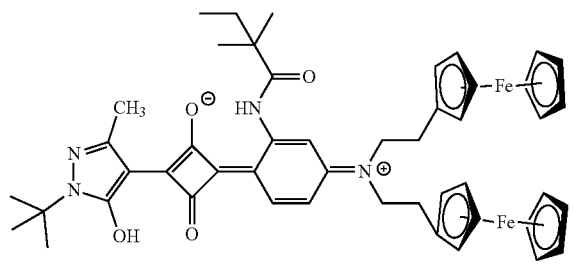
F-53
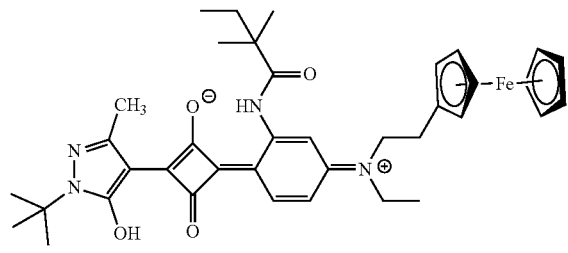
F-54
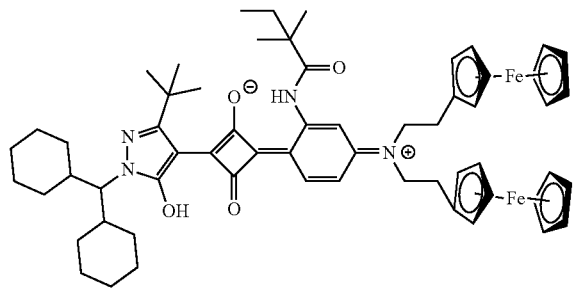

-continued
F-55
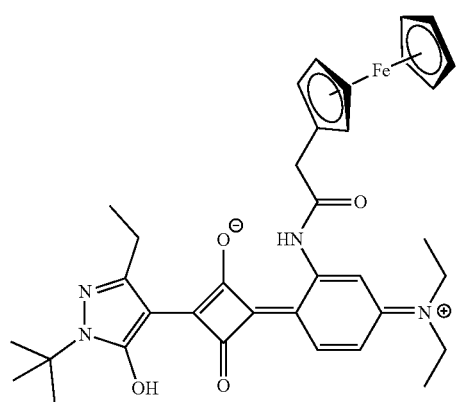
F-56
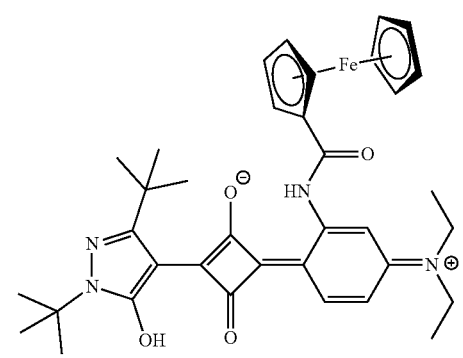
F-57
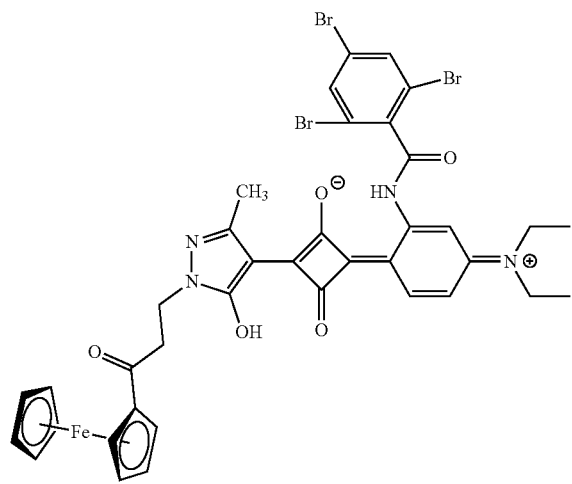
F-58
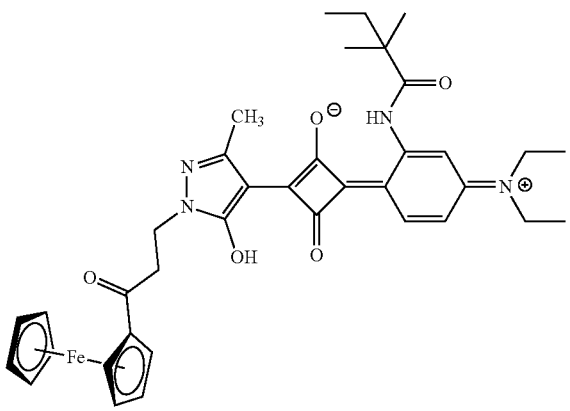
F-59
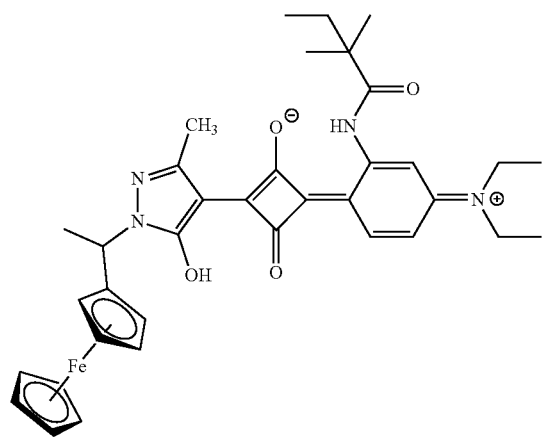
F-60
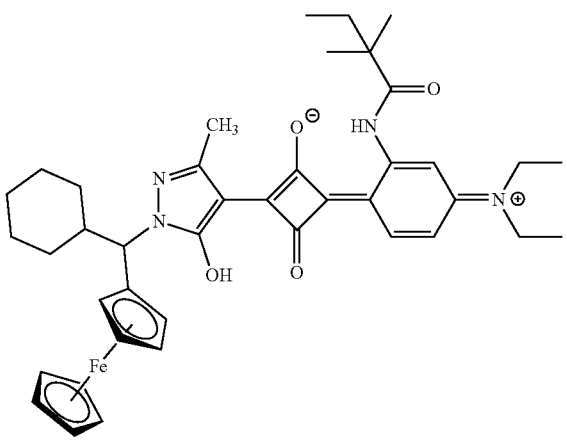

-continued
F-61
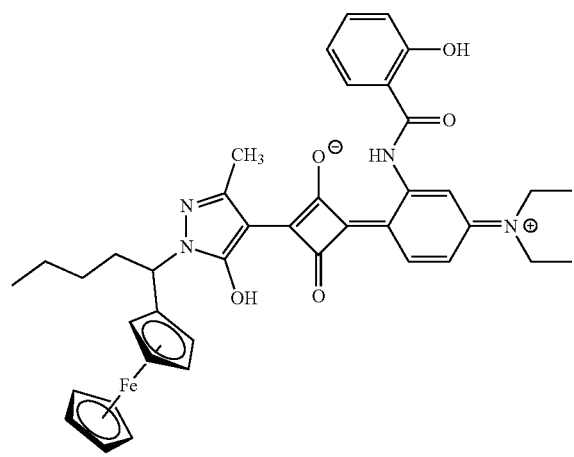
F-62
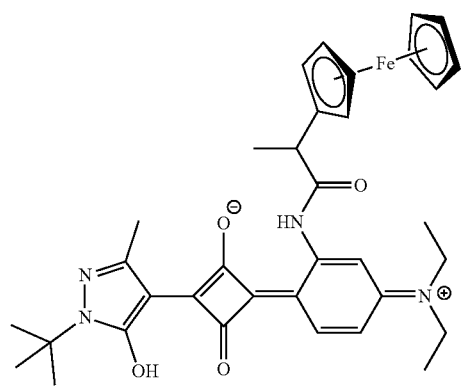
F-63
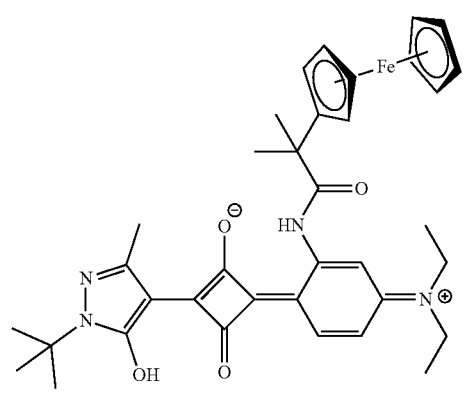
F-64
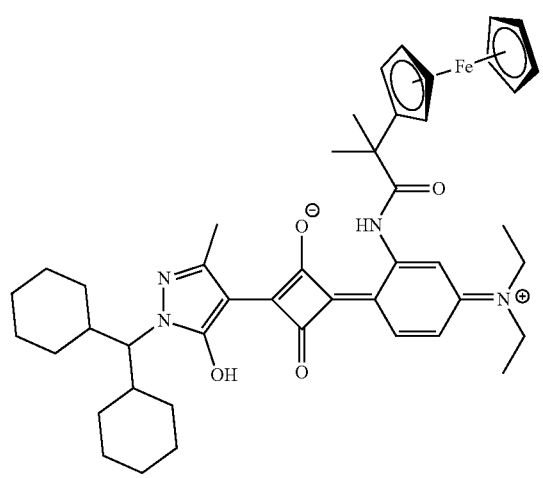
F-65
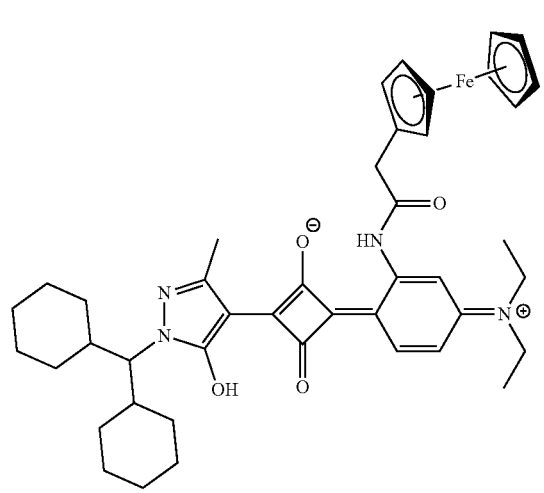
F-66
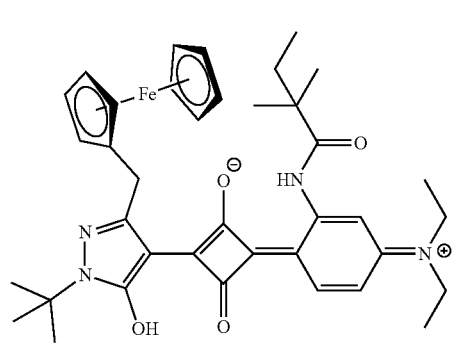

-continued
F-67
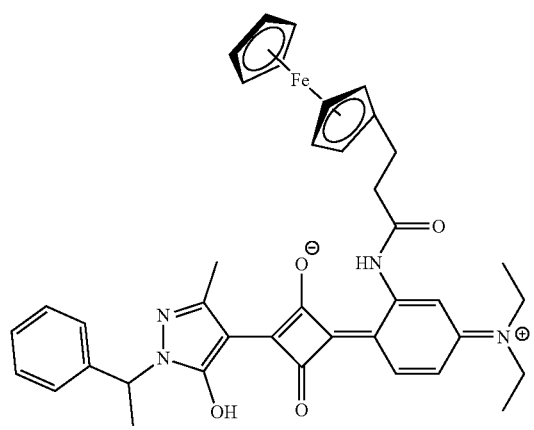
F-68
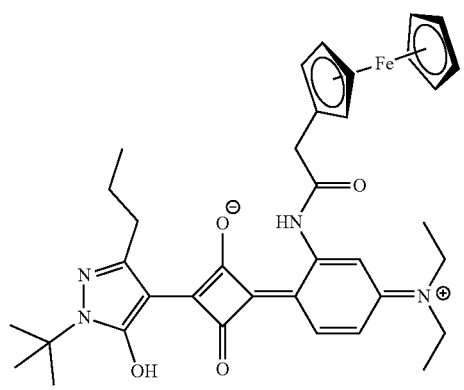
F-69
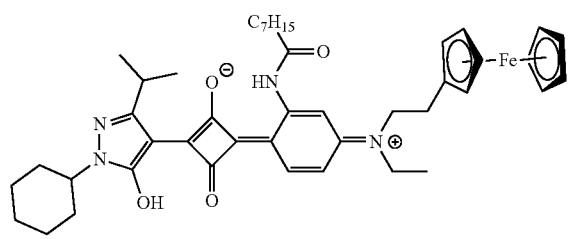
F-70
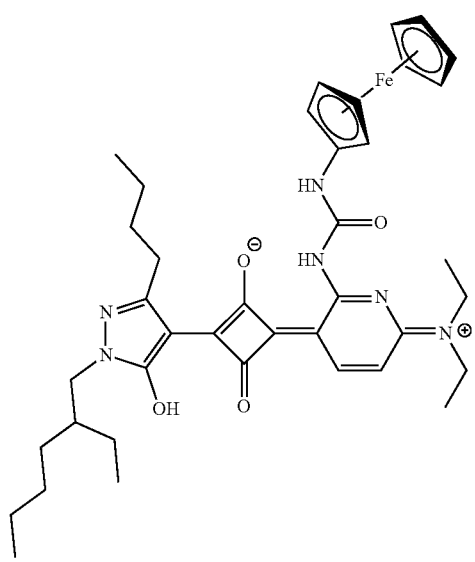
F-71
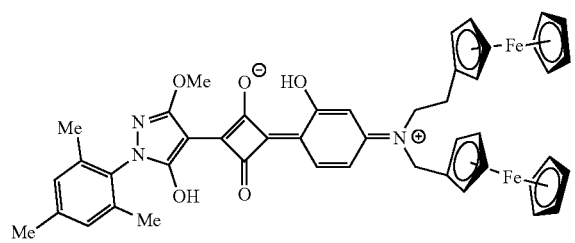
F-72
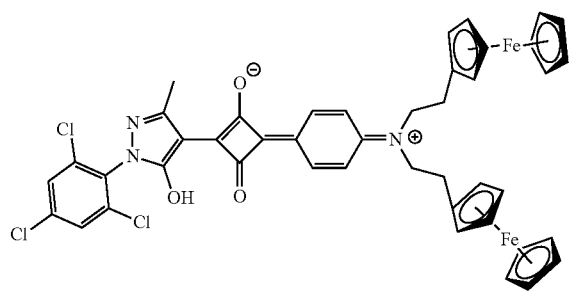

-continued
F-73
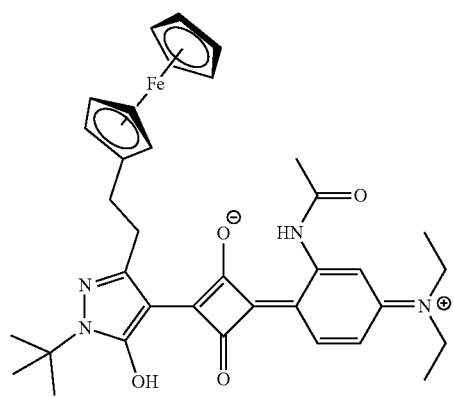
F-74
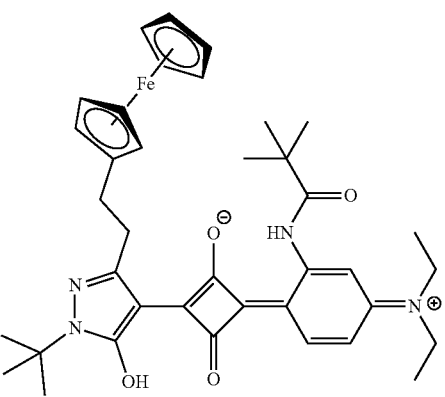
F-75
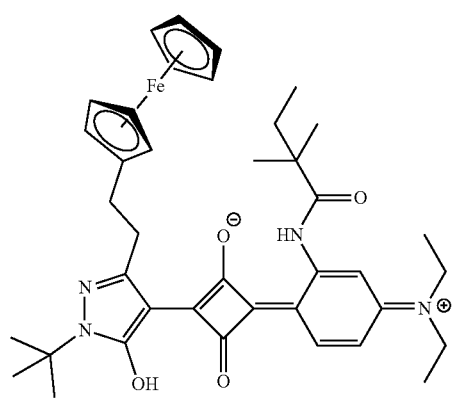
F-76
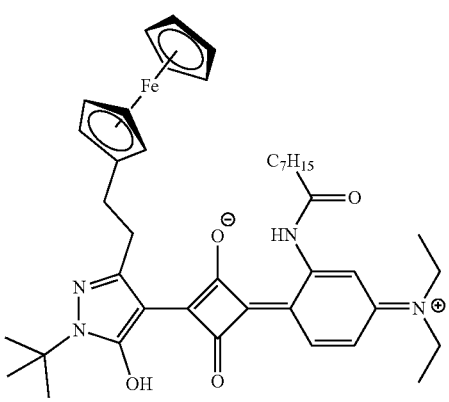
F-77
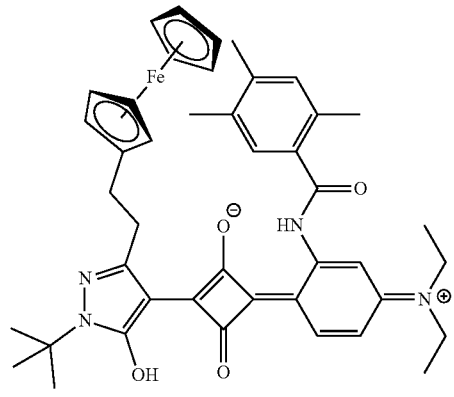
F-78
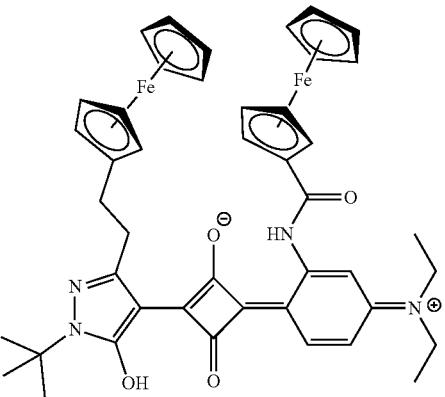
F-79
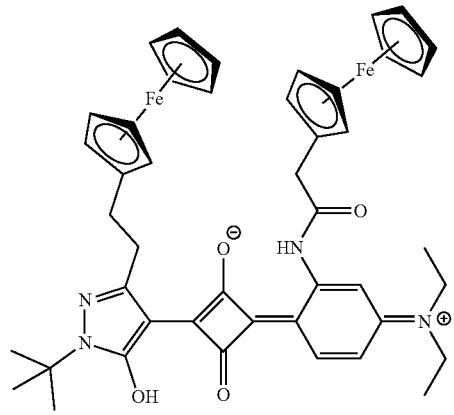
F-80
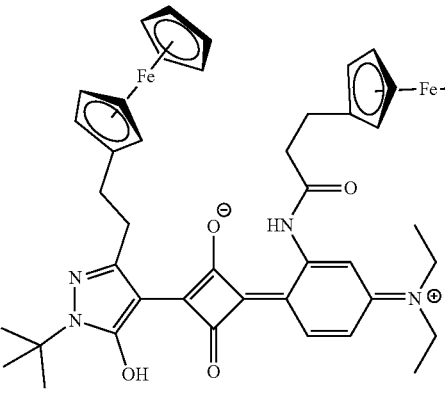

F-81
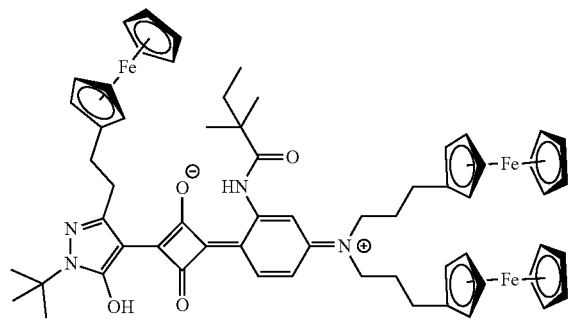
F-82
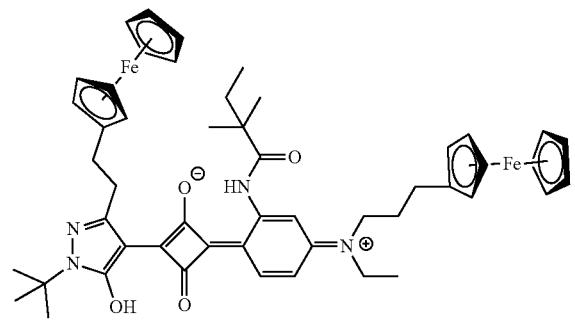
F-83
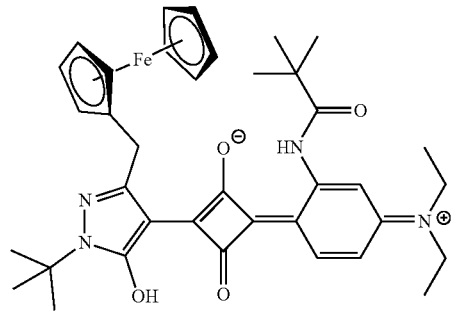
F-84
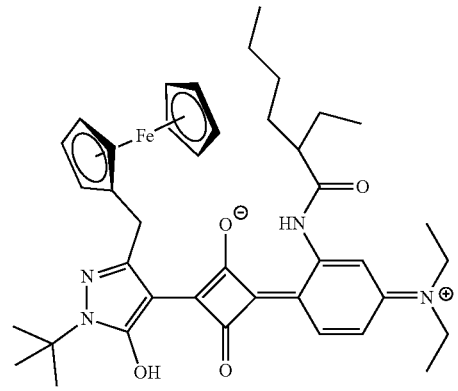
F-85
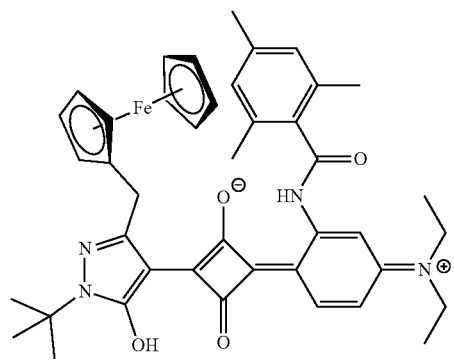
F-86
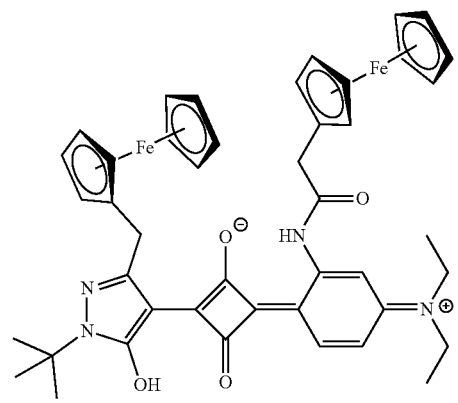
F-87
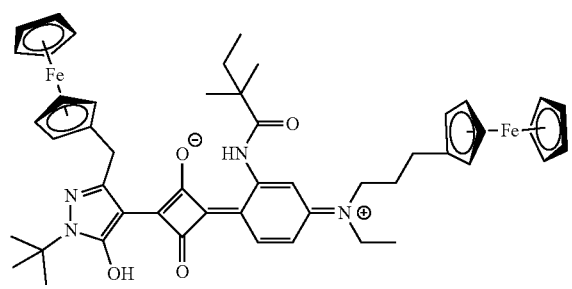
F-88
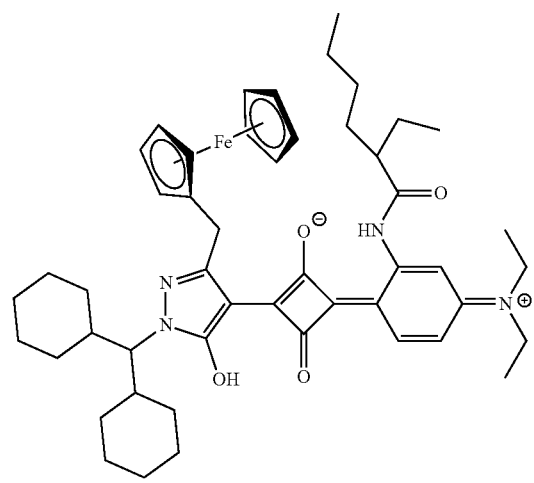

-continued
F-89
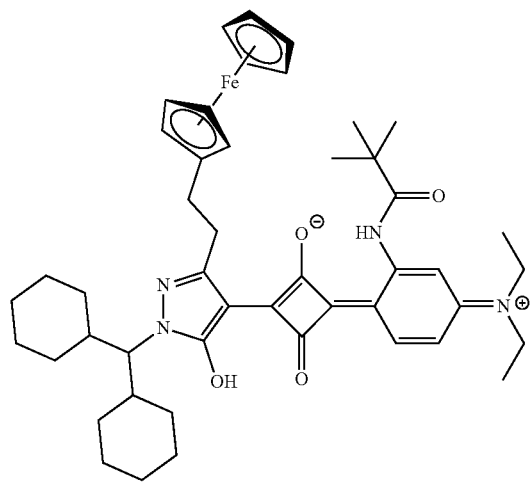
F-90
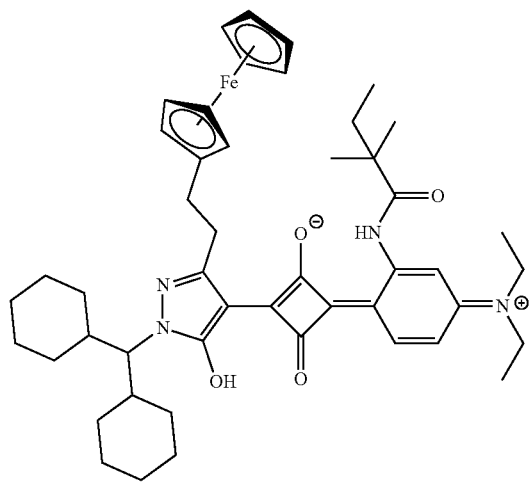
F-91
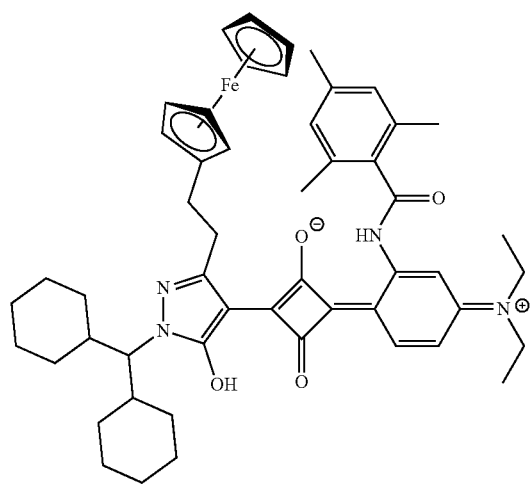
F-92
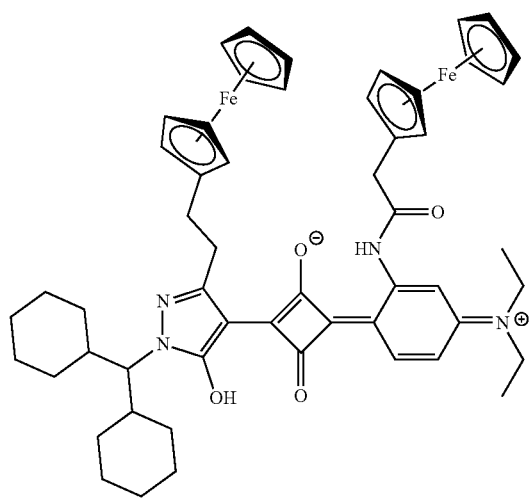
F-93
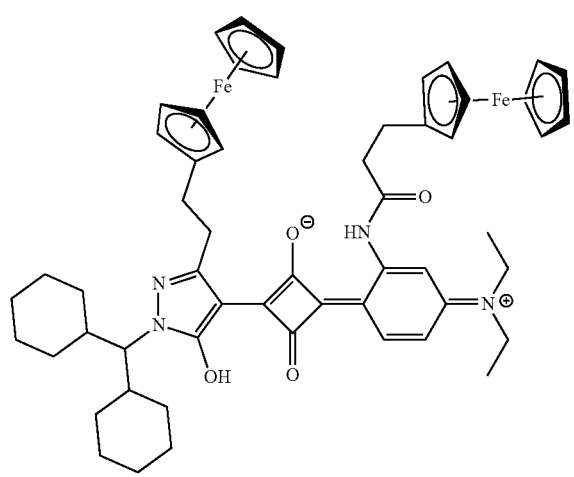

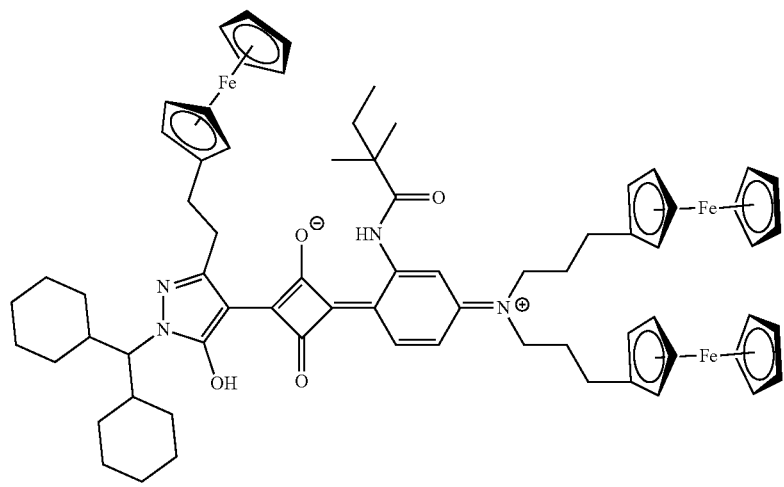
F-94
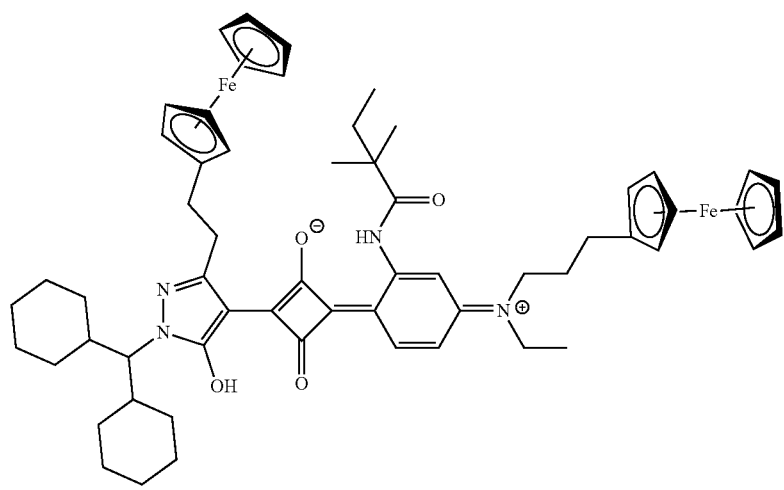
F-95
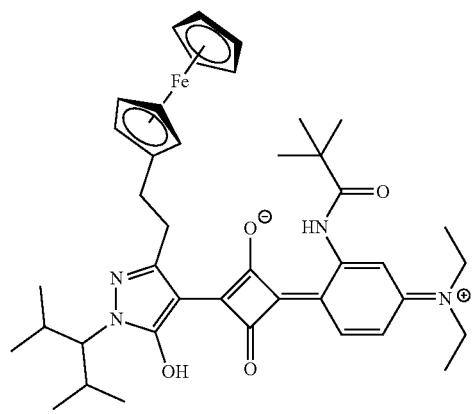
F-96
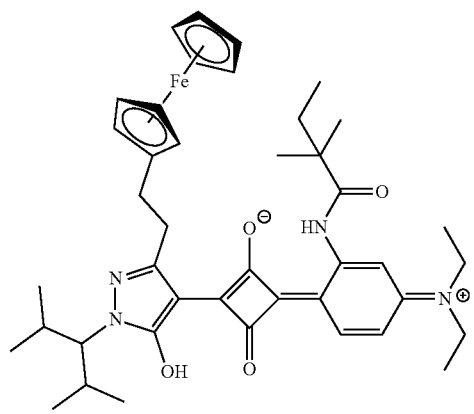
F-97

-continued
F-98
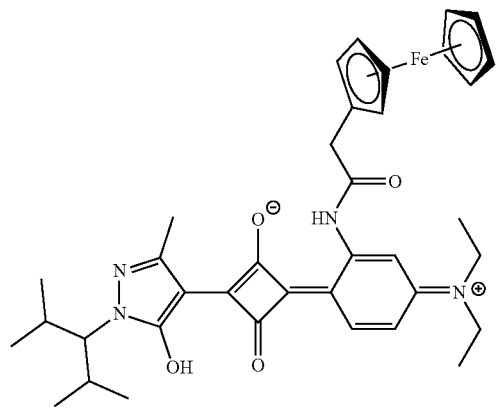
F-99
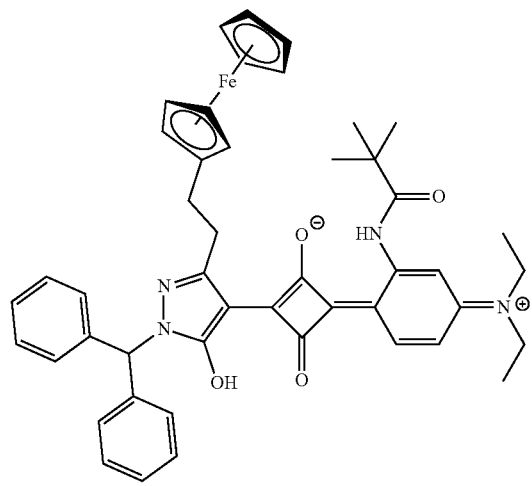
F-100
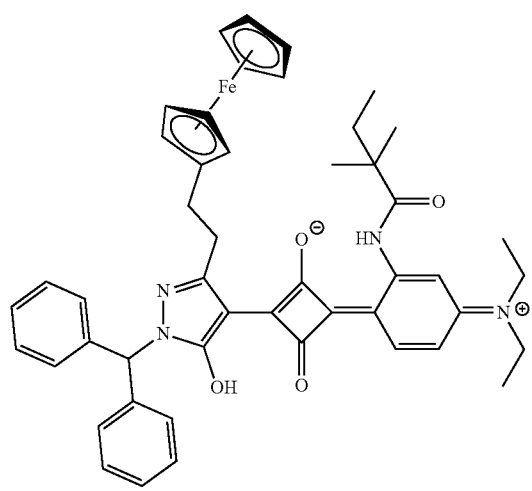
F-101
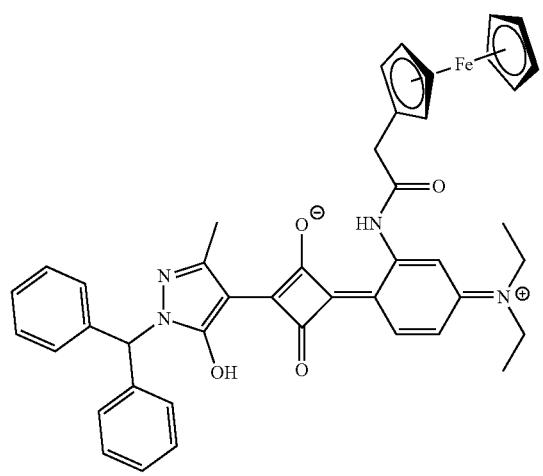
F-102
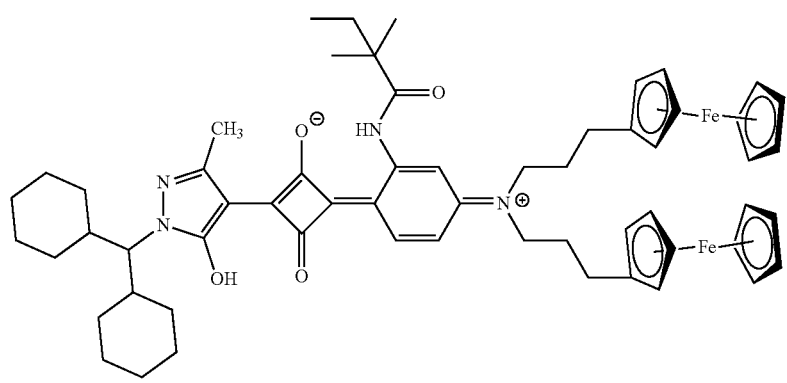

-continued
F-103
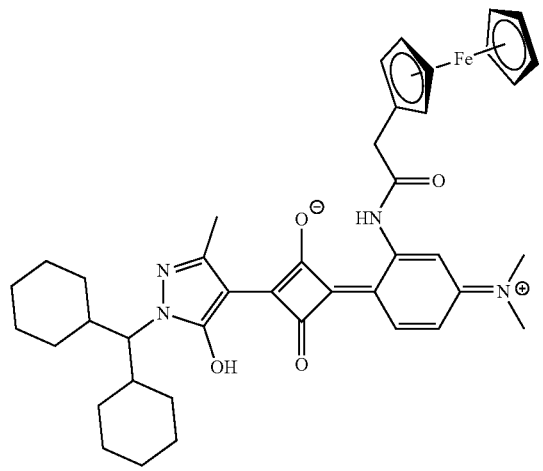
F-104
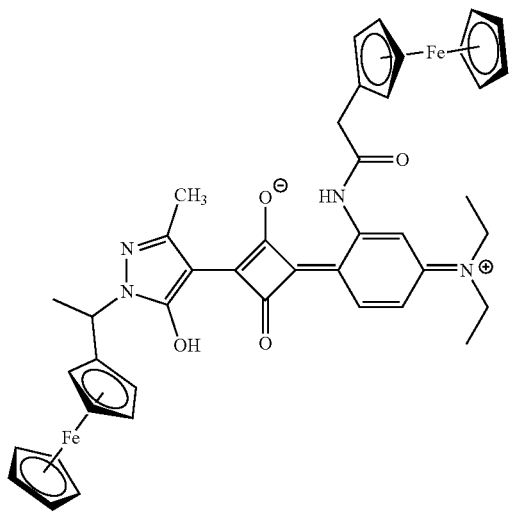
F-105
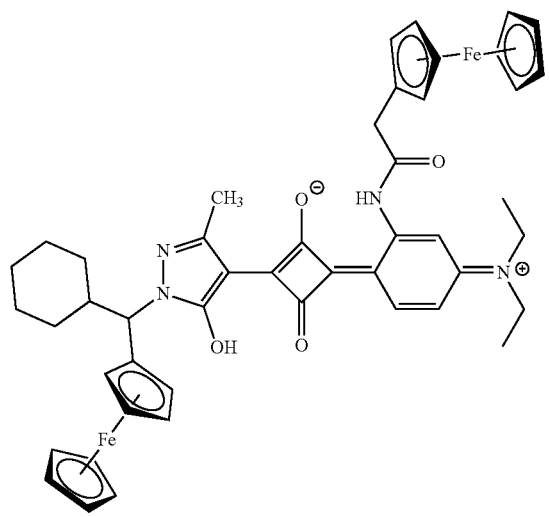
F-106
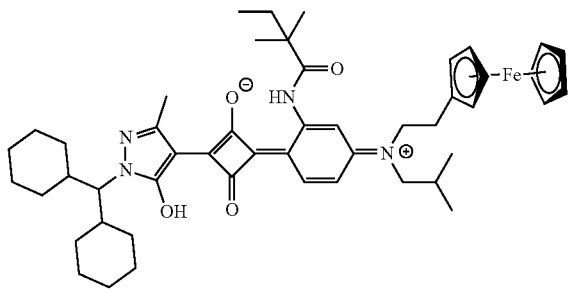
F-107
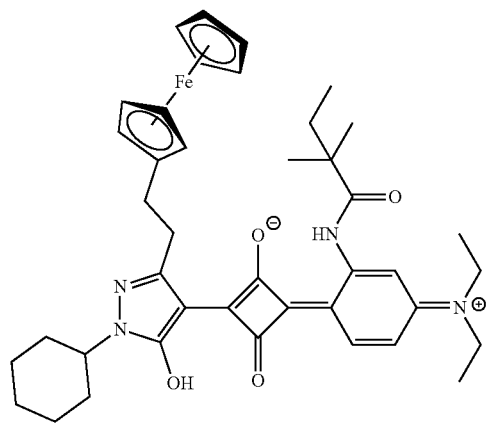
F-108
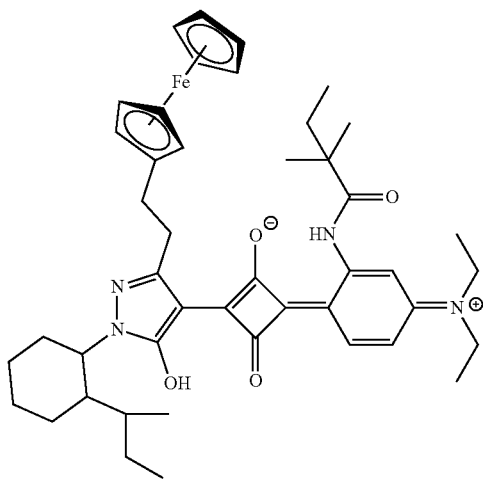

-continued
F-109
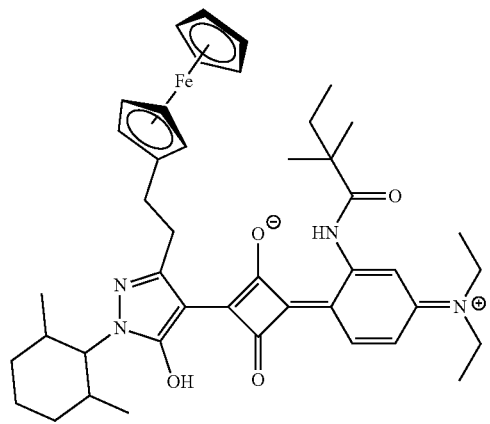
F-110
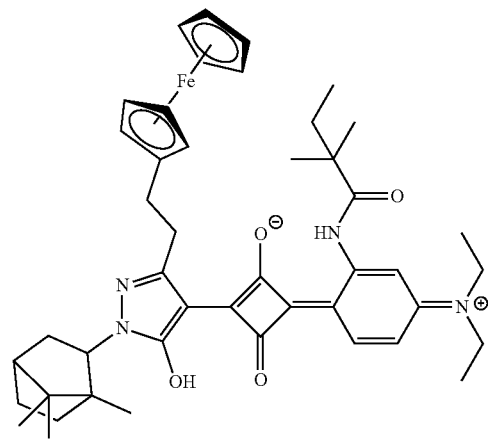
F-111
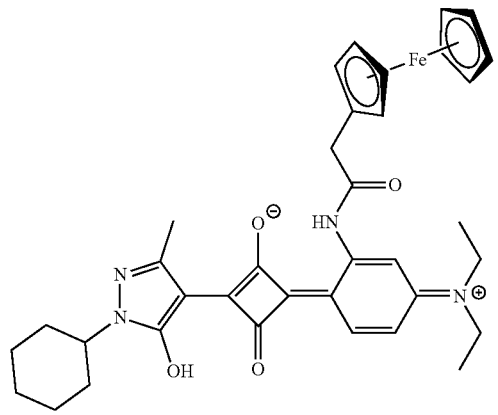
F-112
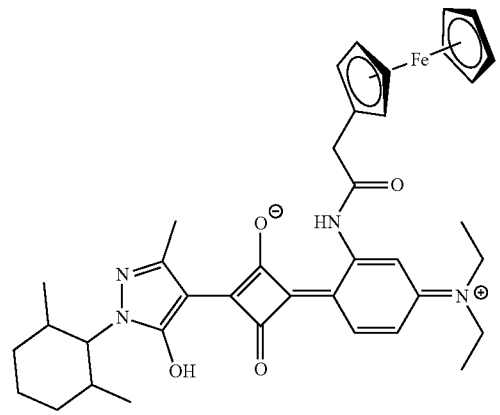
F-113
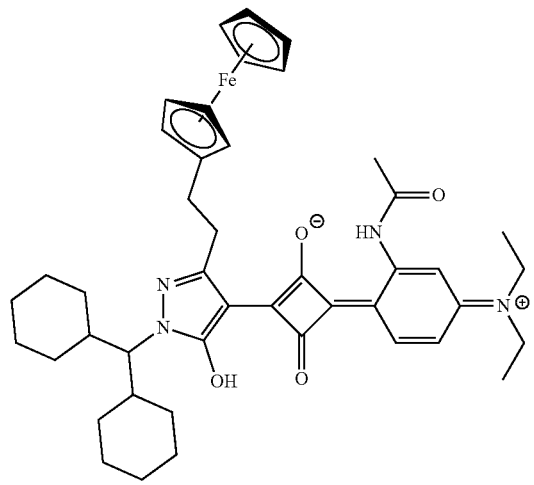

F-114
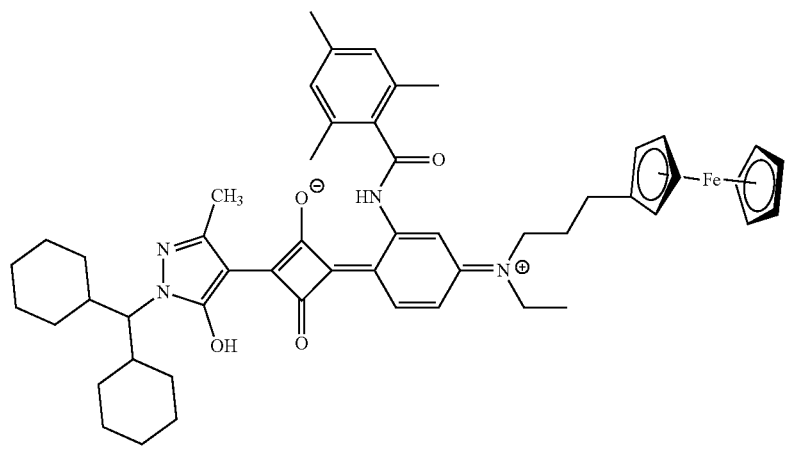
F-115
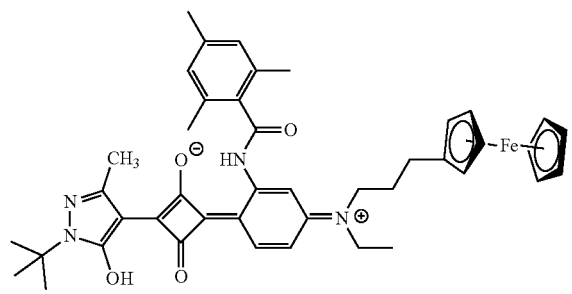
F-116
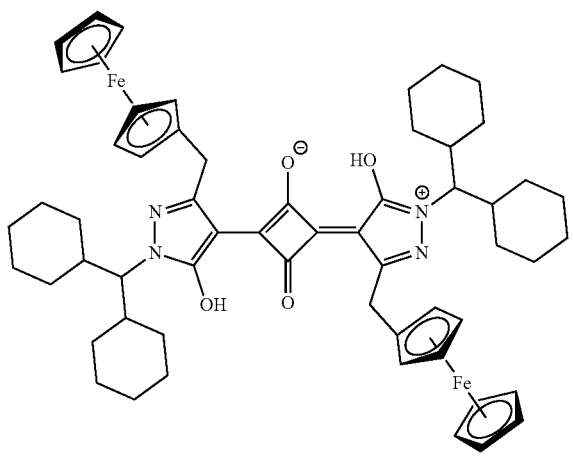
F-117
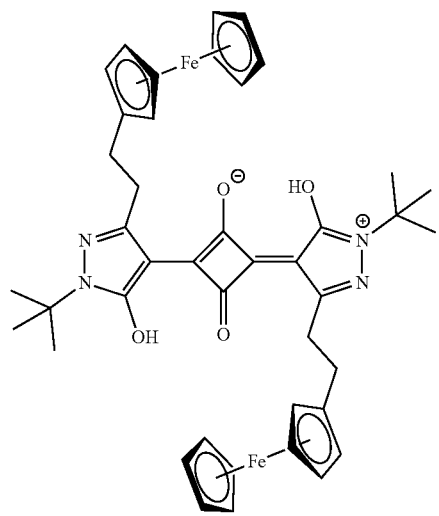
F-118
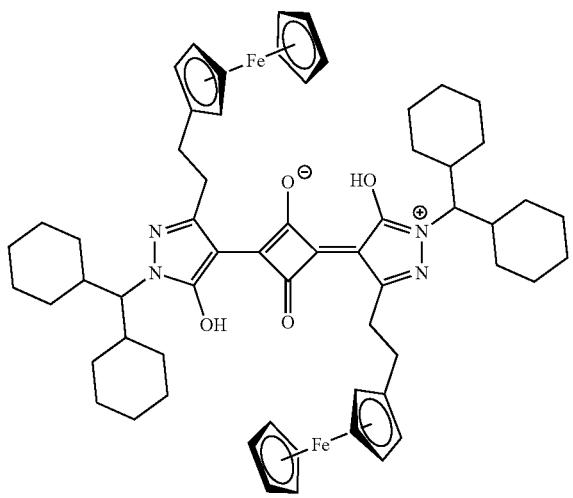

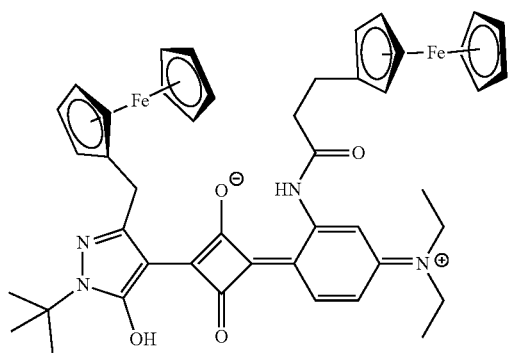

F-119

In the resin composition according to the embodiment of the present invention, the content of the colorant mixture is preferably 0.005 parts by mass to 5 parts by mass, more preferably 0.01 pans by mass to 3 parts by mass, and still more preferably 0.1 parts by mass to 1.5 parts by mass with respect to 100 parts by mass of the binder resin described later.

In a case where the optical filter according to the embodiment of the present invention also serves as a polarizing plate-protective film or a pressure-sensitive adhesive layer which will be described later, it is sufficient that the content of the colorant mixture is within the above-described range.

The colorant represented by Formula (1) can be synthesized by a known method, and can be synthesized, for example, according to the synthetic method described in Examples described later.

<Organic Solvent>

The resin composition according to the embodiment of the present invention preferably contains one or two or more organic solvents. In a case where the resin composition according to the embodiment of the present invention contains an organic solvent, it is sufficient that the colorant mixture and the resin are in a form of being mixed with the organic solvent, but it is preferably in a form of a solution dissolved in the organic solvent.

The organic solvent is not particularly limited as long as the organic solvent can dissolve the colorant mixture and the resin, and specific examples thereof include the organic solvent described in the method for producing an optical filter described later. In addition, in a case where the resin composition contains an organic solvent, the content of the organic solvent with respect to 100 parts by mass of the resin in the composition is not particularly limited, but is preferably 150 to 5000 parts by mass and more preferably 400 to 2000 parts by mass.

<Resin>

The resin composition according to the embodiment of the present invention contains a resin (binder) (binder may include any conventional component in addition to a polymer, hereinafter, may be referred to as a "binder resin"). The resin used in the present invention is preferably transparent. Here, the transparent resin refers to a resin having total light transmittance, measured by forming a 1 mm-thick test piece, of usually 70% or more, preferably 80% or more, and more preferably 90% or more. Examples of the resin used as a binder of the resin composition according to the embodiment of the present invention include a polystyrene resin, a cycloolefin-based resin, a cellulose acylate resin, and an acrylic resin, in which usual resins used as an optical filter can be applied. Among these, from the viewpoint of further reducing the fluorescence quantum yield, a polystyrene resin or a cycloolefin-based resin is preferable, and a polystyrene resin is particularly preferable.

Preferred aspects of the polystyrene resin and the cycloolefin-based resin which are preferable as the resin used in the present invention will be described.

(Poly Styrene Resin)

A polystyrene included in the polystyrene resin refers to a polymer including 50% by mass or more of a styrene component. In the present invention, only one polystyrene mas be used or two or more polystyrenes may be used in combination. Here, the styrene component refers to a constitutional unit derived from a monomer having a stryene skeleton in the structure.

For the purpose of controlling; a photoelastic coefficient of a resin composition or an optical filter to be preferable and controlling hygroscopicity of the resin composition or the optical filter to be preferable, the polystyrene more preferably includes 70% by mass or more of the styrene component and still more preferably includes 85% by mass or more of the styrene component. In addition, it is preferable that the polystyrene is composed of only the styrene component.

Examples of the polystyrene include a homopolymer of a styrene compound and a copolymer of too or more styrene compounds. Here, the styrene compound refers to a compound having a styrene skeleton in the structure and also refers to a compound, in addition to styrene, in which a substituent is introduced to the extent that the ethylenically unsaturated bond of styrene can act as a reactive (polymerizable) group. Examples of the styrene compound include styrene; alkyl styrenes such as α-methyl styrene, o-methyl styrene, m-methyl strene, p-methyl styrene, 3,5-dimethyl styrene, 2,4-dimethyl styrene, o-ethyl styrene, p-ethyl styrene, and tert-butyl styrene, and substituted styrenes in which a hydroxyl group, an alkoxy group, a carboxy group, a halogen, or the like is introduced to a benzene nucleus of styrene, such as hydroxy styrene, tert-butoxy styrene, vinyl benzoic acid, o-chlorostyrene, and p-chlorostyrene. Among these, from the viewpoint of easy procurement, material costs, and the like, the pot styrene used in the present invention is preferably a homopolymer of styrene (that is, polystyrene).

In addition, constitutional components other than the styrene component, which are included in the above-described polystyrene, are not particularly limited. That is, the polystyrene may be a styrene-diene copolymer or a styrene-polymerizable unsaturated carboxylate ester copolymer. In addition, it is also possible to use a mixture of polystyrene and synthetic rubber (for example, at least one of polybutadiene or pol isoprene), in addition, high impact polystyrene (HIPS) obtained by graft-polymerizing styrene to synthetic rubber is also preferable. In addition, polystyrene (referred to as graft-type high impact polystyrene "graft HIPS") obtained by dispersing a rubber-form elastic body in a continuous phase of a polymer including the styrene component (for example, a copolymer of the styrene component and a (meth)acrylate ester component) and graft-polymerizing the copolymer to the rubber-form elastic body is also preferable. Furthermore, so-called styrene-based elastomers can also be suitably used.

In addition, the above-described polystyrene may be hydrogenated (may be a hydrogenated polystyrene). The hydrogenated polystyrene is not particularly limited, but is preferably hydrogenated styrene-diene-based copolymers such as a hydrogenated styrene-butadiene-styrene block copolymer (SEBS) and a hydrogenated styrene-isoprene-styrene block copolymer (SEPS), which are resins obtained by adding hydrogen to styrene-butadiene-styrene block copolymer (SBS) or styrene-isoprene-styrene block copolymer (SIS). The hydrogenated polystyrene mar be used singly or in combination of two or more thereof.

The molecular weight of the polystyrene used in the present invention is appropriately selected depending on the purpose of use, but is in range of, based on mass average molecular weight measured by gel permeation chromatography of a tetrahydrofuran solution (in a case where the polymer is not dissolved, toluene solution), usually 5000 to 500000, preferably 8000 to 200000, and more preferably 10000 to 100000. A polymer having a molecular weight within the above-described range is capable of satisfying both the mechanical strength and molding workability of a molded product at a high level in a well-balanced manner.

As the poly styrene, a plurality of types of polystyrene having different compositions, molecular weights, and the like can be used in combination.

The polystyrene resin can be obtained by a known anion, massive, suspension, emulsification, or solution polymerization method. In addition, in the polystyrene resin, either the conjugated diene or the unsaturated double bond of the benzene ring of the styrene monomer may be hydrogenated. The hydrogenation rate can be measured by a nuclear magnetic resonance device (NMR).

As the polystyrene resin, a commercially available product may be used, and examples thereof include "CLEAREN 530L", "CLEAREN 730L" manufactured by Denka Company Limited, "TUFPRENE 126S", "ASAPRENE T411" manufactured by Asahi Kasei Corporation, "KRATON D1102A", "KRATON D1116A" manufactured by Kraton Corporation, "STYROLUX S", "STYROLUX T" manufactured by INEOS Styrolution Group GmbH, "ASAFLEX 840", "ASAFLEX 860" manufactured by Asahi Kasei Corporation (all of which is SBS), "679", "HF77", "SGP-10" manufactured by PS Japan Corporation, "DICSTYRENE XC-515", "DICSTYRENE XC-535" manufactured by DIC Corporation (all of which is GPPS), "475D", "H0103", "HT478" manufactured by PS Japan Corporation, and "DICSTYRENE GH-8300-5" manufactured by DIC Corporation (all of which is HIPS). Examples of the hydrogenated polystyrene-based resin include "TUFTEC H Series" manufactured by Asahi Kasei Corporation, "KRATON G Series" manufactured by Shell Japan Limited (all of which is SEBS). "DYNARON" manufactured by JSR Corporation (hydrogenated styrene-butadiene random copolymer), and "SEPTON" manufactured by Kuraray Co. Ltd (SEPS). In addition, examples of a modified Polystyrene-based resin include "TUFTEC M Series" manufactured by Asahi Kasei Corporation, "EPOFRIEND" manufactured by Daicel Corporation, "polar group-modified DYNARON" manufactured by JSR Corporation, and "REST DA" manufactured by Toagosei Co., Ltd.

(Cycloolefin-Based Resin)

A cyclic olefin compound forming a cycloolefin-based polymer (also referred to as a cyclic polyolefin) included in the cycloolefin-based resin is not particularly limited as long as the cyclic olefin compound is a compound having a ring structure including a carbon-carbon double bond, and examples thereof include a norbornene compound, a monocyclic olefin compound which is not a norbornene compound, a cyclic conjugated diene compound, and a vinyl alicyclic hydrocarbon compound.

Examples of the cycloolefin-based polymer included in the cycloolefin-based resin include (1) polymers including a structural unit derived from a norbornene compound, (2) polymers including a structural unit derived from a monocyclic olefin compound which is not a norbornene compound, (3) polymers including a structural unit derived from a cyclic conjugated diene compound, (4) polymers including a structural unit derived from a vinyl alicyclic hydrocarbon compound, and hydrides of polymers including a structural unit derived from each of the compounds (1) to (4). In the present invention, the polymer including a structural unit derived from a norbornene compound and the polymer including a structural unit derived from a monocyclic olefin compound include ring-opening polymers of the respective compounds.

The cycloolefin-based polymer included in the cycloolefin-based resin is not particularly limited, but is preferably a polymer having a structural unit derived from a norbornene compound, which is represented by Formula (A-II) or (A-III). The polymer having the structural unit represented by Formula (A-II) is an addition polymer of a norbornene compound, and the polymer having the structural unit represented by Formula (A-III) is a ring-opening polymer of a norbornene compound.

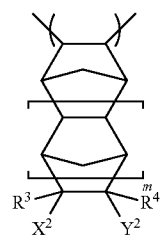

Formula (A-II)

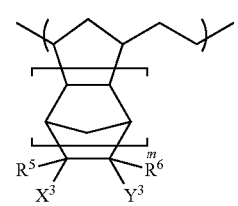

Formula (A-III)

In the formulae, m represents an integer of 0 to 4, and is preferably 0 or 1.

$R^3$ to $R^6$ each independently represent a hydrogen atom or a hydrocarbon group having 1 to 10 carbon atoms.

In the present invention, the hydrocarbon group is not particularly limited as long as the hydrocarbon group is a group consisting of a carbon atom and a hydrogen atom, and examples thereof include an alkyl group, an alkenyl group, an alkynyl group, and an aryl group (aromatic hydrocarbon group). Among these, an alkyl group or an aryl group is preferable.

$X^2$ and $X^3$, $Y^2$ and $Y^3$ each independently represent a hydrogen atom, a hydrocarbon group having 1 to 10 carbon atoms, a halogen atom a hydrocarbon group having 1 to 10 carbon atoms, which is substituted with a halogen atom, —$(CH_2)nCOOR^{11}$, —$(CH_2)nOCOR^{12}$, —$(CH_2)nNCO$, —$(CH_2)nNO_2$, —$(CH_2)nCN$, —$(CH_2)nCONR^{13}R^{14}$, —$(CH_2)nNR^{13}R^{14}$, —$(CH_2)nOZ$, —$(CH_2)nW$, or $(-CO)_2O$ or $(-CO)_2NR^{15}$ which is formed by bonding $X^2$ and $Y^2$, or $X^3$ and $Y^3$.

Here, $R^{11}$ to $R^{15}$ each independently represent a hydrogen atom or a hydrocarbon group having 1 to 20 carbon atoms. Z represents a hydrocarbon group or a hydrocarbon group substituted with halogen, and W represents $Si(R^{16})_p D_{(3-p)}$ ($R^{16}$ represents a hydrocarbon group having 1 to 10 carbon atoms, and D represents a halogen atom, —$OCOR^{17}$, or —$OR^{17}$ ($R^{17}$ represents a hydrocarbon group having 1 to 10 carbon atoms), and p represents an integer of 0 to 3). n represents an integer of 0 to 10, and is preferably 0 to 8 and more preferably 0 to 6.

In Formula (A-II) or (A-III), $R^3$ to $R^6$ are respectively preferably a hydrogen atom or —$CH_3$, and from the viewpoint of moisture permeability, still more preferably a hydrogen atom.

Each of $X^2$ and $X^3$ is preferably a hydrogen atom, —$CH_3$—, or —$C_2H_5$, and from the viewpoint of moisture permeability, still more preferably a hydrogen atom Each of $Y^2$ and $Y^3$ is preferably a hydrogen atom, a halogen atom (particularly a chlorine atom), or —$(CH_2)nCOOR^{11}$ (particularly —$COOCH_3$), and from the viewpoint of moisture permeability, still more preferably a hydrogen atom.

Other groups are appropriately selected.

The polymer having the structural unit represented by Formula (A-II) or (A-III) may further include at least one kind of a structural unit represented by Formula (A-I).

Formula (A-I)

in the formula, $R^1$ and $R^2$ each independently represent a hydrogen atom or a hydrocarbon group having 1 to 10 carbon atoms, and $X^1$ and $Y^1$ each independently represent a hydrogen atom, a hydrocarbon group having 1 to 10 carbon atoms, a halogen atom, a hydrocarbon group having 1 to 10 carbon atoms, which is substituted with a halogen atom, —$(CH_2)nCOOR^{11}$, —$(CH_2)nOCOR^{12}$, —$(CH_2)nNCO$, —$(CH_2)nNO_2$, —$(CH_2)nCN$, —$(CH_2)nCONR^{13}R^{14}$, —$(CH_2)nNR^{13}R^{14}$, —$(CH_2)nOZ$, —$(CH_2)nW$, or $(-CO)_2O$ or $(-CO)_2NR^{15}$ which is formed by bonding $X^1$ and $Y^1$.

Here, $R^{11}$ to $R^{15}$ each independently represent a hydrogen atom or a hydrocarbon group having 1 to 20 carbon atoms. Z represents a hydrocarbon group or a hydrocarbon group substituted with halogen, and W represents $Si(R^{16})_p D_{(3-p)}$ ($R^{16}$ represents a hydrocarbon group having 1 to 10 carbon atoms- and D represents a halogen atom, —$OCOR^{17}$, or —$OR^{17}$ ($R^{17}$ represents a hydrocarbon group having 1 to 10 carbon atoms), and p represents an integer of 0 to 3). n represents an integer of 0 to 10.

From the viewpoint of adhesiveness to a polarizer, the content of the above-described structural unit derived from a norbornene compound in the cyclic polyolefin having the structural twit represented by Formula (A-II) or (A-III) is preferably 90% by mass or less, more preferably 30% to 85% by mass, still more preferably 50% to 79% by mass, and most preferably 60% to 75% by mass with respect to the total mass of the cyclic polyolefin. Here, the proportion of the structural unit derived from a norbornene compound represents the average value in the cyclic polyolefin.

Addition (co)polymers of a norbornene compound are described in JP1998-007732A (JP-H10-007732A), JP2002-504184A, US2004/0229157A1, WO2004/070463A, or the like.

The polymer of a norbornene compound is obtained by an addition polymerization of norbornene compounds (for example, polycyclic unsaturated compounds of norbornene).

In addition, examples of the polymer of a norbornene compound include copolymers obtained by an addition copolymerization of, as necessary, a norbornene compound, and olefin such as ethylene, propylene, and butene, conjugated diene such as butadiene and isoprene, unconjugated diene such as ethylidene norbornene, or an ethylenically unsaturated compound such as acrylonitrile, acrylic acid, methacrylic acid, maleic acid anhydride, acrylic acid ester, methacrylic acid ester, maleimide, vinyl acetate, and vinyl chloride. Among these, a copolymer with ethylene is preferable.

Examples of the above-described addition (co)polymers of a norbornene compound include APL8008T (Tg: 70° C.), APL6011T (Tg: 105° C.), APL6013T (Tg: 125° C.), and APL6015T (Tg: 145° C.) which are sold by Mitsui Chemicals, Inc. under a trade name of APL and have different glass transition temperatures (Tg). In addition, pellets such as TOPAS8007, TOPAS6013, and TOPAS6015 are commercially available from Polyplastics Co., Ltd. Furthermore, Appear3000 is commercially available from Film Ferrania S. R. L.

As the above-described polymer of a norbornene compound, a commercially available product can be used. For example, polymers are commercially available from JSR Corporation under a trade name of Arton G or Arton F, and polymers are commercially available from Zeon Corporation under a trade name of Zeonor ZF14, ZF16, Zeonex 250, or Zeonex 280.

The hydride of the polymer of a norbornene compound can be synthesized by an addition polymerization or a ring-opening metathesis polymerization of a norbornene compound or the like and then an addition of hydrogen. Synthetic methods are described in, for example, JP1989-240517A (JP-H01-240517A), JP1995-196736A (JP-H07-196736A), JP1985-026024A (JP-S60-026024A), JP1987-019801A (JP-S62-019801A), JP2003-159767A, JP2004-309979A, and the like.

The molecular weight of the cycloolefin-based polymer used in the present invention is appropriately selected depending on the purpose of use, but is in range of, based on mass average molecular weight in terms of polyisoprene or polystyrene measured by gel permeation chromatography of a cyclohexane solution (in a case where the polymer is not dissolved, toluene solution), usually 5000 to 500000, preferably 8000 to 200000, and more preferably 10000 to 100000. A polymer having a molecular weight within the above-described range is capable of satisfying both the mechanical strength and molding workability of a molded product at a high level in a well-balanced manner.

From the viewpoint of sharpness of absorption waveform and light resistance, the resin composition according to the embodiment of the present invention includes the binder resin in an amount of preferably 50% by mass or more, more preferably 70% by mass or more, and particularly preferably 90% by mass or more with respect to the total solid content (specifically, with respect to the components excluding the above-described organic solvent).

Two or more binder resins may be used, and binders having at least one different compositional ratios or molecular weights may be used in combination. In this case, the total content of the respective binder resins is within the above-described range.

<Additive>

The resin composition according to the embodiment of the present invention may include an additive as long as the effects of the present invention are not impaired. For example, the resin composition according to the embodiment of the present invention may include an additive which can be generally blended in a plastic film as necessary. Examples of the additive include an antioxidant, a heat stabilizer, a light stabilizer, an ultraviolet absorber, an antistatic agent, a lubricant, a plasticizer, and a filler, and the content thereof can be selected within a range which does not impair the object of the present invention. In addition, examples of the additive include a known plasticizer, an organic acid, a polymer, a retardation adjuster, an ultraviolet absorber, an antioxidant, and a matting agent. With regard to these compounds, reference can be made to the description in paragraphs "0062" to "0097" of JP2012-155287A, and the contents of which are incorporated herein by reference. In addition, examples of the additive include a peeling accelerator, an organic acid, and a polyvalent carboxylic acid derivative. With regard to these compounds, reference can be made to the description in paragraphs "0212" to "0219" of WO2015/005398A, and the contents of which are incorporated herein by reference. Furthermore, examples of the additive include a radical scavenger and a deterioration inhibitor which will be described later.

The content of the additive (in a case where the resin composition contains two or more kinds of additives, total content thereof) is preferably 50 parts by mass or less, more preferably 30 parts by mass or less, and still more preferably 5 to 30 parts by mass with respect to 100 parts by mass of the binder resin.

(Antioxidant)

A preferred example of the additive includes an antioxidant. With regard to the antioxidant, reference can be made to the description in paragraphs "0143" to "0165" of WO2005/005398A, and the contents of which are incorporated herein by reference.

(Radical Scavenger)

A preferred example of the additive includes a radical scavenger. With regard to the radical scavenger, reference can be made to the description in paragraphs "0166" to "0199" of WO2015/005398A, and the contents of which are incorporated herein by reference.

(Deterioration Inhibitor)

A preferred example of the additive includes a deterioration inhibitor. With regard to the deterioration inhibitor, reference can be made to the description in paragraphs "0205" and "0206" of WO2015/005398A, and the contents of which are incorporated herein by reference.

(Ultraviolet Absorber)

In the present invention, from the viewpoint of preventing deterioration, an ultraviolet absorber may be added to the optical filter. From the viewpoint of excellent absorption capacity of ultraviolet rays with a wavelength of 370 nm or less and good liquid cry staff display properties, an ultraviolet absorber having a small absorption of visible light with a wavelength of 400 nm or more is preferably used. Specific examples of the ultraviolet absorber preferably used in the present invention include a hindered phenol-based compound, a hydroxybenzophenone-based compound, a benzotriazole-based compound, a salicylic acid ester-based compound, a benzophenone-based compound, a cyanoacrylate-based compound, and a nickel complex salt compound.

Examples of the hindered phenol-based compound include 2,6-di-tert-butyl-p-cresol, pentaerythrityl-tetrakis[3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, and tris-(3,5-di-tert-butyl-4-hydroxybenzyl)-isocyanurate. Examples of the benzotriazole-based compound include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis-(n-octyllthio)-6-(4-hydroxy-3,5-di-tert-butylanilino)-1,3,5-triazine, triethylene glycol-bis[3-(3-tert-buts 1-5-methyl-4-hydroxyphenyl)propionate], N,N'-hexamethylenebis(3,5-di-tert-butyl-4-hydroxy-hydrocinnamide), 1,3,5-tri methyl-2,4,6-tris(3,5-di-tert-butyl-4-hydroxybenzyl)benzene, 2(2'-hydroxy-3',5'-di-tert-butylphenyl)-5-chlorobenzotriazole, (2(2'-hydroxy-3', 5'-di-tert-amylphenyl)-5-chlorobenzotriazole, 2,6-di-tert-butyl-p-cresol, pentaerythrityl-tetrakis[3-(3,5-di-tert-butyl-4-hydroxyphenyl)propionate], and 2-(2H-benzotriazol-2-yl)-6-(1-methyl-1-phenylethyl)-4-(1,1,3,3-tetramethylbutyl) phenol.

[Optical Filter]

The resin composition according to the embodiment of the present invention (preferably, a film formed using the resin composition according to the embodiment of the present invention) is suitable as an optical filter. That is, the optical filter according to the embodiment of the present invention preferably includes the resin composition according to the embodiment of the present invention, and is more preferably a film form. The content ratio of each component in the optical filter is the same as the content ratio of each component (excluding the solvent) in the resin composition according to the embodiment of the present invention.

Hereinafter, a method of producing an optical tiller will be described.

<Method of Producing Optical Filters>

The method of producing an optical filter is not particularly limited as long as the resin composition according to the embodiment of the present invention is used, and the optical filter can be appropriately produced by an ordinary molding method.

The optical filter according to the embodiment of the present invention can be produced by, for example, a method of firming a solution casting film. In the method of forming a solution casting film, a film can be produced using a solution (dope, one aspect of the resin composition according to the embodiment of the present invention) prepared by dissolving at least two or more colorants represented by Formula (1) (however, at least one of these is the colorant represented by Formula (2)) and the binder resin in an organic solvent.

The organic solvent is not particularly limited as long as the organic solvent can dissolve the above-described colorant mixture and binder resin, but a solvent (or a mixed solvent of two or more solvents) having a solubility of 1% by mass or more of the colorant mixture is preferable, and a solvent (or a mixed solvent of two or more solvents) having a solubility of 1.5% by mass or more of the colorant mixture is more preferable. For example, at least one solvent among alcohol compounds having 1 to 4 carbon atoms, ether compounds having 3 to 12 carbon atoms, ketone compounds having 3 to 12 carbon atoms, ester compounds having 3 to 12 carbon atoms, and halogenated hydrocarbon compounds having 1 to 6 carbon atoms can be used.

The above-described ether compound, ketone compound, and ester compound may have a cyclic structure. In addition, a compound having two or more functional groups (that is, —O—, —CO—, and —COO—) of the above-described ether compound, ketone compound, and ester compound can also be used as the organic solvent. The above-described organic solvent may have another functional group such as an alcoholic hydroxyl group. In a case of an organic solvent having two or more kinds of functional groups, it is preferable that the number of carbon atoms of the organic solvent is within the above-described preferred range with regard to the number of carbon atoms of the solvent having any functional group.

As for the content ratio of the binder resin to the organic solvent in the solution, the above-described description in the section of the organic solvent in the resin composition according to the embodiment of the present invention can be preferably applied. The above-described optional additive may be added to the organic solvent (main solvent).

With regard to a drying method in the method of forming a solution casting film, reference can be made to the description in U.S. Pat. Nos. 2,336,310A, 2,367,603A, 2,492,078A, 2,492,977A, 2,492,978A, 2,607,704A, 2,739,069A, 2,739,070A, GB640731B. GB736892B, JP1970-004554B (JP-S45-004554B), JP1974-005614B (JP-S49-005614B), JP1985-176834A (JP-S60-176134A), JP1985-203430A (JP-S60-203430A), and JP1987-115035A (JP-S62-115035A). Drying on a band can be performed by blowing air or an inert gas such as nitrogen.

It is also possible to cast two or more layers using the prepared solution (dope) to form a film. It is preferable that the dope is cast onto the band and the solvent is evaporated to form a film. It is preferable that the concentration of the dope before casting is adjusted such that the solid content is in a range of 10% to 40% by mass. It is preferable that the surface of the band is polished off in a state of mirror surface.

In a case of casting two or more layers of a plurality of cycloolefin-based resin solutions, a film may be produced while casting each of the solutions including the cycloolefin-based resin from a plurality of casting ports provided at intervals in a traveling direction of a support, and laminating the solutions. With regard to the methods, for example, methods described in JP1986-158414A (JP-S61-158414A), JP1989-122419A (JP-H01-122419A), and JP1999-198285A (JP-H11-198285A) can be used, in addition, it is also possible to cast a cycloolefin-based resin solution from two casting ports to form a film. With regard to the method, for example, methods described in JP1985-027562A (JP-S60-027562A), JP1986-094724A (JP-S61-094724A), JP1986-947245A (JP-S61-947245A), JP1986-104813A (JP-S61-104813A), JP1986-158413A (JP-S61-158413A), and JP1994-134933A (JP-H06-134933A) can be used. Furthermore, a casting method of a resin film described in JP1981-162617A (JP-S56-162617A), in which the flow of a high-viscosity resin solution is wrapped with a low-viscosity resin solution and the high-viscosity and low-viscosity resin solutions are extruded at the same time.

In addition, a film can be produced by, using two casting ports, peeling off a film formed on a support by a first casting port and performing second casting on a side which is in contact with the support surface. Examples thereof include a method described in JP1969-020235B (JP-S44-02023513).

As the solution to be cast, the same solution may be used or two or more different solutions may be used. It is sufficient that, in order to allow a plurality of layers to have a function, a solution corresponding to the function is extruded from each casting port. Furthermore, as the forming of a solution casting film, an aspect in which other functional layers (for example, an adhesive layer, a dye layer, an antistatic layer, an antihalation layer, an ultraviolet absorbing layer, a polarizing layer, and the like) are cast at the same time can be used.

The colorant represented by Formula (1) (however, at least one of the colorants is the colorant represented by Formula (2)) can be added to the above-described solution by, for example, mixing with the binder resin in the organic solvent in a case of preparing the dope.

(Drying Treatment)

Steps from casting of the dope to post-drying may be performed under an atmosphere of air or under an atmosphere of inert gas such as nitrogen. A winding machine used for producing the optical filter according to the embodiment of the present invention may be a commonly used winding machine, and the winding can be performed by a constant tension method, a constant torque method, a taper tension method, a program tension control method with a constant internal stress, and the like.

(Stretching Treatment)

The above-described optical filter can be also be subjected to a stretching treatment, it is possible to impart a desired retardation to the optical filter by the stretching treatment. As a stretching direction of the optical filter, any one of a width direction or a longitudinal direction is preferable.

The stretching method in the width direction is described in, for example, JP1987-115035A (JP-S62-115035A), JP1992-152125A (JP-H04-152125A), JP1992-284211A (JP-H04-284211A), JP1992-298310A (JP-H04-298310A), JP1999-048271A (JP-H11-048271A), and the like.

The stretching of the film (optical filter before the stretching treatment) is performed under heating conditions. The film can be stretched during the treatment of drying, which is particularly effective in a case where the solvent remains, in a case of stretching in the longitudinal direction, for example, the film is stretched by adjusting a speed of a film transport roller so that a film winding speed is faster than a film peeling speed. In a case of stretching in the width direction, the film can be stretched by transporting the film while holding a width of the film by a tenter and gradually widening a width of the tenter. It is also possible to stretch the film using a stretching machine (preferably monoaxial stretching using a long stretching machine) after drying the film.

The method for forming the optical filter is not particularly limited, and the optical filter can be produced as described above. Furthermore, any one of a heat melting molding method or a solution casting method can be used. The heat melting molding method can be classified in more detail into an extrusion molding method, a press molding method, an inflation molding method, an injection molding method, a blow molding method, a stretch molding method, and the like. Among these methods, in order to obtain a film having excellent mechanical strength, surface accuracy, and the like an extrusion molding method, an inflation molding method, or a press molding method is preferable and an extrusion molding method is most preferable. The molding conditions are appropriately selected depending on the purpose of use and the molding method, and in a case of the heat melting molding method, the cylinder temperature is appropriately set in a range of usually 150° C. to 400° C., preferably 200° C. to 350° C., and more preferably 230° C. to 330° C. In a case where the polymer temperature is too low, the fluidity deteriorates, which may cause sink marks and distortion in the film, and in a case where the polymer temperature is too high, voids or silver streaks mar be generated due to thermal decomposition of the polymer, or molding defects such as yellowing of the film may occur.

(Physical Properties or Characteristics of Optical Filter)

Preferred physical properties or characteristics of the optical filter according to the embodiment of the present invention will be described.

The optical filter has a maximum absorption wavelength in a corresponding specific visible range, as a film formed by using the resin composition according to the embodiment of the present invention. The maximum absorption wavelength of the optical filter (film form) may be slightly different from the maximum absorption wavelength of the colorant mixture in the solution state due to the formation of colorant associate, combination with the resin, and the like, but the optical filter has a maximum absorption wavelength in a wavelength range of approximately 400 nm to 700 nm. Among these, in the optical filter, it is preferable to have a maximum absorption wavelength in a wavelength range of 400 nm to 680 nm, it is more preferable to have a maximum absorption wavelength in a wavelength range of 400 nm to 640 nm, it is still more preferable to have a maximum absorption wavelength in a wavelength range of 470 nm to 630 nm, and it is particularly preferable to have a maximum absorption wavelength in a wavelength range of 550 nm to 610 nm.

Since the optical filter has a maximum absorption wavelength in a specific wavelength range as described above, the optical filter absorbs unnecessary light (specifically, light of 580 nm to 600 nm) included in an incidence ray from a white LED or the like, which is used as a light source for a backlight unit, and a light having; a desired wavelength can be passed through. Therefore, the optical filter according to the embodiment of the present invention can exhibit wide color reproducibility, high brightness, and the like.

The above-described "maximum absorption wavelength of the optical filter (film form)" is a maximum absorption wavelength measured in a state of a film formed using the resin composition according to the embodiment of the present invention, and specifically, the maximum absorption wavelength is measured under the conditions described in Examples described later.

Having a maximum absorption wavelength in a wavelength range of XX to YY nm in the optical filter according to the embodiment of the present invention has the same meaning as that in the resin composition according to the embodiment of the present invention.

In consideration of handling in a case of laminating and improvement of productivity by shortening the doing time, the thickness of the optical filter is in a range of usually S to 300 µm, preferably 10 to 200 µm, and more preferably 20 to 100 µm.

The wetting tension of a surface of the optical filter is preferably 40 mN/m or more, more preferably 50 mN/m or more, and still more preferably 55 mN/m or more. In a case where the wetting tension of the surface is within the above-described range, the adhesive strength between the optical filter and the polarizer is improved. In order to adjust the wetting tension of the surface, a known surface treatment such as a corona discharge treatment, an ozone spraying, an ultraviolet irradiation, a flame treatment, and a chemical treatment can be performed.

The phase difference (retardation) of the optical filter according to the embodiment of the present invention will be described. The in-plane phase difference value Ro at 589 nm of the optical filter according to the embodiment of the present invention is preferably 0 to 20 nm and more preferably 0 to 10 nm, in addition, the phase difference value Rth in the thickness direction is preferably −20 to 50 nm and more preferably −10 to 20 nm.

Generally, the retardation can be controlled by a retardation of the film before stretching, a stretching ratio, a stretching temperature, and a thickness of a stretched alignment film. In a case where the film before stretching has a constant thickness, since the absolute value of retardation tends to increase as the stretching ratio increases, a stretched alignment film having a desired retardation can be obtained by changing the stretching ratio.

In a case where the optical filter is subjected to the stretching treatment, the thickness of the optical filter before stretching is preferably approximately 50 to 500 µm, and it is preferable that the uneven thickness is small, which is within ±8%, preferably within ±6%, and more preferably within ±1.4%.

The stretching ratio is preferably 1.1 to 10 times and more preferably 1.3 to 8 time& and it is sufficient to set a stretching ratio within the range to be a desired retardation.

In the obtained optical filter as described above, the molecules are aligned by stretching so that the optical filter can have a desired retardation value.

It is preferable that the variation of retardation is small, in which, in the optical filter according to the embodiment of the present invention, the variation of retardation at a wavelength of 589 nm in any retardation of the in-plane direction or the thickness direction is usually within ±50 nm, preferably ±30 nm or less, and more preferably ±20 nm or less.

The variations of retardation in the in-plane direction and the thickness direction or the uneven thickness of the optical filter can be reduced by using a film before stretching which has a smaller variation or uneven thickness, or by applying stress evenly to the film during stretching. For the purpose, it is desirable to stretch the film under an environment in which the temperature is controlled in a uniform temperature distribution, preferably within ±5° C., still more preferably within ±2° C., and particularly preferably within ±0.5° C.

[Image Display Device]

Examples of the image display device according to the embodiment of the present invention include a liquid crystal display device and an organic electroluminescence display device. The image display device according to the embodiment of the present invention will be described using a liquid crystal display device (also referred to as a "liquid crystal display device of the present invention") as a preferred aspect.

The liquid crystal display de N ice of the present invention includes at least one optical filter according to the embodiment of the present invention. The optical filter according to the embodiment of the present invention may be used as at least one of a polarizing plate-protective film or a pressure-sensitive adhesive layer as described later, or may be included in a backlight unit used in a liquid crystal display device.

It is preferable that the liquid crustal display device includes an optical filter, polarizing plates including a polarizer and a polarizing plate-protective film, a pressure-sensitive adhesive laser, and a liquid crystal cell, and it is preferable that the polarizing plates are attached to the liquid crystal cell through the pressure-sensitive adhesive layer. In the liquid crystal display device, the optical filter may also serve as the polarizing plate-protective film or the pressure-sensitive adhesive laver. That is, it is divided into a case where the liquid crystal display device includes polarizing plates including a polarizer and an optical filter (polarizing plate-protective film), a pressure-sensitive adhesive layer, and a liquid crystal cell, and a case where the liquid crystal display device includes polarizing plates including a polarizer and a polarizing plate-protective film, an optical filter (pressure-sensitive adhesive layer), and a liquid crystal cell.

FIG. 1 is a schematic view showing an embodiment of the liquid crystal display device of the present invention. In FIG. 1, a liquid crystal display device 10 consists of a liquid crystal cell having a liquid crystal layer 5 and a liquid crystal cell upper electrode substrate 3 and a liquid crystal cell lower electrode substrate 6 disposed above and below the liquid crystal laver 5, and an upper polarizing plate 1 and a lower polarizing plate 8 disposed on both sides of the liquid crystal cell. A color filter layer mad be laminated on the upper electrode substrate 3 or the loser electrode substrate 6. On a rear surface of the liquid crystal display device 10, a backlight is disposed. The light source of the backlight is not particularly limited. For example, a light emitting device formed of a white LED can be used.

It is preferable that each of the upper polarizing plate 1 and the lower polarizing plate 8 has a configuration in which two polarizing plate-protective films and a polarizer are laminated so as to sandwich the polarizer with the polarizing plate-protective films, and in the liquid crystal display device 10 of the present invention, at least one polarizing plate is a polarizing plate including the optical filter according to the embodiment of the present invention.

In addition, in the liquid crystal display device 10 of the present invention, the liquid crystal cell and the polarizing plate (upper polarizing plate 1 and/or lower polarizing plate 8) may be bonded together through a pressure-sensitive adhesive layer (not shown). In this case, the optical filter according to the embodiment of the present invention may also serve as the above-mentioned pressure-sensitive adhesive layer.

The liquid crystal display device 10 includes an image direct vision-type liquid crystal display, an image projection-type liquid crystal display device, and a light modulation-type liquid crystal display device. An active matrix liquid crystal display device in which a three-terminal or taco-terminal semiconductor element such as TFT or MIM is used is effective for the present invention. In addition, a passive matrix liquid crystal display device represented by an STN mode which is called as time division driving is also effective.

In a case where the optical filter according to the embodiment of the present invention is included in the backlight unit, the polarizing plate of the liquid crystal display device may be a normal polarizing plate (polarizing plate not including the optical filter according to the embodiment of the present invention), or may be a polarizing plate including the optical filter according to the embodiment of the present invention. In addition, the pressure-sensitive adhesive laver may be a normal pressure-sensitive adhesive layer (not the optical filter according to the embodiment of the present invention), or may be a pressure-sensitise adhesive layer formed of the optical filter according to the embodiment of the present invention.

An IPS mode liquid crystal display device described in paragraphs 0128 to 0136 of JP2010-102296A is preferable as the liquid crystal display device of the present invention

[Solid-State Imaging Element]

The solid-state imaging element according to the embodiment of the present invention includes the optical filter according to the embodiment of the present invention. The configuration of the solid-state imaging element according to the embodiment of the present invention is not particularly limited as long as the solid-state imaging element includes the optical filter according to the embodiment of the present invention and functions as a solid-state imaging element. Since the solid-state imaging element according to the embodiment of the present invention includes the optical filter (color filter) according to the embodiment of the present invention having excellent weather fastness and contrast, the solid-state imaging element according to the embodiment of the present invention is excellent in image tone and color reproducibility over a long period of use.

The configuration of the solid-state imaging element is not particularly limited as long as the solid-state imaging element includes the color filter of the present invention and functions as a solid-state imaging element. Examples thereof include a configuration in which, on a support, a solid-state imaging element (CCD image sensor. CMOS image sensor, or the like) has light-receiving elements which consist of a plurality of photodiodes and polysilicon or the like and constitute a light-receiving area of the solid-state imaging element, and the color filter of the present invention is provided on forming surface of the light-receiving elements in the support (for example, a portion other than a light receiving section, a pixel section for color adjustment, or the like) or on the opposite side of the forming surface.

[Colorant Mixtures]

The colorant mixture according to the embodiment of the present invention is a mixture composed of colorants which consist of a set of squarylium colorants represented by Formula (1), which constitutes the resin composition according to the embodiment of the present invention. That is, the colorant mixture according to the embodiment of the present invention is composed of two or more squarylium colorants represented by Formula (1), and at least one of the colorants is the squarylium colorant represented by Formula (2). However, in the colorant mixture, the colorant included in the colorant mixture according to the embodiment of the present invention does not form a chelate complex having t or more colorants as ligands.

The colorant mixture according to the embodiment of the present invention is suitable as a light absorbing component of the resin composition according to the embodiment of the present invention.

Formula (1)

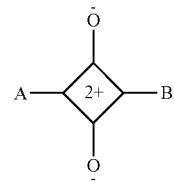

In Formula (1). A and B each independently represent an aryl group, a heterocyclic group, or —CH=G. G represents a heterocyclic group.

Formula (2)

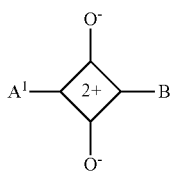

In Formula (2). $A^1$ represents a heterocyclic group having a hydrogen-bonding group (hereinafter, also simply referred to as a "hydrogen-bonding group") which forms an intramolecular hydrogen bond, and B represents an aryl group, a heterocyclic group, or —CH=G. G represents a heterocyclic group.

With regard to the squarylium colorant represented by Formula (1) and squarylium colorant represented by Formula (2), the maximum absorption wavelength, the content proportion, the combination, and the like, the descriptions of the squarylium colorant represented by Formula (1) and squarylium colorant represented by Formula (2), the maximum absorption wavelength, the content proportion, the combination, and the like in the colorant mixture included in the resin composition according to the embodiment of the present invention can be preferably applied.

EXAMPLES

Hereinafter, the present invention will be described in detail using examples. The materials, reagents, amounts and proportions of substances, operations, and the like described in the following examples can be appropriately modified as long as the gist of the present invention is maintained. Therefore, the scope of the present invention is not limited to the specific examples described below.

[Synthesis Example 1] Synthesis of Compound F-3

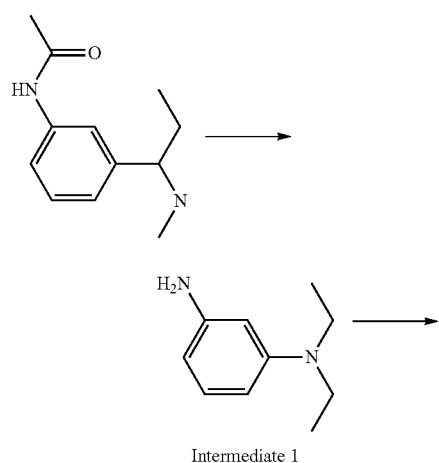

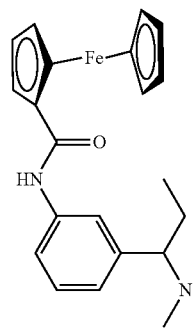

Intermediate 2

177 g of 35% hydrochloric acid was added dropwise to a mixed solution of 50 g of diethylaminoacetanilide and 265 g of isopropanol, and the solution was heated and stirred at an internal temperature of 60° C. for 24 hours. After completion of the reaction, the reaction solution was cooled to 0° C. the pH was raised to 9.5 using a 50% NaOH aqueous solution, and then 600 ml of ethyl acetate and 400 ml of water were added thereto to extract an organic layer. The organic layer was further washed with saturated saline, and the obtained organic layer was dried and concentrated over magnesium sulfate, and then purified by silica gel column chromatography (hexane-ethyl acetate=4/t) to obtain 35.1 g (88%) of an intermediate 1.

2.3 g of oxalyl chloride was added to a mixed solution of 4.5 g of ferroceneacetic acid and 33.2 g of methylene chloride, and the solution was heated and stirred at 30° C. for t hour to prepare a mixed solution A. Next, a mixed solution B was prepared by mixing 2.5 g of the intermediate 1, 2.3 g of triethylamine, and 8.9 g of methylene chloride, and then added dropwise to the mixed solution A cooled to 0° C., the mixture was stirred at room temperature for 2 hours. After completion of the reaction, 100 ml of chloroform and 100 ml of water were added thereto to separate an organic layer, and the organic layer was further washed with saturated saline. A crude crystal obtained by concentrating the organic layer was dissolved in 30 ml of chloroform, and reprecipitated in a mixed solution of 70 ml of hexane and 280 ml of ethyl acetate, the obtained crystal was filtered, the filtered product was washed with hexane and ethyl acetate. In this way, 3.5 g (yield: 58%) of an intermediate 2 was obtained.

0.68 g of the intermediate 2, 0.1 g of squaric acid, 10 ml of toluene, and 10 ml of n-butanol were mixed, and the mixture was heated under reflux for 3 hours with a Dean-Stark tube. After completion of the reaction, the reaction solution was cooled to 0° C. the obtained crystal was filtered, and the filtered product was washed with methanol. 10 ml of methanol was added to the obtained crude crystal, and the mixture was further heated under reflux for 1 hour, the obtained crystal was filtered, and the filtered product was washed with methanol. In this way, 0.43 g (56%) of a target compound F-3 was obtained.

$^1$H-NMR (CDCl$_3$): δ 12.22 to 12.09 (m, 2l1), 8.55 to 8.52 (m, 2l.1), 8.30 to 8.26 (m, 2H), 6.53 to 6.50 (m, 2H), 4.38 to 4.35 (m, 4H), 4.19 to 4.13 (m, 14H), 3.64 to 3.51 (m, 12H), 1.29 to 1.26 (m, 12H)

<Measurement of Maximum Absorption Wavelength>

The obtained compound F-3 was dissolved in chloroform (concentration: 1×10$^{-6}$ mol/L), and the maximum absorption wavelength mac and molar absorption coefficient (c) of the compound F-3 was measured using a cell having an optical path length of 10 mm and using a spectrophotometer UV-1800PC (manufactured by Shimazu Corporation). The maximum absorption wavelength λmax of the compound F-3 was 679 nm, and the molar absorption coefficient (s) was 355000.

[Synthesis Example 2] Synthesis of Compound F-38

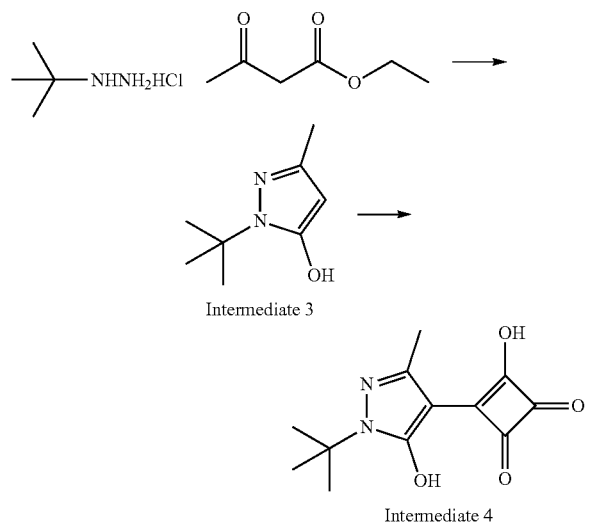

Intermediate 3

Intermediate 4

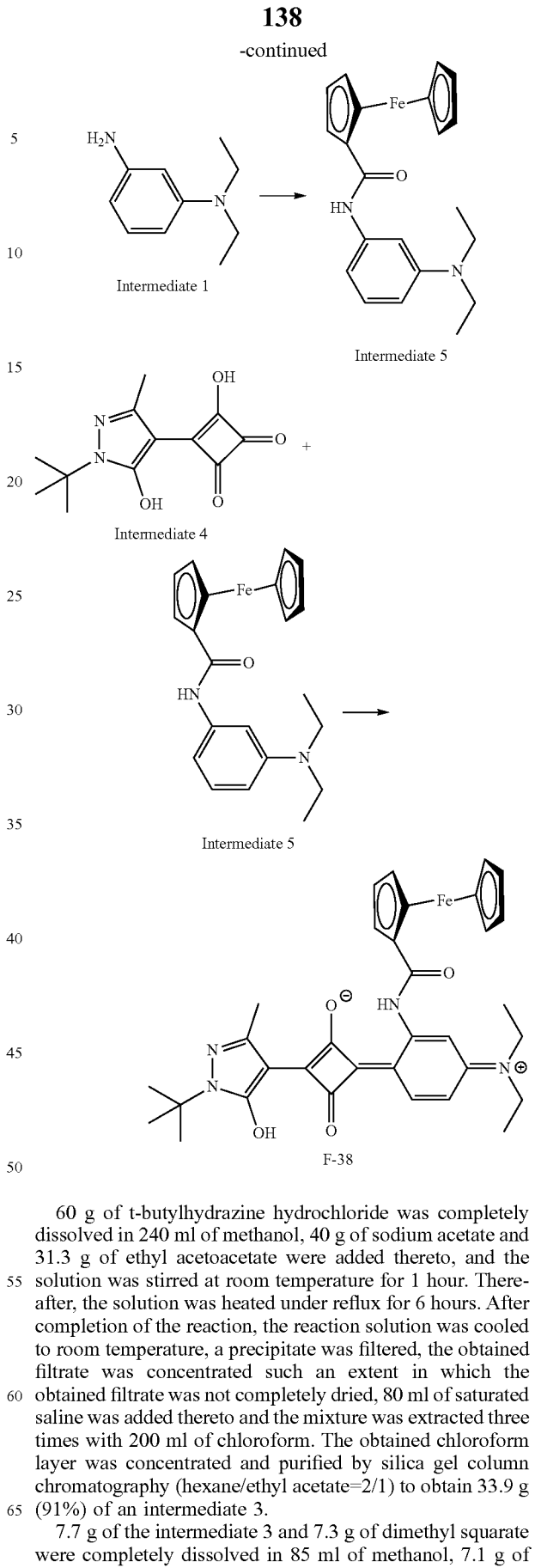

Intermediate 1

Intermediate 5

Intermediate 4

Intermediate 5

F-38

60 g of t-butylhydrazine hydrochloride was completely dissolved in 240 ml of methanol, 40 g of sodium acetate and 31.3 g of ethyl acetoacetate were added thereto, and the solution was stirred at room temperature for 1 hour. Thereafter, the solution was heated under reflux for 6 hours. After completion of the reaction, the reaction solution was cooled to room temperature, a precipitate was filtered, the obtained filtrate was concentrated such an extent in which the obtained filtrate was not completely dried, 80 ml of saturated saline was added thereto and the mixture was extracted three times with 200 ml of chloroform. The obtained chloroform layer was concentrated and purified by silica gel column chromatography (hexane/ethyl acetate=2/1) to obtain 33.9 g (91%) of an intermediate 3.

7.7 g of the intermediate 3 and 7.3 g of dimethyl squarate were completely dissolved in 85 ml of methanol, 7.1 g of potassium carbonate was added thereto, and the mixture was stirred at room temperature for 5 hours. The obtained crystal was filtered, and the filtered product was washed with isopropanol and dried. Next, 2.1 g of potassium carbonate and 100 ml of water were added to the obtained crude crystal, and the mixture was heated and stirred at 50° C. for 5 hours. After completion of the reaction, the reaction solution was cooled to room temperature and reprecipitated in 140 ml of 1N hydrochloric acid. The obtained solid in this way was filtered, and the filtered product was washed with water and methanol. In this way, 10.6 g (85%) of a target intermediate 4 was obtained.

4.6 g of oxalyl chloride was added to a mixed solution of 8.4 g of ferrocenecarboxylic acid and 70.9 g of methylene chloride, and the solution was heated and stirred at 30° C. for 1 hour to prepare a mixed solution A. Next, a mixed solution B was prepared by mixing 5.0 g of the intermediate 1, 4.6 g of triethylamine, and 17.8 g of methylene chloride, and then added dropwise to the mixed solution A cooled to 0° C. the mixture was stirred at room temperature for 2 hours. After completion of the reaction, the obtained solid was filtered, and the filtered product was washed with methylene chloride. 100 ml of hexane was added to the obtained solid to wash at room temperature by suspension, the suspension was filtered, and the filtered product was washed with hexane. 100 ml of hexane was added to the obtained crude crystal to wash at room temperature by suspension, the suspension was filtered, and the filtered product was washed with hexane. Next, 100 ml of water was added to the obtained crude crystal to wash at room temperature by suspension, the suspension was filtered, and the filtered product was washed with water and hexane. In this way, 9.8 g (yield: 86%) of an intermediate 5% was obtained.

0.5 g of the intermediate 4, 0.75 g of the intermediate 5, 15 ml of toluene, and 15 ml of n-butanol were mixed, and the mixture was heated under reflux for 2 hours with a Dean-Stark tube. After completion of the reaction, the reaction solution was cooled to 0° C., the obtained crystal was filtered, and the filtered product was washed with methanol. The obtained crude crystal was further purified by silica gel column chromatography (hexane/ethyl acetate=2/1) and then dried. In this way, 0.95 g (78%) of a target compound F-38 was obtained.

$^1$H-NMR (CDCl$_3$): δ 11.41 to 10.84 (m, 1H), 8.58 to 8.22 (m, 21.1), 6.51 to 6.48 (m, 1H), 5.28 to 5.20 (m, 2H), 4.49 (s, 2H), 4.25 (s, 5H), 3.38 to 3.53 (m, 4H), 2.57 to 2.53 (m, 3H), 1.63 to 1.61 (m, 9H), 1.33 to 1.29 (m, 6H)

<Measurement of Maximum Absorption Wavelength>

The obtained compound F-38 was dissolved in chloroform (concentration: 1×10$^{-6}$ mol/L), and the maximum absorption wavelength mac and molar absorption coefficient (ε) of the compound F-38 was measured using a cell having an optical path length of 10 mm and using a spectrophotometer UV-1800PC (manufactured by Shimadzu Corporation). The maximum absorption wavelength λmax of the compound F-38 was 590 nm, and the molar absorption coefficient (ε) was 204000.

[Synthesis Example 3] Synthesis of Compound F-51

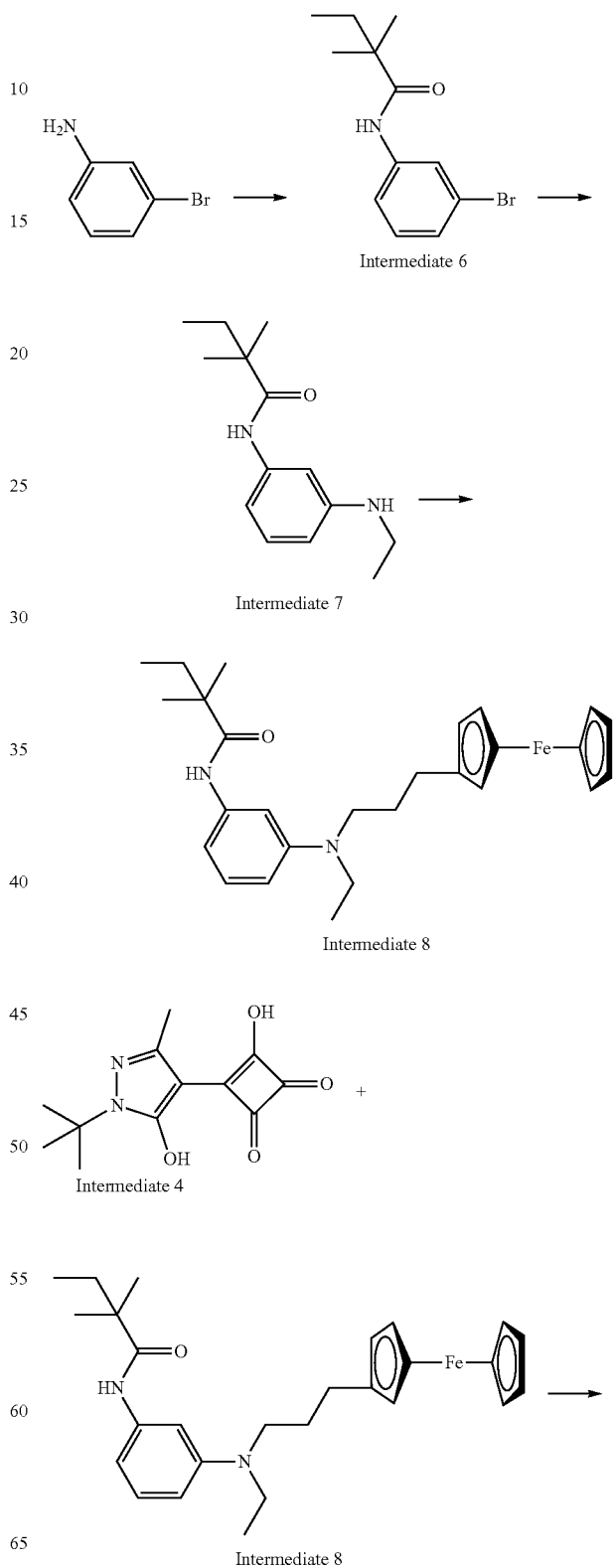

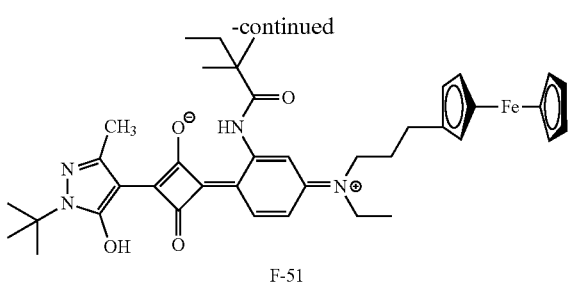

F-51

50.1 g of 3-bromoaniline, 335 g of tetrahydrofuran, and 44.2 g of triethylamine were mixed, the mixture was cooled to 5° C., and 47 g of 2,2-dimethylbutyryl chloride was slowly added dropwise thereto. After the dropwise addition, the temperature of the mixture was returned to room temperature, and the mixture was stirred for 2 hours. After completion of the reaction, 200 ml of methanol was added thereto, the solution was stirred for 1 hour, and then 950 ml of water was added thereto. The obtained solid was filtered, and the filtered product was washed with methanol and water, and dried. In this way, 73.4 g (yield: 93%) of an intermediate 6 was obtained.

3 g of the intermediate 6, 12.2 ml of ethylamine (2M, tetrahydrofuran solution), 30 ml of toluene, 0.16 g of Brettphos Pd G3, and 6.7 g of sodium tert-pentoxide were mixed, and the mixture was heated at 120° C. for 3 hours. After completion of the reaction, 20 ml of water and 30 ml of ethyl acetate were added thereto, and an organic layer was extracted. The organic layer was further washed with saturated saline, and the obtained organic layer was dried and concentrated over magnesium sulfate, and then purified by silica gel column chromatography (hexane/ethyl acetate=9/1) to obtain 1.9 g (50%) of an intermediate 7.

2.3 g of methanesulfonyl chloride was added to a mixed solution of 5.0 g of hydroxypropylferrocene, 8 ml of triethylamine, and 47 ml of ethyl acetate, and the solution was stirred at 0° C. for 30 minutes. After completion of the reaction, 15 ml of water was added thereto to extract an organic layer, the organic layer was washed with saturated saline, and the obtained organic layer was dried and concentrated over magnesium sulfate to obtain 3.2 g of ferrocenepropyl methanesulfonate. Next, a mixed solution B was prepared by mixing 1.86 g of the intermediate 7, 3.3 g of potassium carbonate, 0.66 g of potassium iodide, and 28 ml of dehydrated N-methylpyrrolidone, 3.2 g of ferrocenepropyl methanesulfonate was added to the mixed solution B, and the mixture was heated and stirred at 90° C. for 18 hours. After completion of the reaction, 60 ml of water, 100 ml of ethyl acetate, and 100 ml of hexane were added thereto, and an organic layer was extracted. The organic layer was washed twice with water and once with saturated saline, dried and concentrated over magnesium sulfate, and then the obtained organic layer was purified by silica gel column chromatography (hexane/ethyl acetate=9/1) to obtain 1.4 g (40%) of an intermediate 8.

0.3 g of the intermediate 4, 0.53 g of the intermediate 8, 10 ml of toluene, and 10 ml of n-butanol were mixed, and the mixture was heated under reflux for 2 hours with a Dean-Stark tube. After completion of the reaction, the reaction solution was cooled to 0° C. 10 ml of methanol was added thereto, and the solution was allowed to stand at 0° C. for 2 hours. The obtained crystal was filtered, and the filtered product was washed with methanol. In this way, 0.55 g (66%) of a target compound F-51 was obtained.

$^1$H-NMR (solvent: CDCl$_3$): δ 11.05 to 10.52 (m, 1H), 8.54 to 8.19 (m, 2H), 6.40 to 6.38 (m, 1H), 4.10 to 4.07 (m, 1H), 3.55 to 3.50 (m, 2H), 3.47 to 3.43 (m, 2H), 2.50 (s, 3H), 2.46 to 2.42 (m, 2H), 1.93 to 1.80 (m, 4H), 1.59 (s, 9H), 1.33 (s, 6H), 1.28 to 1.25 (m, 3H), 0.91 to 0.89 (m, 3H)

<Measurement of Maximum Absorption Wavelength>

The obtained compound F-51 was dissolved in chloroform (concentration: 1×10$^{-6}$ mol/L), and the maximum absorption wavelength λmax and molar absorption coefficient (ε) of the compound F-51 was measured using a cell having an optical path length of 10 mm and using a spectrophotometer UV-1800 (PC (manufactured by Shimadzu Corporation). The maximum absorption wavelength λmax of the compound F-51 was 589 nm, and the molar absorption coefficient (ε) was 244000.

[Synthesis Example 4] Synthesis of Compound F-75

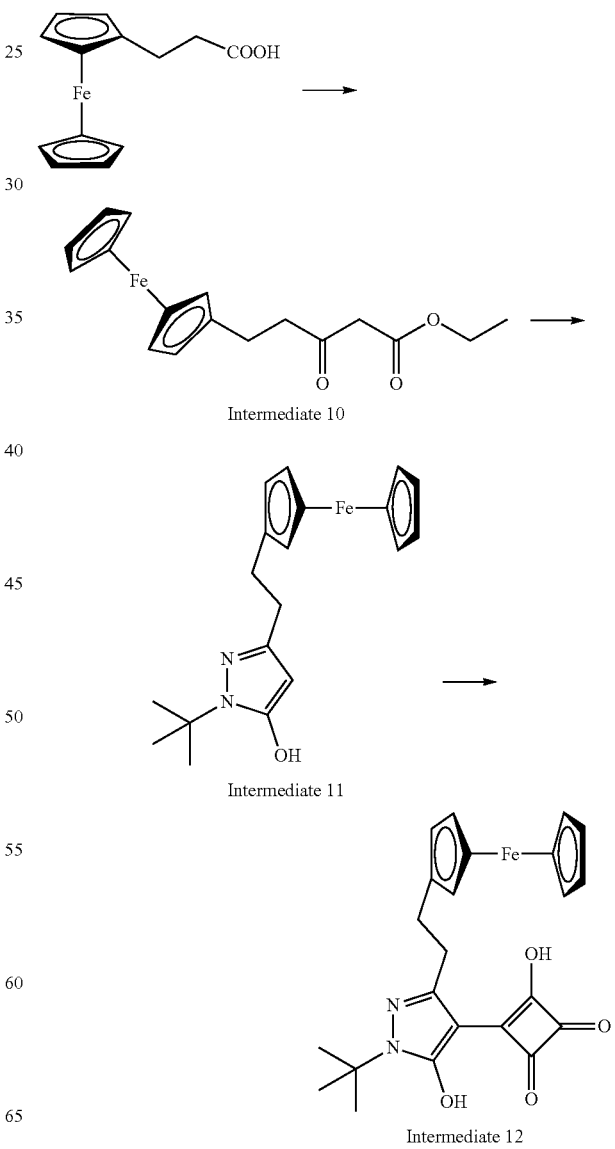

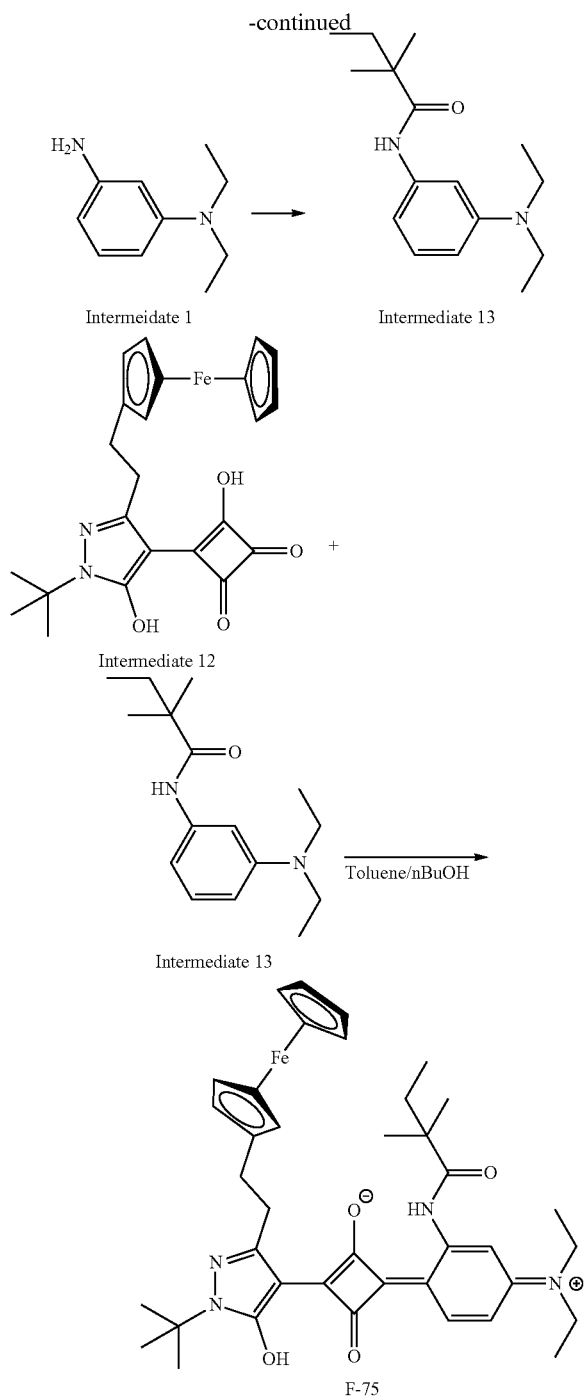

Intermeidate 1

Intermediate 13

Intermediate 12

Intermediate 13

F-75

A mixed solution of 8.2 g of 1-(3-dimethylaminopropyl)-3-ethylcarbodiimide hydrochloride and 50 ml of acetonitrile was cooled to 0° C., 5.2 g of dimethylaminopyridine, 10 g of ferrocenepropionic acid (synthesized according to a method described in 4th Ed. Jikken Kagaku kora (Courses in Experimental Chemistry), vol. 18, p. 235), and 6.1 g of Meldrum's acid were added thereto, the temperature of the solution was returned to room temperature, and the solution was stirred for 16 hours. After completion of the reaction, 150 ml of ethyl acetate and 100 ml of 1N hydrochloric acid were added thereto, and an organic layer was extracted. The organic layer was further washed with 1 N hydrochloric acid and saturated saline, and then dried and concentrated over magnesium sulfate. After completion of the concentration, 75 ml of ethanol was added thereto, and the solution was heated under reflux for 2 hours. After the reflux, ethanol was subsequently distilled off, and the residue was purified by silica gel column chromatography (hexane/ethyl acetate=4/1) to obtain 9.1 g (71%) of an intermediate 10.

6.8 g of t-butylhydrazine hydrochloride was completely dissolved in 45 ml of methanol, 4.5 g of sodium acetate and 9 g of the intermediate 10 were added thereto, and the solution was heated under reflux for 16 hours. After completion of the reaction, the reaction solution was cooled to room temperature, 25 ml of hexane and 25 ml of ethyl acetate were added thereto, 100 ml of water was subsequently added, and the mixture was stirred at room temperature for 2 hours. The obtained crystal was filtered, 45 ml of acetonitrile was further added to the filtered product, and the mixture was heated under reflux for 1 hour. After the reflux, the mixture was cooled to room temperature and filtered to obtain 6.3 g (65%) of an intermediate 11.

$^1$H-NMR (CDCl$_3$): δ 4.12 to 4.07 (m, 9H), 3.13 (s, 2H), 2.60 to 2.57 (m, 4H), 1.50 (s, 9H)

2 g of potassium carbonate was added to a mixed solution of 5 g of the intermediate 11, 2.1 g of dimethyl squarate, and 50 ml of methanol, and the mixture was stirred at 50° C. for 2 hours. After completion of the reaction, the reaction solution was cooled to 5° C., the obtained crystal was filtered, and the filtered product was washed with isopropanol and dried. Next, 1.2 g of potassium carbonate, 25 ml of water, and 25 ml of ethanol were added to the obtained crude crystal, and the mixture was heated and stirred at 50° C. for 10 hours. After completion of the reaction, only ethanol was distilled off, and the reaction solution was reprecipitated in 80 ml of 1N hydrochloric acid. The obtained solid in this way was filtered, and the filtered product was washed with water. In this way, 4.1 g (71%) of a target intermediate 12 was obtained.

$^1$H-NMR (CDCl$_3$): δ 4.59 to 4.17 (broad, 9H), 2.81 (broad, 2H), 2.33 (broad, 2H), 1.52 (s, 9H)

10 g of the intermediate 1 and 60 ml of dimethylacetamide were mixed, the mixture was cooled to 3° C., and 8.6 g of 2,2-dimethylbutyryl chloride was slowly added dropwise thereto. After the dropwise addition, the temperature of the mixture was returned to room temperature, and the mixture was stirred for 1 hour. After completion of the reaction, 180 ml of water was added thereto, 47 ml of 5% sodium hydroxide aqueous solution was subsequently added slowly, and the mixture was further stirred for 1 hour after dropwise addition. The obtained solid was filtered, and the filtered product was sashed with 60 ml of a mixed solvent of methanol/water=1/1, and dried. In this way, 14.5 g (yield: 91%) of an intermediate 13 was obtained.

0.5 g of the intermediate 12, 0.29 g of the intermediate 13, 15 ml of toluene, and 15 ml of n-butanol were mixed, and the mixture was heated under reflux for 2 hours with a Dean-Stark tube. After completion of the reaction, the reaction solution was cooled to 0° C., 30 ml of methanol was added thereto, and the solution was allowed to stand at 0° C. for 24 hours. The obtained crystal was filtered, and the filtered product was washed with methanol. In this way, 0.31 g (40%) of a target compound F-75 was obtained.

$^1$H-NMR (CDCl$_3$): δ 11.13 to 10.54 (m, 1H), 8.58 to 8.23 (m, 2H), 6.48 to 6.45 (m, 1H), 4.23 to 4.04 (m, 9H), 3.56 to 3.51 (m, 4H), 3.09 to 3.06 (m, 2H), 2.71 to 2.68 (m, 2H), 1.89 to 1.86 (m, 2H), 1.60 (s, 9H), 1.36 to 1.28 (m, 12H), 0.93 to 0.89 (m, 3H)

=Measurement of Maximum Absorption Wavelength>

The obtained compound F-75 was dissolved in chloroform (concentration: $1 \times 10^{-6}$ mol/L), and the maximum absorption wavelength λmax and molar absorption coefficient (ε) of the compound F-75 was measured using a cell having an optical path length of 10 mm and using a spectrophotometer t-UV-1800PC (manufactured by Shimadzu Corporation). The maximum absorption wavelength λmax of the compound F-75 was 589 nm, and the molar absorption coefficient (ε) was 221000.

Example 1

Colorant mixtures No. 101 to 130 and No. c11 to c15 shown in Table 1 were prepared. The following evaluations were performed on each of the prepared colorant mixtures.

Each colorant shown in Table 1 was synthesized with reference to the methods described in JP2006-160618A, WO2004/005981A, WO2004/007447A, Dyes and Pigment, 2001, 49, pp. 161 to 179, WO2008/090757A, WO2005/121098A, JP2008-275726A, JP2002-097383A, and JP2015-068945A, or the above-described synthesis examples.

[Test Example 1] Measurement of Maximum Absorption Wavelength

The colorant mixture shown in the following table was dissolved in chloroform to prepare a colorant solution for measurement, which had a concentration of $1 \times 10^{-6}$ mol/L. Using a cell having an optical path length of 10 mm and a spectrophotometer UV-1800PC (manufactured by Shimadzu Corporation), the maximum absorption wavelength λmax of the colorant solution for measurement at 23° C. was measured.

[Test Example 2] Evaluation of Solubility

Solubility of the colorant mixture shown in the following table in ethyl acetate was evaluated. Specifically, the colorant mixture was added to toluene at 23° C., stirred for 1 hour, and the presence or absence of dissolution of the colorant was visually observed and the solubility was evaluated based on the following evaluation standard.

<Evaluation Standard of Solubility>

A: solubility was 1.53% by mass or more.
B: solubility was 0.5% by mass or more and less than 1.5% by mass.
C: solubility was 0.1% by mass or more and less than 0.5% by mass.
D: solubility was less than 0.1% by mass.

TABLE 1

| No. | Colorant 1 Type | Colorant 1 Proportion | Colorant 2 Type | Colorant 2 Proportion | Colorant 3 Type | Colorant 3 Proportion | λmax (nm) | Evaluation Solubility |
|---|---|---|---|---|---|---|---|---|
| 101 | A-11 | 95 | A-1 | 5 | | | 600 | A |
| 102 | 4-1 | 98 | A-40 | 2 | | | 589 | A |
| 103 | 4-1 | 94 | A-40 | 3 | A-21 | 3 | 589 | A |
| 104 | 4-3 | 95 | A-19 | 5 | | | 598 | A |
| 105 | 3-3 | 85 | 3-1 | 15 | | | 569 | A |
| 106 | 3-7 | 99 | A-23 | 1 | | | 586 | A |
| 107 | 3-7 | 94 | A-23 | 1 | 7-1 | 5 | 585 | A |
| 108 | 3-41 | 95 | A-23 | 5 | | | 595 | A |
| 109 | 3-41 | 94 | A-23 | 5 | A-32 | 1 | 595 | A |
| 110 | 3-69 | 99.7 | A-31 | 0.3 | | | 586 | A |
| 111 | 3-69 | 99.3 | A-24 | 0.7 | | | 586 | A |
| 112 | 3-69 | 95 | A-31 | 2 | A-24 | 3 | 586 | A |
| 113 | 3-69 | 70 | 3-44 | 30 | | | 587 | A |
| 114 | 8-2 | 90 | 7-1 | 10 | | | 511 | A |
| 115 | 8-2 | 90 | 7-1 | 5 | A-40 | 5 | 512 | A |
| 116 | C-1 | 95 | A-67 | 5 | | | 589 | A |
| 117 | C-1 | 95 | 7-1 | 5 | | | 589 | A |
| 118 | C-3 | 60 | C-2 | 40 | | | 582 | A |
| 119 | F-38 | 95 | F-3 | 5 | | | 590 | A |
| 120 | F-38 | 95 | F-3 | 3 | A-31 | 5 | 590 | A |
| 121 | F-38 | 98 | A-31 | 2 | | | 590 | A |
| 122 | F-51 | 99.5 | F-7 | 0.5 | | | 589 | A |
| 123 | F-51 | 90 | F-7 | 5 | A-31 | 5 | 589 | A |
| 124 | F-51 | 95 | A-31 | 5 | | | 589 | A |
| 125 | F-51 | 85 | F-49 | 15 | | | 589 | A |
| 126 | F-75 | 99.7 | A-24 | 0.3 | | | 589 | A |
| 127 | F-75 | 97 | F-117 | 3 | | | 589 | A |
| 128 | F-75 | 96 | A-24 | 2 | F-117 | 2 | 589 | A |
| 129 | A-24 | 90 | 4-32 | 10 | | | 667 | B |
| 130 | A-31 | 90 | 8-2 | 10 | | | 500 | C |
| c11 | A-24 | 100 | | | | | 673 | C |
| c12 | A-3 | 100 | | | | | 498 | D |
| c13 | 3-41 | 100 | | | | | 595 | B |
| c14 | F-38 | 100 | | | | | 590 | B |
| c15 | A-21 | 100 | | | | | 634 | D |

Note to Table

The proportion of the colorants 1 to 3 indicates the content proportion (% by mass) in a case where the total of the colorants is 100% by mass.

The types of the colorants 1 to 3 mean the colorant numbers described in the above-exemplified compounds.

From the results shown in Table 1, the following is found.

Comparative Example No c15 is a squarylium colorant represented by Formula (1) defined in the present invention, and consists of a simple substance of a symmetric colorant, which does not have an intramolecular hydrogen-bonding group. In Comparative Example No. c15, the solubility in toluene was as low as less than 01% by mass, and the solubility in a solvent was inferior.

Comparative Examples No. c11 and c12 are squarylium colorants represented by Formula (1) defined in the present invention, and consist of a simple substance of a symmetric colorant, which has an intramolecular hydrogen-bonding group. In Comparative Example No. c11, the solubility in toluene was less than 0.5%, by mass, and in Comparative Example No. c12, the solubility in toluene was less than 0.1% by mass. Both had low solubility in a solvent.

In addition, Comparative Examples No. c13 and c14 consist of a simple substance of the squarylium colorant represented by Formula (2) defined in the present invention. In Comparative Examples No. c13 and c14, the solubility in toluene was as low as less than 1.5% by mass, and both had low solubility in a solvent.

On the other hand, in the mixtures No. 101 to 128 of the squarylium colorants defined in the present invention, which contained two or more squarylium colorants represented by Formula (1), and in which at least one of the squarylium colorants was an asymmetric squarylium colorant which was represented by Formula (2) and had an intramolecular hydrogen-bonding group, the solubility in toluene was as high as 1.5% by mass or more, and the solubility in a solvent was excellent. In addition, in the mixtures No. 129 and 130 of the squarylium colorants defined in the present invention, which contained 90% by mass of the symmetric squarylium colorant having low solubility in the mixture, the solubility of No. 129 in toluene was 0.5% by mass or more, and the solubility of No. 130 in toluene was 0.1% by mass or more. Therefore, with respect to Comparative Examples No. c11 and 12 as controls, the mixtures No. 129 and 130 exhibited excellent solubility, respectively. In addition, since the colorant mixtures of No. 101 to 130 had a maximum absorption wavelength in a wavelength range of 400 nm to 700 nm, it was found that these colorant mixtures are excellent in use as a light absorbing component constituting the resin composition according to the embodiment of the present invention.

Example 2

<Material>
(Resin 1)
A commercially available polystyrene (manufactured by PS Japan Corporation, trade name: SGP-10, Tg: 100° C.) was heat-melted at 110° C., returned to normal temperature (23° C.), and then used as a resin 1.
(Resin 2)
A commercially available Arton (manufactured by JSR Corporation, trade name: RX4500, Tg: 140° C., cyclic polyolefin) was heat-melted at 110° C., returned to normal temperature (23° C.), and then used as a resin 2.
(Base Material Film 1)
A commercially available polyethylene terephthalate film (trade name: LUMIRROR (R) S105, film thickness: 38 μm, manufactured by Toray Industries, Inc.) was used as a base material film 1.
[Production of Optical Filter No. 201]
<Preparation of Resin Solution>
The components shown below were mixed to prepare a resin solution (resin composition) No. 201.

| Composition of resin solution No. 201 | |
|---|---|
| Resin 1 | 100 parts by mass |
| Total amount of colorant | 1 part by mass |
| (among these, colorant A-11 described above | 0.95 parts by mass |
| colorant A-1 described above | 0.05 parts by mass) |
| Ethyl acetate (solvent) | 574 parts by mass |

Next, the obtained resin solution No. 201 was filtered using a filter paper having an absolute filtration accuracy of 10 μm (#63, manufactured by Toyo Roshi Kaisha, Ltd.) and further filtered using a metal-sintered filter having an absolute filtration accuracy of 2.5 μm (FH025, manufactured by Pall Corporation).
<Production of Optical Filters>
The resin solution No. 201 after the filtration treatment was applied onto the base material film 1 using a bar coater so that the film thickness after drying was 5.0 μm, and dried at 100° C., thereby producing an optical filter No. 201.
[Production of Optical Filters No. 202 to 230 and c21 to c25]
Optical filters No. 202 to 230 and c21 to c25 were produced in the same manner as the production of the optical filter No. 201, except that, in the production of the optical filter No. 201, the types of resins, types of colorants, and content ratio of colorants were as shown in the following table. The thickness of each optical filter was also the same as in the optical filter No. 201.
The following evaluations were performed on each of the optical filters produced above.

[Test Example 3] Evaluation of Surface

A surface (surface opposite to the base material film) of the optical filter produced above was observed with an optical microscope (MX-61L, manufactured by Olympus Corporation) at a bright field of 200 times. The observed surface condition was evaluated based on the following evaluation standard.
<Evaluation Standard of Surface=s
A: no unevenness or crystal precipitation was observed.
B: at least one of unevenness or crystal precipitation was slightly observed.
C: unevenness was observed, or crystals were precipitated.
D: unevenness was strongly observed, or crystals were heavily precipitated.

[Test Example 4] Measurement of Maximum Absorption Wavelength and Evaluation of Light Resistance of Optical Filter Using Super xenon weather meter SX75 manufactured by Suga Test Instruments Co., Ltd., the optical filter produced above was irradiated with light at an irradiance of 100,000 lux for 80 hours under an environment of 50° C., and a relative humidity of 80%. Using the value of the absorbance at the absorption maximum wavelength of the optical filter before and after the irradiation, the absorbance change rate was calculated by the following expression and used as an index of light resistance.

(Absorbance change rate) (%)=[(absorbance after 80 hour irradiation)/(absorbance before irradiation)]×100

Here, the absorbance of the optical filter at the absorption maximum wavelength was determined as follows.
A filter (hereinafter, referred to as a "control filter") having a film thickness of 5.0 μm was produced in the same manner, except that, in the production of the above-described optical filter, the filter did not contain a colorant.
Using a UV3150 spectrophotometer manufactured by Shimadzu Corporation, the absorbance of the optical filter produced above and the control filter in a wavelength range of 400 nm to 800 nm was measured ever 1 nm under the condition of 23° C. With regard to the absorbance at each wavelength, the difference in absorbance between the absorbance of the optical filter and the absorbance of the control filter was calculated. The wavelength at which the difference in absorbance was maximized was defined as the maximum absorption wavelength λmax, and the difference in absorbance at the maximum absorption wavelength was defined as the absorbance of the optical filter at the maximum absorption wavelength.
The absorbance of the optical filters No. 201 to 230 and c21 to c25 were all 0.4 or more, and light in a specific wavelength range (specifically, 400 nm to 700 nm) could be blocked.

[Test Example 5] Evaluation of Hue

With regard to the optical filters shown in Table 2, an optical filter (hereinafter, referred to as a "control optical filter") containing only the colorant (main component) having the highest content proportion was produced. The control optical filter was produced such that the content of the colorant with respect to 100 parts by mass of the resin was adjusted to be 1 part by mass. An optical filter (hereinafter, referred to as an "optical filter for hue evaluation") was produced using the colorant mixture having the content proportion shorn in Table 2 so as to have the same concentration value (L*) as the control optical filter.

The color difference ΔEab value between the control optical filter and the optical filter for hue evaluation was measured using i1 Pro (manufactured by X-Rite Inc.). The ΔEab value was evaluated based on the following evaluation standard to evaluate the approximation of hue. As the ΔEab value is smaller, the hues of the control optical filter and the optical filter for hue evaluation are similar, and the difference in appearance is small and good. The ΔEab value is a value acquired using the following color difference expression based on the CIE 1976 (L*, a*, b*) space color system (The Color Science Handbook (1985), new edition, p. 266, edited by The Color Science Association of Japan).

$$\Delta Eab = \{(\Delta L^*)^2 + (\Delta a^*)^2 + (\Delta b^*)^2\}^{1/2}$$

<Evaluation Standard of Hue>
A: ΔEab value<5
B: 5≤ΔEab value<20
C: 20≤ΔEab value sented by Formula (1) defined in the present invention, and has an intramolecular hydrogen-bonding group. In addition, the optical filters No. c23 and c24 of Comparative Examples contain, as the colorant, one colorant which is the squarylium colorant represented by Formula (2) defined in the present invention. These optical filters No. c21 to c25 of Comparative Examples were inferior in light resistance.

On the other hand, the optical filters No. 201 to 230 according to the embodiment of the present invention contain, as the colorant, the colorant mixture which has two or more squarylium colorants represented by Formula (1), in which at least one of the squarylium colorants is the squarylium colorant represented by Formula (2), and the colorant mixture has a maximum absorption wavelength in a specific wavelength range. The optical filters No. 201 to 230 according to the embodiment of the present invention generally had high light resistance and was excellent in light resistance. In addition, in the optical filters No. 201 to 230 according to the embodiment of the present in invention, the evaluation of surface was A to C, and the evaluation of hue was A. That

TABLE 2

| | Colorant 1 | | Colorant 2 | | Colorant 3 | | Resin | λmax | Evaluation | | |
|---|---|---|---|---|---|---|---|---|---|---|---|
| No. | Type | Proportion | Type | Proportion | Type | Proportion | Type | (nm) | Surface | Light resistance (%) | Hue |
| 201 | A-11 | 95 | A-1 | 5 | | | Resin 1 | 598 | A | 50 | A |
| 202 | 4-1 | 98 | A-40 | 2 | | | Resin 1 | 588 | A | 68 | A |
| 203 | 4-1 | 94 | A-40 | 3 | A-21 | 3 | Resin 1 | 588 | A | 71 | A |
| 204 | 4-3 | 95 | A-19 | 5 | | | Resin 1 | 599 | A | 72 | A |
| 205 | 3-3 | 85 | 3-1 | 15 | | | Resin 1 | 575 | B | 90 | A |
| 206 | 3-7 | 99 | A-23 | 1 | | | Resin 1 | 591 | A | 92 | A |
| 207 | 3-7 | 94 | A-23 | 1 | 7-1 | 5 | Resin 1 | 591 | A | 93 | A |
| 208 | 3-41 | 95 | A-23 | 5 | | | Resin 1 | 600 | A | 94 | A |
| 209 | 3-41 | 94 | A-23 | 5 | A-32 | 1 | Resin 1 | 600 | A | 94 | A |
| 210 | 3-69 | 99.7 | A-31 | 0.3 | | | Resin 1 | 591 | A | 94 | A |
| 211 | 3-69 | 99.3 | A-24 | 0.7 | | | Resin 1 | 591 | A | 94 | A |
| 212 | 3-69 | 95 | A-31 | 2 | A-24 | 3 | Resin 1 | 591 | A | 95 | A |
| 213 | 3-69 | 70 | 3-44 | 30 | | | Resin 1 | 592 | B | 95 | A |
| 214 | 8-2 | 90 | 7-1 | 10 | | | Resin 1 | 510 | A | 87 | A |
| 215 | 8-2 | 90 | 7-1 | 5 | A-40 | 5 | Resin 1 | 511 | A | 89 | A |
| 216 | C-1 | 95 | A-67 | 5 | | | Resin 1 | 590 | C | 93 | A |
| 217 | C-1 | 95 | 7-1 | 5 | | | Resin 1 | 590 | A | 92 | A |
| 218 | C-3 | 60 | C-2 | 40 | | | Resin 1 | 587 | B | 93 | A |
| 219 | F-38 | 95 | F-3 | 5 | | | Resin 1 | 594 | A | 96 | A |
| 220 | F-38 | 95 | F-3 | 3 | A-31 | 2 | Resin 1 | 594 | A | 95 | A |
| 221 | F-38 | 98 | A-31 | 2 | | | Resin 1 | 594 | A | 93 | A |
| 222 | F-51 | 99.5 | F-7 | 0.5 | | | Resin 2 | 593 | A | 92 | A |
| 223 | F-51 | 90 | F-7 | 5 | A-31 | 5 | Resin 2 | 593 | A | 93 | A |
| 224 | F-51 | 95 | A-31 | 5 | | | Resin 2 | 593 | A | 94 | A |
| 225 | F-51 | 85 | F-49 | 15 | | | Resin 2 | 593 | B | 96 | A |
| 226 | F-75 | 99.7 | A-24 | 0.3 | | | Resin 1 | 593 | A | 95 | A |
| 227 | F-75 | 97 | F-117 | 3 | | | Resin 1 | 593 | A | 96 | A |
| 228 | F-75 | 96 | A-24 | 2 | F-117 | 2 | Resin 1 | 593 | A | 96 | A |
| 229 | A-24 | 90 | 4-32 | 10 | | | Resin 1 | 666 | B | 68 | A |
| 230 | A-31 | 90 | 8-2 | 10 | | | Resin 1 | 499 | B | 90 | A |
| c21 | A-2 | 100 | | | | | Resin 1 | 674 | D | 65 | — |
| c22 | A-31 | 100 | | | | | Resin 1 | 501 | D | 88 | — |
| c23 | 3-41 | 100 | | | | | Resin 1 | 600 | D | 84 | — |
| c24 | F-38 | 100 | | | | | Resin 1 | 594 | C | 89 | — |
| c25 | A-21 | 100 | | | | | Resin 1 | 637 | D | 30 | — |

From the results shown in Table 2, the following is found.

The optical filter No. c25 of Comparative Example contains, as the colorant, one symmetric colorant which is the squarylium colorant represented by Formula (1) defined in the present invention, and does not have a an intramolecular hydrogen-bonding group. The optical filters No. c21 and c22 of Comparative Examples contain, as the colorant, one symmetric colorant which is the squarylium colorant repreis, the optical filters No. 201 to 230 according to the embodiment of the present invention were not much different in appearance of the optical filter containing only the colorant (main component) having the highest content proportion in Table 2 as the colorant, and moreover, almost no unevenness or crystal precipitation was observed on the film, and the surface was also excellent.

Among the optical filters according to the embodiment of the present invention, the optical filters No. 202 to 230, which contained, as the colorant, a squarylium colorant in which, in Formulae (1) and (2), the heterocyclic group of A and B and the heterocyclic group of $A^1$ and G were groups consisting of any one of a furan ring, a thiophene ring, an imidazole ring, a pyrazole ring, a thiazole ring, an oxazole ring, a triazole ring, an indolenine ring, an indoline ring, a pyridine ring, a pyrimidine ring, a quinoline ring, a benzothiazole ring, a benzoxazole ring, or a pyrazolotriazole ring, had high light resistance of 67% or more, and were superior in light resistance. In addition, all of the optical filters No. 205 to 228 and 230, which contained, as the colorant, the squarylium colorant represented by Formula (3), had extremely high light resistance of 87% or more, and were superior in light resistance. It is considered that these optical filters No. 205 to 228 and 230 have a short distance of hydrogen bonds formed in the molecule and can exhibit a strong interaction.

In addition, among the optical filters according to the embodiment of the present invention, in the optical filters No. 205, 213, 218, 225, 229, and 230, which contained a symmetric squarylium colorant and an asymmetric squarylium colorant, and had the same conjugated structure although the two or more colorants did not have the same structure, all of the evaluations of surface were B, which was better in terms of surface, and in the optical filters No. 201 to 204, 206 to 212, 214, 215, 217, 219 to 224, and 226 to 228, which contained a symmetric squarylium colorant and an asymmetric squarylium colorant, and in which the two or more colorants had the same structure, all of the evaluations of surface were A, which was even better in terms of surface.

From the above-described results, by using a resin composition containing, as the colorant, the colorant mixture which has two or more squarylium colorants represented by Formula (1), in which at least one of the squarylium colorants is the squarylium colorant represented by Formula (2), and containing the resin, it can be seen that an optical filter which is capable of absorbing and blocking light having a target specific wavelength and has excellent light resistance is obtained. Furthermore, since the colorant mixtures used in the optical filters No. 201 to 230 according to the embodiment of the present invention have excellent solubility as shown in Table 1, the colorant mixture is also excellent in handleability in a case of manufacturing an optical filter. It can be seen that these optical filters are excellent in use as optical filters constituting a liquid crystal panel or the like.

The present invention has been described with the embodiments thereof, any details of the description of the present invention are not limited unless described otherwise, and it is obvious that the present invention is widely construed without departing from the gist and scope of the present invention described in the accompanying claims.

The present application claims the priority of JP201 K-230015 filed in Japan on Dec. 7, 2018, the contents of which are incorporated herein by reference, as a part of the description of the present specification.

EXPLANATION OF REFERENCES

1: upper polarizing plate
2: direction of absorption axis of upper polarizing plate
3: liquid crystal cell upper electrode substrate
4: alignment control direction of upper substrate
5: liquid crystal layer
6: liquid crystal cell lower electrode substrate
7: alignment control direction of loner substrate
8: lower polarizing plate
9: direction of absorption axis of lower polarizing plate
B: backlight unit
10: liquid crystal display device

What is claimed is:

1. A resin composition comprising:
a colorant; and
a resin,
wherein the colorant contains two or more squarylium colorants represented by Formula (1),
wherein at least one of the squarylium colorants is a squarylium colorant represented by Formula (2),
wherein a colorant mixture consisting of the two or more squarylium colorants, which is included in the resin composition, has a maximum absorption wavelength in a wavelength range of 400 nm to 700 nm,

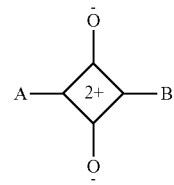

Formula (1)

in Formula (1), A and B represent an aryl group, a heterocyclic group, or —CH=G, where G represents a heterocyclic group, and

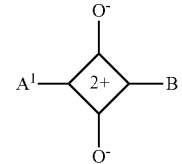

Formula (2)

in Formula (2), $A^1$ represents a heterocyclic group having a hydrogen-bonding group which forms an intramolecular hydrogen bond, B represents an aryl group, a heterocyclic group, or —CH=G, where G represents a heterocyclic group, and a structure of the heterocyclic group of B and a structure of the heterocyclic group of $A^1$ are different from each other, and
wherein the content proportion of the squarylium colorant represented by Formula (2) in the total squarylium colorants represented by Formula (1) is 70% to 99.5% by mass.

2. The resin composition according to claim 1,
wherein, in Formulae (1) and (2), the heterocyclic group of A and B and the heterocyclic group of $A^1$ and G are groups consisting of any one of a furan ring, a thiophene ring, an imidazole ring, a pyrazole ring, a thiazole ring, an oxazole ring, a triazole ring, an indolenine ring, an indoline ring, a pyridine ring, a pyrimidine ring, a quinoline ring, a benzothiazole ring, a benzoxazole ring, or a pyrazolotriazole ring.

3. The resin composition according to claim 1,
wherein at least one of the squarylium colorants represented by Formula (2) is a squarylium colorant represented by Formula (3), Formula (3)

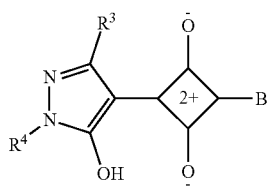

in Formula (3), B has the same meaning as B in Formula (1), $R^3$ and $R^4$ represent a hydrogen atom or a substituent, and a structure of the heterocyclic group of B is different from a structure of a pyrazole ring group.

4. The resin composition according to claim 1, wherein the resin is at least one resin of a cellulose acylate resin, a polystyrene resin, an acrylic resin, or a cycloolefin resin.

5. The resin composition according to claim 1, wherein any one of A or B in a squarylium colorant represented by Formula (1) has the same conjugated structure as any one of A or B in another squarylium colorant represented by Formula (1).

6. The resin composition according to claim 1, wherein, in Formula (1), A represents a heterocyclic group, or —CH=G, where G represents a heterocyclic group, and B represents an aryl group, a heterocyclic group, or —CH=G, where G represents a heterocyclic group.

7. An optical filter comprising:
the resin composition according to claim 1.

8. A The optical filter according to claim 7, wherein the optical filter has a film form.

9. An image display device comprising:
the optical filter according to claim 7.

10. A solid-state imaging element comprising:
the optical filter according to claim 7.

11. A colorant mixture comprising:
two or more squarylium colorants represented by Formula (1),
wherein at least one of the squarylium colorants is a squarylium colorant represented by Formula (2),
wherein the colorant mixture has a maximum absorption wavelength in a wavelength range of 400 nm to 700 nm, Formula (1)

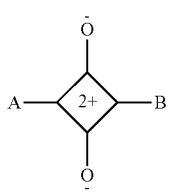

in Formula (1), A and B represent an aryl group, a heterocyclic group, or —CH=G, where G represents a heterocyclic group, and Formula (2)

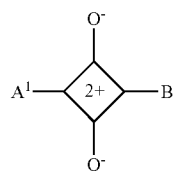

in Formula (2), $A^1$ represents a heterocyclic group having a hydrogen-bonding group which forms an intramolecular hydrogen bond, B represents an aryl group, a heterocyclic group, or —CH=G, where G represents a heterocyclic group, and a structure of the heterocyclic group of B and a structure of the heterocyclic group of $A^1$ are different from each other, and wherein the content proportion of the squarylium colorant represented by Formula (2) in the total squarylium colorants represented by Formula (1) is 70% to 99.5% by mass.

12. The colorant mixture according to claim 11, wherein, in Formulae (1) and (2), the heterocyclic group of A and B and the heterocyclic group of $A^1$ and G are groups consisting of any one of a furan ring, a thiophene ring, an imidazole ring, a pyrazole ring, a thiazole ring, an oxazole ring, a triazole ring, an indolenine ring, an indoline ring, a pyridine ring, a pyrimidine ring, a quinoline ring, a benzothiazole ring, a benzoxazole ring, or a pyrazolotriazole ring.

13. The colorant mixture according to claim 11, wherein at least one of the squarylium colorants represented by Formula (2) is a squarylium colorant represented by Formula (3), Formula (3)

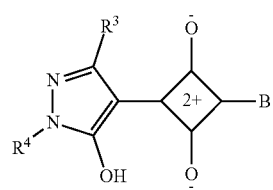

in Formula (3), B has the same meaning as B in Formula (1), $R^3$ and $R^4$ represent a hydrogen atom or a substituent, and a structure of the heterocyclic group of B is different from a structure of a pyrazole ring group.

14. The colorant mixture according to claim 11, wherein any one of A or B in a squarylium colorant represented by Formula (1) has the same conjugated structure as any one of A or B in another squarylium colorant represented by Formula (1).

15. The colorant mixture according to claim 11, wherein, in Formula (1), A represents a heterocyclic group, or —CH=G, where G represents a heterocyclic group, and B represents an aryl group, a heterocyclic group, or —CH=G, where G represents a heterocyclic group.

\* \* \* \* \*